(12) United States Patent
Zeng et al.

(10) Patent No.: US 9,073,759 B2
(45) Date of Patent: Jul. 7, 2015

(54) SILICA AEROGELS AND THEIR PREPARATION

(75) Inventors: Taofang Zeng, Cambridge, MA (US); Yanjia Zuo, Webster, NY (US); Gang Chen, Carlisle, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/206,087

(22) Filed: Aug. 9, 2011

(65) Prior Publication Data
US 2012/0128958 A1    May 24, 2012

Related U.S. Application Data

(60) Provisional application No. 61/372,315, filed on Aug. 10, 2010.

(51) Int. Cl.
  *B32B 3/26* (2006.01)
  *C01B 33/158* (2006.01)
  *C04B 14/06* (2006.01)

(52) U.S. Cl.
  CPC ........... *C01B 33/1585* (2013.01); *C04B 14/064* (2013.01)

(58) Field of Classification Search
  USPC ................................ 428/315.5, 315.7, 304.4
  See application file for complete search history.

(56) References Cited

U.S. PATENT DOCUMENTS

| | | | |
|---|---|---|---|
| 5,306,555 | A | 4/1994 | Ramamurthi et al. |
| 6,068,882 | A | 5/2000 | Ryu |
| 6,620,458 | B2 | 9/2003 | Poco et al. |
| 6,764,667 | B1 | 7/2004 | Steiner, III |
| 7,691,909 | B2 | 4/2010 | Sorensen et al. |
| 2007/0222116 | A1 | 9/2007 | Gould et al. |
| 2008/0229704 | A1* | 9/2008 | Augustyniak et al. ....... 52/782.1 |
| 2009/0087665 | A1 | 4/2009 | Suzuki et al. |
| 2009/0178933 | A1 | 7/2009 | Zeng |
| 2010/0155644 | A1 | 6/2010 | Ou et al. |
| 2010/0304078 | A1* | 12/2010 | Stol et al. ......................... 428/98 |
| 2012/0083543 | A1* | 4/2012 | Gawryla et al. ................. 521/64 |

FOREIGN PATENT DOCUMENTS

| | | |
|---|---|---|
| WO | 2007/146945 A2 | 12/2007 |
| WO | 2008/044873 A1 | 4/2008 |

OTHER PUBLICATIONS

Aerogel definition from Wikipedia, 7 pages, 2013.*
Hüsing et al., [Aerogele—luftige materialien: Chemie, struktur und eigenschaften]. Angewandte Chemie. Jan. 16, 1998;110(1-2):23-47. (German Language Reference).
International Search Report and Written Opinion mailed Dec. 21, 2011 for Application No. PCT/US2011/047055 (15 Pages).
Mrowiec-Bialon et al., Morphology of silica aerogels obtained from the process catalyzed by NH4F and NH4OH. Langmuir: The ACS Journal of Surfaces and Colloids. Jan. 1997;13(23):6310-6314.
Pajonk et al., Section 1. aerogel synthesis: Physical properties of silica gels and aerogels prepared with new polymeric precursors. Journal of Non-Crystalline Solids. Jun. 1995;186:1-8.
Pierre et al., Chemistry of aerogels and their applications. Chem Rev. 2002;102(11):4243-4265.
Rutiser et al., Composite aerogels of silica and minerals of different morphologies. Materials Letters. May 1994;19 (5-6):221-224.
[No Author Listed] Aerogel.org. Welcome to Open Source Nanotech. Main page of website. Retrieved Jun. 6, 2012 from <http://www.aerogel.org>. 11 pages.
[No Author Listed] Aspen Aerogels. Aspen Aerogels, Inc. Main page of website and product overview. Retrieved Jun. 6, 2012 from <http://www.aerogel.com> and <http://www.aerogel.com/products/overview-product.html>. 2001-2011, 3 pages.
[No Author Listed] Carbon-dioxide pressure/temperature phase diagram. Wikipedia. Diagram. Retrieved Jun. 6, 2012 from <http://en.wikipedia.org/wiki/File:carbon_dioxide_pressure-temperature_phase_diagram.svg>. 1 page.
[No Author Listed] Laponite Additives: Synthetic Silicate Additives. Southern Clay Products, Inc. Main page of website. Retrieved Jun. 6, 2012 from <http://laponite.com>. 2012, 2 pages.
[No Author Listed] Silica AeroGels: Use of silica aerogels. Absorbing Kinetic Energy. E.O. Lawrence Berkley National Laboratory, University of California. Retrieved Jun. 6, 2012 from <http://energy.lbl.gov/ecs/aerogels/sa-kinetic.html>. 2012, 4 pages.
[No Author Listed] Silica AeroGels: Use of silica aerogels. Physical Properties. E.O. Lawrence Berkley National Laboratory, University of California. Retrieved Jun. 6, 2012 from <http://energy.lbl.gov/ecs/aerogels/sa-physical.html>. 2012, 2 pages.
Aelion et al., Hydrolysis of ethyl silicate*. J Am Chem Soc. 1950;72(12):5705-12.
Akimov, Y.K., Fields of application of aerogels (review). Instruments and Experimental Techniques. 2003;46(3):287-99.

(Continued)

*Primary Examiner* — Hai Vo
(74) *Attorney, Agent, or Firm* — Thomas Engellenner; Reza Mollaaghababa; Pepper Hamilton LLP

(57) ABSTRACT

Silica aerogels with improved properties are disclosed together with methods for synthesizing such aerogels. The improved properties include lower thermal conductivity (better insulating capacity), lower acoustic velocity, lower dielectric constant and improved ductility. Greater tunability of the refractive index can also be achieved. The silica aerogels are prepared by a sol-gel processing method that provides better control of the formation of aerogel structures. Generally speaking, the improvements arise from control of the synthesis to create a morphology of primary clusters and diverse-sized secondary clusters of dense silica aerogels separated by less densely packed regions. By providing a broader range of secondary clusters and/or pore sizes and loose connectivity between clusters, reductions can be achieved in thermal conductivity and flexural modulus.

11 Claims, 34 Drawing Sheets

(56) References Cited

OTHER PUBLICATIONS

Anappara et al., Impedance spectroscopic studies of sol-gel derived subcritically dried silica aerogels. Acta Materialia. Jan. 2004;52(2):369-75.
Bhagat et al., Textural properties of ambient pressure dried water-glass based silica aerogel beads: One day synthesis. Micro Meso Mater. Nov. 2006;96(1-3):237-44.
Bhagat et al., Rapid synthesis of water-glass based aerogels by in situ surface modification of the hydrogels. App Surf Sci. Jan. 2007;253(6):3231-6.
Boday et al., Formation of polycyanoacrylate-silica nanocomposites by chemical vapor deposition of cyanoacrylates on aerogels. Chem Mater. 2008;20(9):2845-7.
Brinker et al., Sol-gel transition in simple silicates. Journal of Non-Crystalline Solids. Mar. 1982;48(1):47-64.
Cantin et al., Silica aerogels used as Cherenkov radiators. Nuclear Instruments and Methods. Jun. 1974;118 (1):177-82.
Dorcheh et al., Silica aerogel; synthesis, properties and characterization. J Mater Process Tech. Apr. 2008;199 (1-3):10-26.
Finlay et al., Biologically based fiber-reinforced/clay aerogel composites. Ind Eng Chem Res. 2008;47(3):615-9.
Fricke, J., Aerogels. Scientific American. May 1988;265(5):92-7.
Fricke et al., Aerogels: production, characterization, and applications. Thin Solid Films. Apr. 1, 1997;297(1-2):212-23.
Gesser et al., Aerogels and related porous materials. Chem Rev. 1989;89(4):765-88.
Gibiat et al., Acoustic properties and potential applications of silica aerogels. Journal of Non-Crystaline Solids. Jun. 1995;186(2):244-55.
Gupta et al., Processing and compressive properties of aerogel/epoxy composites. J Mater Process Tech. Mar. 2008;198(1-3):178-82.
Hrubesh et al., Thermal properties of organic and inorganic aerogels. J Mater Res. Mar. 1994;9:731-8.
Hüsing et al., Aerogels—Airy Materials: Chemistry, Structure, and Properties. Angewandte Chemie International Edition. Feb. 2, 1998;37(1-2):22-45.
Iler, R.K., the Chemistry of Silica: Solubility, Polymerization, Colloid and Surface Properties, and Biochemistry. John Wiley & Sons, Inc., New York, 1979, p. 21.
Ilhan et al., Hydrophobic monolithic aerogels by nanocasting polystyrene on amine-modified silica. J Mater Chem. 2006;16:3046-54.
Kanamori et al., New transparent methylsilsesquioxane aerogels and xerogels with improved mechanical properties. Adv Mater. Jun. 2007;19(12):1589-93.
Kanamori et al., Elastic organic-inorganic hybrid aerogels and xerogels. J Sol-Gel Sci Tech. 2008;48(1-2):172-81.
Kang et al., Synthesis of low-density silica gel at ambient pressure: Effect of heat treatment. J Materials Science. 2000;35(19):4971-6.
Kistler, S.S., Coherent expanded aerogels and jellies. Nature. 1931;127(3211):741.
Leventis et al., Durable modification of silica aerogel monoliths with fluorescent 2,7-diazapyrenium moieties. Sensing oxygen near the speed of open-air diffusion. Chem Mater. 1999;11(10):2837-45.
Leventis et al., Nanoengineering strong silica aerogels. Nano Letters. 2002;2(9):957-60.
Leventis et al., Using nanoscopic hosts, magnetic guests, and field alignment to create anisotropic composite gels and aerogels. Nano Letters. 2002;2(1):63-7.
Leventis, N., Three-dimensional core-shell superstructures: Mechanically strong aerogels. Acc Chem Res. 2007;40 (9):874-84.
Lu et al., Thermal conductivity of monolithic organic aerogels. Science. Feb. 1992;255(5047):971-2.
Mahler et al., Freeze-formed silica fibres. Nature. May 1980;280:27-8.
Maki et al., Formation of alumina fibers by unidirectional freezing of gel. J Non-Crystal Solid. Jun. 1986;82 (1-3):239-45.
Mauritz, K., Sol-Gel Chemistry and Technology. Polymer Science Research Center, University of Southern Mississippi. Retrieved Jun. 2, 2012 from <http://www.psrc.usm.edu/mauritz/solgel.html>. 7 Pages.
McNeill et al., Kinetics and mechanism of hydrolysis of a silicate triester, tris(2-methoxyethoxy)phenylsilane. J Am Chem Soc. 1980;102(6):1859-65.
Meador et al., Cross-linking amine-modified silica aerogels with epoxies: Mechanically strong lightweight porous materials. Chem Mater. 2005;17(5):1085-98.
Mulik et al., Cross-linking 3D assemblies of nanoparticles into mechanically strong aerogels by surface-initiated free-radical polymerization. Chem Mater. 2008;20(15):5035-46.
Nadargi et al., Studies on rheological properties of methyltriethoxysilane (MTES) based flexible superhydrophobic silica aerogels. Micro Meso Mater. Jan. 2009;117(3):617-26.
Nagasaka et al., Absolute measurement of the thermal conductivity of electrically conducting liquids by the transient hot-wire method. J Phys E: Sci Instrum. Dec. 1981;14(12):1435-40.
Nguyen et al., Tailoring elastic properties of silica aerogels cross-linked with polystyrene. ACS Appl Mater Interfaces. 2009;1(3):621-30.
Ramirez, D., Preparation of high surface area acid catalyzed silica aerogels. CHED 227. 231st ACS National Meeting, Atlanta, GA, Mar. 26-30, 2006. Undergraduate Research Poster Session: Analytical Chemistry. Abstract. 1 page.
Rao et al., Synthesis of hydrophobic aerogels for transparent window insulation applications. Mater Sci Tech. Mar. 2001;17(3):343-8.
Rao et al., Superhydrophobic silica aerogels based on methyltrimethoxysilane precursor. J Non-Crystal Solid. Nov. 2003;330(1-3):187-95.
Rao et al., Comparative studies on the surface chemical modification of silica aerogels based on various organosilane compounds of the type RnSiX4?n. J Non-Crystal Solid. Dec. 2004;350:216-23.
Rao et al., Synthesis and physical properties of TEOS-based silica aerogels prepared by two step (acid-base) sol-gel process. Solid State Sci. Sep. 2004;6(9):945-52.
Rao et al., Effect of preparation conditions on the physical and hydrophobic properties of two step processed ambient pressure dried silica aerogels. J Materials Science. 2005;40(13):3481-9.
Rao et al., Synthesis of flexible silica aerogels using methyltrimethoxysilane (MTMS) precursor. J Colloid Inter Sci. Aug. 2006;300(1):279-85.
Rao et al., Absorption and desorption of organic liquids in elastic superhydrophobic silica aerogels. J Colloid Inter Sci. Jan. 2007;305(1):124-32.
Sakka et al., The sol-gel transition in the hydrolysis of metal alkoxides in relation to the formation of glass fibers and films. J Non-Crystal Solid. Mar. 1982;48(1):31-46.
Sakka et al., Formation of sheets and coating films from alkoxide solutions. J Non-Crystal Solid. Feb. 1984;63 (1-2):223-35.
Scheuerpflug et al., Apparent thermal conductivity of evacuated SiO2-aerogel tiles under variation of radiative boundary conditions. Int J Heat Mass Transfer. 1985;28(12):2299-306.
Sequeira et al., Synthesis and characterisation of cellulose/silica hybrids obtained by heteropoly acid catalysed sol-gel process. Mater Sci Eng: C. Jan. 2007;27(1):172-9.
Sequeira et al., Preparation and properties of cellulose/silica hybrid composites. Polymer Composites. Sep. 2009;30(9):1275-82.
Stober et al., Controlled growth of monodisperse silica spheres in the micron size range. J Colloid Inter Sci. Jan. 1968;26(1):62-9.
Tekin et al., Responsive microgrooves for the formation of harvestable tissue constructs. Langmuir. 2011;27(9):5671-9.
Vozar, L., A computer-controlled apparatus for thermal conductivity measurement by the transient hot wire method. J Therm Anal Calorimetry. 1996;46(2):495-505.
Wei et al., Preparation of monolithic silica aerogel of low thermal conductivity by ambient pressure drying. J Am Ceram Soc. Jul. 2007;90(7):2003-7.
Wittwer, V., Development of aerogel windows. Journal of Non-Crystalline Solids. 1992;145:233-36.
Woignier et al., Analysis of the elastic behaviour of silica aerogels taken as a percolating system. J Phys France. 1988;49:289-93.
Woigner et al., Parameters affecting elastic properties of silica aerogels. Better Ceramics Through Chemistry III: Symposium held Apr. 5-8, 1988, Reno, Nevada, U.S.A. Brinker et al., eds. Materials Research Society, Pittsburgh, PA, 1988, pp. 697-702.

(56) References Cited

OTHER PUBLICATIONS

Woignier et al., Parameters affecting elastic properties of silica aerogels. Journal of Materials Research. May / Jun. 1989;4(3):688-92.

Woignier et al., Different kinds of structure in aerogels: relationships with the mechanical properties. J Non-Crystal Solid. Nov. 1998;241(1):45-52.

Yeh et al., Micromolding of shape-controlled, harvestable cell-laden hydrogels. Biomaterials. 2006;27:5391-8.

Zarzycki et al., Synthesis of glasses from gels: the problem of monolithic gels. J Materials Science. 1982;17 (11):3371-9.

Zuo et al., Preparation of silica aerogels with improved mechanical properties and extremely low thermal conductives through modified sol-gel process. Department of Mechanical Engineering, Massacusetts Institute of Technology. Masters thesis. Jun. 2010, 96 pages.

* cited by examiner ns and page number.

SILICA AEROGELS AND THEIR PREPARATION

This application claims the benefit of Provisional Application No. 61/372,315 filed Aug. 10, 2010, which is incorporated by reference in its entirety.

BACKGROUND OF THE INVENTION

The technical field of this invention is chemical synthesis and, in particular, synthesis of silica aerogels by sol-gel processes, and aerogel compositions made by these techniques.

Silica aerogels have attracted the attention of researchers in various fields of science and technology. Silica aerogels have been referred as "frozen smoke" by their nebulous appearance. Silica aerogels will appear yellowish if a light source is viewed through them, and appear light blue under sunlight. Both phenomena are due to Rayleigh scattering, which results from micro porous structures. Typical silica aerogels consist of nano-sized open pores with extremely low densities (0.003-0.35 g/cm$^3$) and large surface area (200-1600 m$^2$/g). As a result of their unique microstructure, silica aerogels exhibit many fascinating physical properties, such as extremely low thermal conductivity, low acoustic velocity, low dielectric constant, tunable refractive index, etc.

The first application of silica aerogel was reported for the use in Cerenkov detectors based on the ability of tunable refractive index from 1.01 to 1.2 and this essentially helps to replace the use of compressed gas as the detection media. Another interesting application of silica aerogels is for acoustic impedance matching devices due to their various and rather low acoustic impedance values from different combinations of sound propagation velocities and densities. Yet, another promising application of silica aerogels is their use in thermal insulations. Transparent or translucent aerogels can be used as spacers in windows for day light applications and improve the use of solar energy, since the aerogels insulation is very effective. The non-transparent aerogels have complementary applications where transparency is not required, such as refrigerators, heat storage devices and building insulations.

The process to produce silica aerogels is called sol-gel process. In a sol-gel process, a solution of silicate precursors undergoes changing from monomers to sol colloidal particles, which cross link into three-dimensional networks. It has been known that the structure of gel network and the physical properties of silica aerogels strongly depend on the preparation of precursors' solutions and the chemical reaction conditions during sol-gel process. Silica aerogels of the present invention are produced from sol-gel process based on either 1-step acid or basic method, or 2-step acid-basic method. Because of the dependency of the hydrolysis and condensation reaction on the pH, sol particles will grow through derived models called reaction limited cluster aggregation (RLCA) under acid condition, or reaction limited monomer cluster growth (RLMC) under basic condition. Usually, polymeric-like network with small pores is formed under acid condition owing to the entanglement of less branched long chains, while, under basic condition, highly condensed structure with larger pores is formed from the aggregation of larger clusters. With the 2-step sol-gel method, a more deliberate control of the network structure has been realized, and production of silica aerogels with lower density and better transparency becomes possible.

A distinctive characteristic property of silica aerogels is the brittleness, resulting from their complex microstructure, so the compressive/tensile strength and elastic modulus of silica aerogels are very low. It is believed that the mechanical properties of silica aerogels are strongly dependent on the degree of network connectivity resulting from various sol-gel processing conditions. For example, it has been reported that silica aerogels prepared under acid or neutral catalytic conditions will appear twice stiffer than the aerogels prepared under base catalytic condition. Aging treatment after the gelation can change the gel network strength thus making gels more sustainable to the capillary stresses, and improving their mechanical properties. Recent investigations have also shown that organically modified aerogels can have improved elastic properties. However, there still exists a need for improvements to the mechanical properties of silica aerogels to make them sufficiently strong and robust for many desired applications.

The most attracting property of silica aerogels is their extraordinarily low thermal conductivities. The total thermal conductivity of silica aerogels consists of three components: solid conduction, gas conduction and radiation. The solid conduction will increase with increasing density, while gas and radiation transports will decrease. In order to further minimize the thermal conductivity, evacuated silica aerogels have been investigated and a thermal conductivity of 0.010 W/m·K has been reported, comparing to 0.020 W/m·K with air. Another approach is to reduce the radiation transport with addition infrared opacifiers, such as carbon. At ambient pressure, the addition of carbon could lower the thermal conductivity to 0.0135 W/m·K and ~0.0042 W/m·K under vacuum condition.

To date, researchers only have some fundamental understandings of the chemistry-structure-properties relationships of silica aerogels, however, most aerogels are still prepared empirically, and it is far away from chemically designed aerogel properties. Thus, the need for in depth understanding and better control of the chemical processes during gel network formation is needed. Furthermore, to promote and extend silica aerogels' applications, it is necessary to reinforce the mechanical properties of silica aerogels while retaining their fascinating properties, especially low thermal conductivities.

SUMMARY OF THE INVENTION

Silica aerogels with improved properties are disclosed together with methods for synthesizing such aerogels. The improved properties include lower thermal conductivity (better insulating capacity), lower acoustic velocity, lower dielectric constant and improved ductility. Greater tenability of the refractive index can also be achieved. Generally speaking, the improvements arise from control of the synthesis to create a morphology of primary clusters and diverse-sized secondary clusters of dense silica aerogels separated by less densely packed regions. This morphology provides an aerogel having a distribution of pore sizes ranging from below about 5 nm to about 50 nm. By providing diverse-sized secondary clusters with regions of loose connectivity between the clusters and with a broad distribution of pore sizes and/or pore sizes, reductions can be achieved in thermal conductivity and flexural modulus.

In one aspect of the invention, improvements are disclosed to the sol-gel process to control aerogel characteristics, e.g., diverse pore sizes. In some embodiments, the process is used to form a silica aerogel having a porosity of greater than about 80 percent. In some embodiment, the process is used to form a silica aerogel having a surface area greater than about 800 m$^2$/g. In some embodiment, the process is used to form a silica aerogel having a thermal conductivity less than about 11 mW/mK at one atmosphere of pressure.

Using either a two-step or three-step process, different catalysts are used to control hydrolysis, condensation and gelation. In one illustrative embodiment, an organosilicate precursor, for instance a tetraalkyl orthosilicate such as tetraethyl orthosilicate (TEOS), is hydrolyzed under acid conditions, e.g. using a hydrochloric acid (HCl) catalyst and sub-stoichiometry water, to form silanol groups. Alternatively, hydrolysis can be performed under basic conditions. The silanol moieties are then condensed with a basic catalyst, e.g., ammonia, in an organic, preferably polar organic, solvent, e.g., ethanol (EtOH), to form a polymeric silicate. (In some instances, it can be desirable to have a basic catalyst to silica ratio of at least 0.004.) Gelation can then proceed simultaneously, or shortly thereafter, for instance in a separate step, using ammonium fluoride ($NH_4F$) or another suitable fluoride salt as a gelling agent. In some embodiments, the use of a basic catalyst and a fluoride salt to catalyze one or more of the steps of condensing and gelling can result in silica aerogels with enhanced properties.

It has also been found that the desired aerogel morphology of diverse-sized secondary clusters can be enhanced by high concentrations of the organic solvent, e.g., EtOH, during condensation. In one embodiment, a molar ratio of at least about 6:1, or more preferably greater than about 7:1 or 8:1 of organic solvent to silicon (EtOH:Si in certain embodiments) can be advantageous.

Exposure of the condensed silicate to fluoride ions, e.g., by using $NH_4F$ (or another suitable fluoride salt or combinations of such salts) during gelation likewise improves the morphology. While not being bound by any particular theory, the effects on both of the yield strength and flexural modulus of silica aerogel by the molar ratio of $NH_4F$:Si are believed to be explained by the catalytic effects of F— on the condensation rate. F— catalyzed condensations involves the displacement of OH— with F—, which is more electron-withdrawing than OH—. The replacement of F— with OH— causes a reduction in the electron density of Si, thereby making nucleophilic attack from the other OH— groups much easier to occur and increasing condensation rate. Also, a shorter gelation time has been observed with increasing molar ratio of $NH_4F$:Si. Therefore, gel networks produced from higher molar ratios of $NH_4F$:Si are mainly composed of highly branched clusters with loose connectivity and larger pore volume, which contributes to lower yield strength and flexural modulus.

Silica aerogels are disclosed that demonstrate lower thermal conductivities (e.g., thermal conductivities measured by a transient hot wire method such as described herein) than previously reported for similar materials within the same range of densities. Aerogels are disclosed having a thermal conductivity less about 14 milliwatts/meter·Kelvin (mW/mK), preferably less about 13 mW/mK, 12 mW/mK, 11 mW/mK, 10 mW/mK or even less than 9 mW/mK, at one atmosphere or less of pressure. Even better results have been demonstrated under evacuated conditions. For example, thermal conductivities less about 5 mW/mK, and in some instances less than 4 mW/mK are report at 0.1 atmospheres of pressure.

Similarly, silica aerogels are disclosed that demonstrate a lower flexural modulus than previously reported for similar materials within the same range of densities. The flexural modulus is the ratio of stress to strain in flexural deformation, or the tendency for a material to bend. Because of the lower flexural modulus, the aerogels of the present invention are better able to bend or compress in response to applied forces, improvements of 2~4 times in ductility have been observed.

In some embodiments, the aerogel compositions of the present invention can exhibit a flexural modulus less about $1 \times 10^6$ Pascal and an aerogel bulk density between about 0.08 $g/cm^3$ and about 0.12 $g/cm^3$.

In one embodiment, a method of forming a silica aerogel composition can be conducted by hydrolyzing an organosilicate precursor to form silanol groups under acidic conditions, condensing the silanol groups with a basic catalyst of molar ratio to silica at least 0.004 to form a polymeric silicate under conditions that promote formation of a diverse range of pore sizes, and gelling the polymeric silicate such that a morphology of primary and diverse-sized secondary silicate clusters is achieved. This can include sub-stoichiometric water and acid conditions.

In an embodiment, a method of forming a silica aerogel composition can be conducted by hydrolyzing an organosilicate precursor to form silanol groups with a sub-stoichiometric water under acid condition, condensing the silanol groups with a fluoride catalyst of molar ratio to silica at least 0.004 to form a polymeric silicate under conditions that promote formation of a diverse range of pose sizes, and gelling the polymeric silicate such a morphology of primary and diverse-sized secondary silicate clusters is achieved.

In an embodiment, a method of forming a silica aerogel composition can be conducted by hydrolyzing a organosilicate precursor to form silanol groups (preferably with subs-toichiometric water under acid conditions), following with condensing the silanol groups with a basic catalyst of molar ratio to silica of at least 0.002, then with accelerated condensation and gelation catalyzed by fluoride catalyst of molar ratio to silica at least 0.002 to form a polymeric silicate under conditions that promote formation of a diverse range of pose sizes, and gelling the polymeric silicate such a morphology of primary and diverse-sized secondary silicate clusters is achieved.

BRIEF DESCRIPTION OF THE FIGURES

The invention will be more fully understood from the following detailed description taken in conjunction with the accompanying drawings, in which.

DETAILED DESCRIPTION

Figure 1:
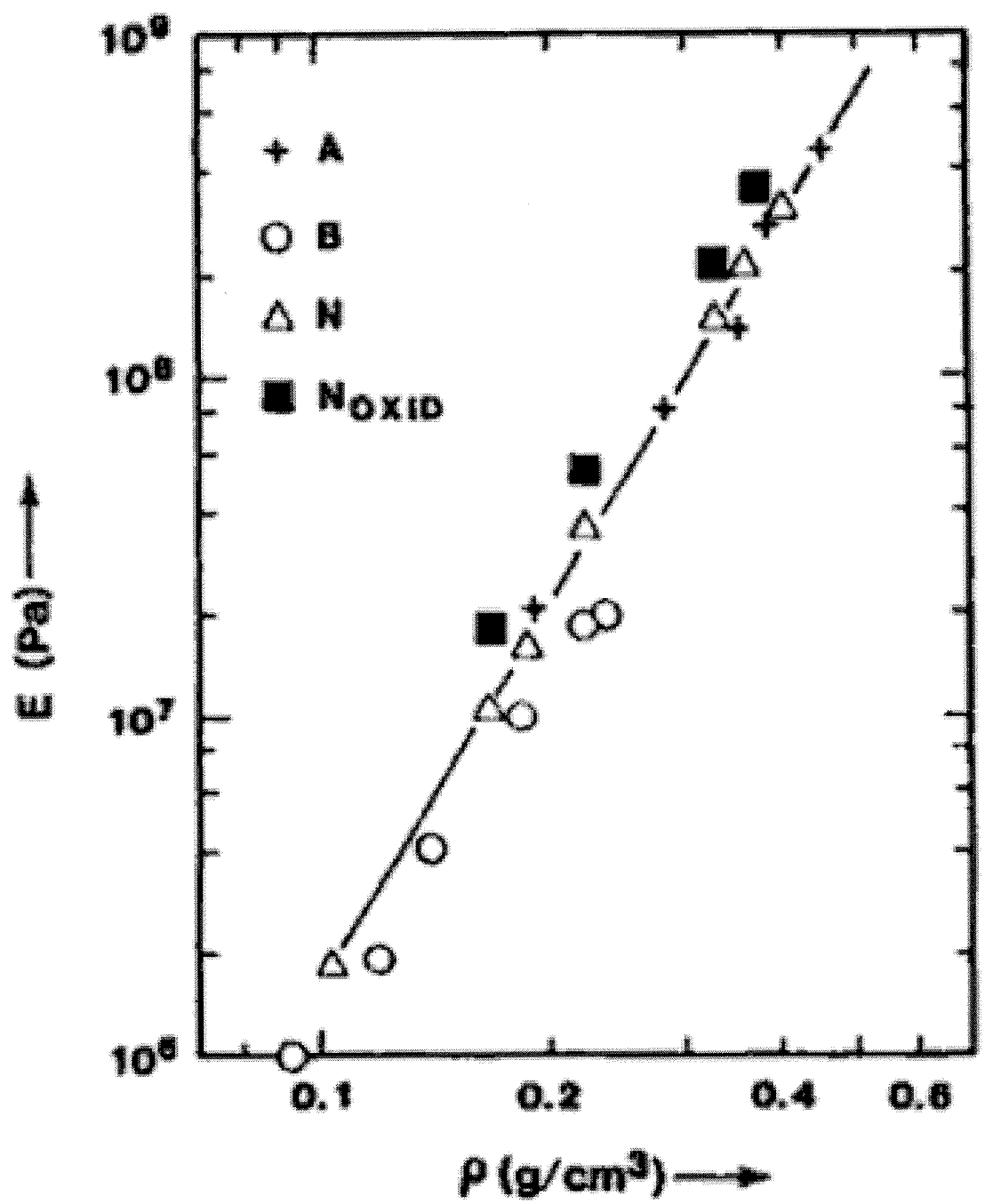
FIG. 1 is a log-log plot of Young's modulus vs. bulk density for aerogels prepared from TMOS hydrolyzed under neutral (N), acid (A) or base (B) conditions. Oxidation treatment (NOXID) was at 500° C.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Silica aerogels hold the lowest thermal conductivity record in solid materials. The most attracting and promising application for silica aerogels is thermal insulation. Aspen Aerogels produces a family of products based on fiber reinforced silica aerogels, such as Spaceloft™ Pyrogel®, and Cryogel™, for fire protections, pipeline insulations. Thermal conductivity and the corresponding thermal resistance comparisons between those silica aerogels' products and other conventional insulation materials at ambient temperature and pressure are recorded in the art. However, since their products are produced from aerogel granules, two problems including significant volume shrinkage and consistently rerelease of silica dust during applications are still bothering Aspen Aerogels' scientists. Thus, monolithic silica aerogels with lower thermal conductivities (<14 mW/mK or more preferably less than 10 mW/mK) and higher R-values, and having a mechanically robust structure and high environmental stability are desired to enhance energy efficiency of thermal insulation.

Silica aerogels are low-density materials and can be quite brittle. During the collapse of the solid network, the impact force spreads gradually over the bulk for a longer time. Additionally, silica aerogels are an open-cell porous material. During impact, gases rapidly pass through the pore network composed of narrow pores (20~50 nm) and absorb a considerable amount of energy by frictions. Therefore, the energy of impact is damped by the aerogels through the collapse of their solid structure and the release of gas from within the pores.

In comparison, many organic foams generate a significant amount of rebound during impact, which can do further damage to the object being protected. Silica aerogels with almost no bouncing effect are considered as an ideal candidate when developing materials for safety and protective devices.

Thus, silica aerogels that are open-cell porous materials with extraordinary low thermal conductivity are desired for structural thermal insulation. However, the fragility of silica aerogels makes prior silica aerogels impractical for structural applications. Making silica aerogels mechanically robust is critical for promoting thermal insulators.

Silica Aerogels

Silica aerogels with improved mechanical strength and flexibility have been obtained by organic cross-linking the skeletal structure of silica aerogels through bonding between surface silanol groups and organic groups, incorporating glass fibers, and employing trifunctional silicon compounds as precursors. However, several disadvantages have been observed, such as increased density, decreased surface area, and reduction in thermal insulation ability. Hence, enhancing the mechanical properties of silica aerogels while retaining their low thermal conductivity becomes increasingly more important for thermal insulations.

The silica aerogels of the present invention are mesoporous materials consisting of a network of interconnected primary clusters with numerous remarkable properties, for example, low densities (0.06-0.15 g/cm$^3$), high surface area (800-1000 m$^2$/g), high porosity (>90%), excellent sound damping and low thermal conductivities (0.008~0.011 W/mK) under ambient condition. The aerogels can be described as having a morphology of primary clusters and secondary clusters.

As used herein the phrase "primary clusters" can be interchanged with the term "particle" and means the size of the small polymeric particle. The primary cluster generally has a particle diameter of between 1 and 10 nm. In some embodiments, the diameter is between 2 and 5 nm. However, this can be modified under various conditions. The primary cluster is porous, having internal pores.

"Secondary clusters" are formed when the primary clusters connect with each other to form bundles or clusters. Each secondary cluster consists of at least several nanoparticles with different connections. Some connections are tight and dense and some are looser. The secondary clusters, in addition to the internal pores from the primary structure, will have pores formed between the primary clusters. As the cluster increases the connectivity within the cluster and becomes more branched, larger pores form. By providing a broader range of secondary clusters and/or pore sizes and loose connectivity between clusters, reductions can be achieved in thermal conductivity and flexural modulus.

The porosity of the silica aerogel is greater than about 80 percent. In one embodiment, the porosity of the silica aerogel is greater than about 90 percent. In another embodiment, the porosity of the silica aerogel is greater than about 94 percent. In one embodiment, the porosity is greater than 80%, 85%, 90%, 91%, 92%, 93%, 94%, or greater than 95%. Preferably, the porosity is measured using BET analysis.

The average pore size of the silica aerogel is preferably between 1 nm and 100 nm. In one embodiment, the average pore size is between 5 and 50 nm, 10 and 30 nm or between 15 and 25 nm.

As used herein, diverse-sized, when referring to diverse-sized secondary silicate clusters means that the secondary cluster has a range of sizes, from several primary clusters to about 100 nm or more particularly to about 50 nm or, in some embodiments, to about 20 nm. The diverse-sized secondary clusters can have varying density. The connectivity between the various clusters can be varied.

A diverse range of pore sizes, as used herein, means that the pore size distribution preferably ranges from below 5 nm to above 30 nm, from below 5 nm to above 50 nm, from below 3 nm to above 60 nm, or from below 5 to above 66 nm.

In one embodiment, the diverse range of pore sizes is described by the full-width-half-max (FWHM) of the pore width. Preferably, the FWHM is at least 30 nm wide. In other embodiments, the FWHM of the pore size distribution is at least 40, 50, 60, or even 70 nm wide.

The surface area of the silica aerogel composition is preferably greater than about 800 $m^2/g$. In one embodiment, the surface area is greater than about 1000 $m^2/g$. In one embodiment, the surface area is greater than 800 $m^2/g$, 900 $m^2/g$, 1000 $m^2/g$, or even higher. In one embodiment, the surface area is measured using BET.

The thermal conductivity, which is related to the aerogel density, is less about 14 mW/mK at one atmosphere of pressure (ATM). In one embodiment, the thermal conductivity is less than about 11 mW/mK at 1 ATM. In one embodiment, the thermal conductivity is less than 14 mW/mK at 1 ATM, 13 mW/mK at 1 ATM, 12 mW/mK at 1 ATM, 11 mW/mK at 1 ATM, 10.5 mW/mK at 1 ATM, 10.0 mW/mK at 1 ATM, 9.5 mW/mK at 1 ATM, or less than 9.0 mW/mK at 1 ATM. In another embodiment, the thermal conductivity is less than 6 mW/mK at 0.1 ATM, 5 mW/mK at 0.1 ATM, 4 mW/mK at 0.1 ATM, or less than 3 mW/mK at 0.1 ATM. In one embodiment, the thermal conductivity of the aerogel is measured using a transient hot wire method.

The flexural modulus is preferably less than about $5 \times 10^6$ Pascal. In one embodiment, the flexural modulus is less than about $2 \times 10^6$ Pascal. In another embodiment, the flexural modulus is less than about $1 \times 10^6$ Pascal. In another embodiment, the flexural modulus is less than 5, 4, 3, 2, 1, 0.9, 0.8, 0.7, 0.6, 0.5, 0.4, or $0.3 \times 10^6$ Pascal. In one embodiment, the flexural modulus is measured by the 3-point bending technique.

The bulk density of the silica aerogel is preferably between 0.003 and 1.0 $g/cm^3$. In one embodiment, the bulk density is less than about 0.15 $g/cm^3$. In another embodiment, the bulk density is less than about 0.1 $g/cm^3$. In yet other embodiments, the bulk density is less than 0.2 $g/cm^3$, 0.18 $g/cm^3$, 0.15 $g/cm^3$, 0.14 $g/cm^3$, 0.13 $g/cm^3$, 0.12 $g/cm^3$, 0.11 $g/cm^3$, or 0.010 $g/cm^3$. In one embodiment, the bulk density is between about 0.01 $g/cm^3$ and about 0.25 $g/cm^3$. In another embodiment, the bulk density is between about 0.05 $g/cm^3$ and about 0.20 $g/cm^3$. In another embodiment, the bulk density is between about 0.06 $g/cm^3$ and about 0.15 $g/cm^3$. In yet another embodiment, the bulk density is between about 0.08 $g/cm^3$ and about 0.12 $g/cm^3$.

Among exemplary applications, an important application is for thermal insulation. The fragility of prior silica aerogels made them impractical for structural applications, though silica aerogels have been discovered for over 70 years. Thus, silica aerogels as described herein which are mechanically robust are particularly useful for thermal insulation. These silica aerogels can have improved ductility which, in some applications, is critical.

Aerogel composites, for example aerogels reinforced with polymer coatings or aerogels embedded with magnetic nanoparticles, are also included in the claimed invention to the extent they retain the high porosity, high surface area, and low thermal conductivity of the silica aerogel as described here.

Aerogel Synthesis

Sol-gel processing starts from the formation of sols. A sol is a colloidal suspension of solid particles in liquid phase, where the particles usually have sizes ranging from several nanometers to thousands of nanometers. A gel is a substance that contains continuous solid skeleton with enclosed continuous liquid phase; see Brinker and Scherer (Sol-Gel Science: The Physics and Chemistry of Sol-Gel Processing (Academic Press, Inc.: New York, 1990)). Silicon alkoxides are the commonly used precursors with organic ligands attached to silica atom, such as tetramethyl orthosilicate (TMOS) and tetraethyl orthosilicate (TEOS). The typical four steps for sol-gel processes include: (1) hydrolysis of silica precursors, (2) condensation and gelation, (3) aging of the gel, and (4) drying of the gel. The first step to synthesize silica aerogels is to prepare sol particles' suspension, which is produced from chemical reactions of precursors. Then linkages among particles are formed leading to the formation of gel network that spans the entire liquid phase, so as to produce wet gels. The wet gels are then aged and dried, and finally silica aerogels are ready.

Synthesis conditions (for example, the ratio of H2O:Si, the type and concentration of catalyst, and solvent, temperature, etc.) during sol-gel process strongly affect the resulting structure of gel network and the physical properties of silica aerogels, see Brinker and Scherer; Wright and Sommerdjik. Thus, those sol-gel parameters also determine the kinetics and mechanism of sol-gel chemical reactions, as well as the generation and aggregation of the particles or clusters, involving in formations of various gel 3-D structures.

Historically, silica aerogels have been produced from sol-gel processes based on either 1-step acid or basic method, or 2-step acid-basic method. Usually, polymeric-like network with small pores is formed under acid conditions owing to the entanglement of less branched long chains, while under basic conditions, highly branched polymeric structure with larger pores is formed from the aggregation of larger clusters. Since the connectivity of gel network resulting from various sol-gel processing largely determines the mechanical properties of silica aerogels, many researchers have been working on increasing the particle or clusters' connectivity of silica aerogels through structure modifications such as addition of polymer crosslinkers and fibers to modify the mechanical properties of aerogels.

In addition to the novel aerogels, the present invention provides novel methods of forming silica aerogel compositions using a two or three step process of (a) hydrolyzing an organosilicate precursor to form silanol groups under acid condition, (b) condensing the silanol groups with a catalyst to form a polymeric silicate under conditions that promote formation of a diverse range of pose sizes, and (c) gelling the polymeric silicate.

The organosilicate precursor may be, for example, TMOS, TEOS, or derivatives of TMOS or TEOS such as MTMS (methyltrimethoxysilane) or MTES (methyltriethoxysilane). Compared with tetrafunctional silicon alkoxides, each silicon atom in trifunctional silicon compounds such as MTMS (methyltrimethoxysilane) and MTES (methyltriethoxysilane) only has three possible oxygen bridges connected to other silicon atoms during sol-gel reactions, with the fourth bond terminated by a methyl or ethyl group that doesn't connect to anything else. The presence of non-polar alkyl groups (i.e. methyl) attached to silica polymer chains formed from tri-functional alkoxides minimize the inter-chain cohesion and make the gel particles with reduced overall bonding resulting in the elastic and flexible three-dimensional gel network. Moreover, the methyl or ethyl groups attached to each silicon atom contribute to the superhydrophobicity.

The silicate precursor is hydrolyzed under acid conditions. The organosilicate precursor may be hydrolyzing by any method known in the art under acid conditions. Hydrolysis under acidic conditions is catalyzed, for example, by the hydronium ion. It is also known that, hydrogen bonding can occur between solvent molecules and hydronium ions under acid catalytic condition. The hydrogen bonding thus adversely affects the hydrolysis. Hence, protic solvents under acid condition generally make hydronium ions more electrophilic. Therefore, hydrolysis can be decelerated with protic solvent under acid-catalyzed conditions.

In one embodiment, acid conditions is a pH of 1-6.9. In another embodiment, acid conditions is a pH of 2-6. In another embodiment, acid conditions are preferably from 3-5.

In another embodiment, acid conditions are preferably from 6-6.9. For example, the hydrolysis may occur in the presence of HCl HI, HBr, HClO4, HNO3, H2SO4, CH3COOH, HCOOH, HCN, or HNO2. One preferred embodiment includes hydrolyzing with a sub-stoichiometric water in HCl.

During hydrolysis, precursors such as silicon alkoxides react with water to form silanols through the replacements of alkoxyl ligands (—OR) by hydroxyl groups (—OH). Depending on the type and the amount of catalysts being used, either complete hydrolysis or partial hydrolysis occurs. Complete hydrolysis means substantially all —OR groups have been replaced by —OH, while partial hydrolysis produces molecules with composition of Si(OH)n (OR)4−n, where n<4.

After hydrolysis, the silanols may be deprotonated or protonated for condensation. The deprotonated silanols are induced to form hydrogen bonding with solvent molecules in protic solvents, as are the protonated silanols with solvent molecules in aprotic solvent. Therefore, increasing protic solvent concentration can decrease the condensation rate under base-catalyzed condensations while increasing aprotic solvent concentration can increase the base-catalyzed condensation rate.

Molecules from the hydrolysis step link together through condensation reactions, either by water condensation or alcohol condensation. These condensation reactions progress and lead to polymerization. Once the size of molecules reaches to the macroscopic level, gelation occurs. Gel point is the time when the last bond is formed that completes giant molecule. For sol-gel process, different shapes of wet gels can be obtained by using various molds. Usually, monolithic aerogels have dimensions at least larger than millimeters.

After hydrolyzing the silicate precursor under acid conditions, the silanol groups are condensed to form a polymeric silicate. During the condensation step, the silanol groups link with each other to form siloxane bonds (Si—O—Si) while releasing water or alcohol during condensation. Since alkoxysilanes are not miscible with water, a co-solvent (such as alcohol) is generally added to prevent phase separation. But, it should be noticed that, since alcohol are by-products of hydrolysis step, once hydrolysis has proceeded, the initial phase separated system could also be homogenized even without addition of extra alcohol.

Thus, in the condensing step of the present invention, an organic solvent, water, and a catalyst are added. The condensation occurs in a basic environment. Preferably, during condensation the pH is 7-11. In one embodiment, the pH is 8-11. In another embodiment, the pH is 8-9. The organic solvent is added having a molar ratio of organic solvent to silica of at least 5:1. In some embodiments, it is preferably at greater than 6:1, 7:1, 8:1, 9:1, 10:1, 12:1, 15:1, 18:1, 20:1, 25:1 or more. An exemplary organic solvent is ethanol. In some embodiments, the organic solvent is added at a ratio of 2:1, 3:1, or 4:1. The water is added during the condensing step is preferably at a stoichiometric excess. In one embodiment, the water is added at a molar ratio of water to silica a ratio of 4:1.

The condensing step preferably uses a catalyst which is a basic catalyst, a fluoride, or a fluoride salt. The basic catalyst may be, for example, ammonia. The fluoride catalyst has an active component which is the anion F—, and may be any fluoride catalyst known in the art. In one embodiment, the fluoride catalyst an ammonium fluoride. In one embodiment, the fluoride catalyst is a fluoride salt. In another embodiment, a fluoride salt is combined with a hydroxide.

The amount of catalyst added during the condensing step will be dependent on the type of catalyst used. When a fluoride catalyst is used, the molar ratio of fluoride catalyst to silica in the condensation is at least 0.001, 0.002, 0.003, 0.004, 0.005, 0.006, 0.007, or 0.008. In one embodiment, the molar ratio of fluoride catalyst to silica is at least 0.002. In one embodiment, the molar ratio of fluoride catalyst to silica is at least 0.004. In one embodiment, the molar ratio of fluoride catalyst to silica is between 0.002 and 0.006. When ammonia is used as a catalyst, the molar ratio of ammonia catalyst to silica in the condensation is at least 0.001, 0.002, 0.003, 0.004, 0.005, 0.006, 0.007, or 0.008. In one embodiment, the molar ratio of ammonia to silica is at least 0.002. In one embodiment, the molar ratio of ammonia catalyst to silica is at least 0.004. In one embodiment, the molar ratio of ammonia to silica is between 0.002 and 0.006.

For condensation reactions, it has been proposed that typical condensation products consequently consist of monomer, dimer, linear trimer, cyclic trimer, cyclic tetramer, and higher order rings. Thus, during the condensation, there exists equilibrium between depolymerization (ring opening) and polymerization of monomers with the oligomeric species, and the equilibrium is dependent on the environmental pH. Under basic conditions, particles are ionized and mutually repulsive, thus, particles are preferentially growing through the addition of monomer to highly polymerized particles rather than aggregation among larger particles/clusters. In addition, the solubility of silica is much greater, and smaller particles are even more soluble than larger particles, thus the gel networks are primarily composed of larger size particles, which eventually lead to the formation of gels with large pores.

Another effect of solvent in the condensation reaction is the ability to promote depolymerization during condensations. Depolymerizations are suppressed during condensations, crosslinked gel networks consisting of branched polymeric particles/clusters are formed. Whereas, with depolymerizations, highly condensed particles/clusters are produced, which yields relatively higher density and rigid gel structures. This can be further explained as follows. Under base-catalyzed condensations, the aprotic solvent molecules are unable to form hydrogen bonding to OH—, enabling OH— to be an even stronger nucleophile, which promotes restructuring and produces more highly condensed particles. (Iler, The Chemistry of Silica (Wiley, New York, 1979))

In some embodiments, the condensation reaction is catalyzed by the fluoride ion. F— has catalytic effects on the rate of condensation reactions. A proposed mechanism for F— catalyzed condensations involves the displacement of OH— with F—, causing localized attractions to surrounding silanol groups, thus promoting the condensations. Also, since F— is more electron-withdrawing than OH—, so the replacement of F— with OH— will cause reduction in the electron density of Si, thereby making nucleophilic attack from the other OH— groups much more facile.

The alkyl groups in silicon alkoxides are hydrophobic, causing phase separation during the initial mixing stage of precursors. Thus, solvents are added to prevent the happening of phase separation. It has shown that the addition of solvent will also influence the reactions kinetics. Solvents are classified as polar or non polar and as protic (containing labile proton) or aprotic. Polarity, dipole moment and availability of labile protons are most important characteristics of solvents. Polar solvents, such as water, alcohol or formamide, are normally used to solvate tetra functional silicon alkoxides in sol-gel processing. Ether alcohols, such as methyl alcohol and ethyl alcohol, exhibit both polar and nonpolar characters and are often used in solutions containing both polar and nonpolar substances.

The phrase, "under conditions that promote formation of a diverse range of pose sizes" includes the conditions as described herein using a two-step sol-gel formation or a three-step process including two steps for the formation of the sol-gel and an additional gelation step.

In one embodiment, the conditions that promote the formation of a diverse range of pore sizes includes condensing the silanol groups after hydrolysis by adding an organic solvent having a molar ratio of organic solvent to silica of at least 5:1, a catalyst having a molar ratio of catalyst to silica of at least 0.001:1, and water at a stoichiometric excess to the silica. Since water is a by-product from the condensation step, theoretically, R=2 in the initial condition is sufficient for hydrolysis. Previous studies have shown that the R value ranging from 1 to 50 produces various gel structures. Sakka et al. (Better Ceramics Through Chemistry, eds, Brinker et al. (North-Holland, New York, 1984), pp. 91; J. of Non-Crystalline Solids 63 (1984), pp. 223; J. of Non-Crystalline Solids 48 (1982), pp. 31), found that hydrolysis of TEOS with R value of 1-2 and with catalyst under acidic condition (0.01M HCl) yields viscous and spinnable sol solutions. Spinnable solutions exhibit a power law dependence of the intrinsic viscosity as a function of the number average molecular weight, as demonstrated by Eq. (1):

$$[\eta] = k M_n^\alpha \tag{1}$$

where, $[\eta]$ is the intrinsic viscosity, $M_n$ is the molecular weight, and k and $\alpha$ are constants for a given polymer-solvent system.

In the above equation, when a ranges from 0.5 to 1.0, it indicates linear or chain molecules. While, the reaction solution with R values larger than 2 produce unspinnable solution, and values of $\alpha$ ranging from 0.1~0.5 indicate spherical or disk shaped particles. SiO2 powders were prepared from hydrolysis of TEOS with R values varying from 20~50 under basic conditions.

In one embodiment, the conditions that promote the formation of a diverse range of pore sizes includes condensing the silanol groups after hydrolysis by adding an organic solvent having a molar ratio of organic solvent to silica of at least 7:1, a catalyst having a molar ratio of catalyst to silica of at least 0.002:1, and water having a molar ratio of water to silica of at least 2:1.

As used herein a basic catalyst includes mildly basic catalysts such as sodium carbonate, sodium hydroxide, or potassium carbonate or strongly basic catalysts such as ammonia or ammonia or fluoride. In some embodiments the basic catalyst is ammonia. In some embodiments, the basic catalyst may be a mixed catalyst. In some embodiments the basic catalyst is ammonia and a fluoride such as $NH_4F$ and $NH_4OH$.

The gelling step may also be performed with a fluoride catalyst and optionally may also include the addition of a hydroxide ion. The fluoride catalyst used in the gelation step may be, for example, ammonium fluoride or sodium fluoride. In one embodiment, the fluoride catalyst an ammonium fluoride. In one embodiment, the fluoride catalyst is a fluoride salt. In another embodiment, the fluoride salt is combined with a hydroxide. The ratio of fluoride catalyst to silica in the gelation step may vary depending on the reaction and the catalyst used. In some embodiments, the molar ratio to silica at least 0.001, 0.002, 0.003, 0.004, 0.005, 0.006, 0.007, or 0.008. In one embodiment, the molar ratio of fluoride catalyst to silica is at least 0.002. In another embodiment, the molar ratio of fluoride catalyst to silica is at least 0.004. In yet other embodiments, the molar ratio of fluoride catalyst to silica is between 0.002 and 0.006.

Sol-Gel Formation—Aging and Drying

It should be pointed out that chemical reactions do not stop at the gel point, and the wet gels are preferably placed under aging for some period of time before being dried. For wet gels, the sol particles within the gel network are still reactive and could form further cross-links with the reactive sites in surroundings. The residue of the small sol particles either continues cross-linking among each other to form larger particles or reacts with the surface hydroxyl groups of gel networks. During aging, covalent bonding replaces the non-covalent bonding resulting in weak forces such as Van der Waals forces, and wet gels shrink slightly. Thus, the strength of the gel network is enhanced.

The wet gel networks have porous structures. During aging, some physical processes such as ripening or coarsening occur and favor pore structures with more rigidity. For the individual particle, it has a positive surface curvature (r+), while the region around the narrow neck has a negative curvature (r−). A pressure gradient is generated across regions with different curvatures, resulting in different solubility of the material in those regions from the following equation:

$$S = S_0 \exp\left(\frac{2\gamma_{SL} V_m}{RTr}\right) \tag{2}$$

Where, S is the curved surface solubility, $S_0$ is the flat surface solubility, $\gamma_{SL}$ is the interfacial tension, V is the solid molar volume and T is the temperature, R is universal gas constant.

From Equation (1), it can be seen that the substance within particles has a higher solubility than the substance around narrow "neck" regions. Therefore, materials tend to accumulate toward to the narrow neck region, and the strength of pore walls is enhanced.

It should be noted that the aging step also provides the means to further modify the gel structures to tune the aerogels' functionalities.

Wet silica gels are porous materials with liquid inside the pores. When liquid is removed by evaporation or boiling, the capillary stresses are so strong that the gel networks shrink significantly and the pore structures collapse. Several methods have been developed to overcome the structure changes during drying. One is to add surfactants into the liquid to reduce the interfacial energy and to decrease the capillary stress. Both cracking and shrinkage could be reduced by addition of surfactants. Another method is the use of drying control chemical additives (DCCA), such as formamide ($NH_2CHO$), oxalicacid (HOOCCOOH), dimethyformide (DMA) and acetonitrile. Formamide enables the gels to be harder, allows the pores to be larger, and allows for more uniform pore distribution. Additionally, coarsening during the aging step could also be promoted by hydrolysis of formamide. The two methods help the reduction of gel shrinkage and cracking. However, the additives involved by these two methods are very difficult to remove and may make the aerogel unhygienic.

Kistler (*Nature* 127 (1931), pp. 741) provides a drying method, supercritical drying, a widely used method in current sol-gel process. The fundamental mechanism for the method is that the capillary stresses could be avoided by removing the liquid from the pores under the condition above the liquid critical point (Tc, Pc), where there is no distinction between liquid phase and vapor phase and thus no capillary stresses in the pores. Table I lists the critical points for several solvents, see Brinker and Scherer. Nowadays, supercritical carbon dioxide with much milder required drying conditions (critical point of $CO_2$ is 31.1° C. at 1070 psi) is the most commonly used drying liquid. In the examples presented herein, a supercritical CO2 drying system has been employed to dry all the wet gels.

TABLE I

Critical Points of Selected Solvents.

| Substance | Formula | T c (° C.) | P c (MPa) |
|---|---|---|---|
| Carbon Dioxide | $CO_2$ | 31.1 | 7.36 |
| Freon 116 | $CF_3CF_3$ | 19.7 | 2.97 |
| Methanol | $CH_3OH$ | 240 | 7.93 |
| Ethanol | $C_2H_5OH$ | 243 | 6.36 |
| Water | $H_2O$ | 374 | 22.0 |

The high operating pressure during supercritical drying requires the drying system with specific design so as to avoid any leak, which is costly. Recently, ambient pressure drying has been investigated. In order to realize ambient pressure drying, pore surface modification and gel network strengthening have to be performed in advance to minimize the effects of capillary stresses. It should be emphasized that ambient pressure drying can only be performed for hydrophobic aerogels. In this case, surface modification should be conducted. Silylation is such a typical process.

In the surface silylation process, the hydroxyl groups (—OH) located on the surface of aerogel are replaced by —OR(R=alkyl group) functional groups, yielding aerogels hydrophobic. Some typical organosilylating agents are: methyltrimethoxysilane (MTMS), methyltriethoxysilane (MTES), dimethylchlorosilane (DMCS), trimethylethoxysilane (TMES), ethyltriethoxysilane (ETES), phenyltriethoxysilane (PTES), trimethylchlorosilane (TMCS), and hexamethyldisilazane (HMDZ). Since silylation is usually conducted in organic solvent environment, solvent exchange is necessary. The usage of large amount of organic solvent, and much longer preparation time for solvent exchange and surface modification together significantly increase the cost of ambient pressure drying process.

Freeze drying is another way to avoid the capillary stress during the removal of solvent from wet gel structures. In this case, solvents with low expansion coefficient and high sublimation pressure are needed. During freeze drying, solvent in the pores is frozen becomes solid, which is then removed under vacuum sublimation. However, it is very difficult to obtain monolithic silica aerogels under freeze drying, as the solvent recrystallizes inside the gel networks in freezing drying. These crystals expand and stretch, which cause the surrounding gel network, to break. Nonetheless, if the mechanical properties of silica aerogels can be improved favorably, freeze drying could become applicable for preparing monolithic silica aerogels.

Structural Modification of Silica Aerogels

The silica aerogels of the present invention may be modified either on their surfaces or throughout the aerogels.

Silica aerogels are open-cell porous materials with extraordinary low thermal conductivity (0.015 W/mK), even lower than still air (0.025 w/mK), making them desired for structural thermal insulations. However, the fragility of silica aerogels can make them impractical for structural applications. Therefore, making silica aerogels mechanically robust can be advantageous in promoting their applications.

Mostly, silica aerogels are produced from sol-gel process, which provides extensive opportunities for structure modifications of the gel network, thus, making silica aerogels more robust for applications. Silica aerogels have extremely high surface area ($\sim$1000 $m^2/g$) and high porosity (>90%), so the structure modification can be considered as surface modification as well. Until now, two different kinds of methods have been developed for surface modifications of silica aerogels: (1) Surface derivatization method and (2) Co-precursor method (see Dorcheh et al.).

For the surface derivatization method, wet silica gels are formed first, and then expose to aging solutions containing a mixture of solvent and the surface-modifying agent. Later on, mass transfer takes place through infiltration process leading to cross-linkings between silica skeleton and surface-modifying agent. Additionally, organic cross-linkers, such as epoxides, can be incorporated (see Gupta et al. and Meador et al.) and/or polystyrene (see Nguyen et al., Ilhan et al., and Mulik et al.) into the gel network. The covalent bonds formed between the silica skeleton and the organic crosslinkers could dramatically increase the strength of the resulting aerogels. But, those polymer-cross-linked aerogels usually have higher densities (i.e. 0.44 $g/cm^3$) and lower BET surface area (i.e. 171 $m^2/g$) (see Leventis). Thus a reduction in thermal insulation ability is expected. Besides, huge amounts of solvent and long process time are required to achieve complete solvent exchange and subsequent surface modifications, and it is very costly. For the co-precursor method, surface modifying agents or certain functional materials are added into the sol as co-precursors before gelation. Thus, comparing to the surface derivatization method, co-precursors method could produce gels with uniformly modified the surface structures contributing to high integrity in bulk properties, yet, requires less process time. Aspen Aerogels has been focusing on fabrication of fiber reinforced silica aerogels. So far, their production of mechanically robust, flexible aerogel blankets with lower thermal conductivity ($\sim$0.014 W/mK) are made of both inorganic and organic aerogels supported by meshes of polyimides (i.e., Nylon®), glass fibers, and many other materials, see U.S. Pat. No. 6,068,882 and U.S. Pat. Application No. 2007/0222116. However, instead of monolithic aerogels, silica granules are filled inside the aerogels' blanket and the continuously released aerogels' dust is hazardous.

In some embodiments, the silica aerogels of the present invention are particularly useful for medical uses. The enhancements of medical properties of silica aerogels can be realized through structure modifications. Since the silica aerogels of the present invention have extremely high surface area ($\sim$800 or $\sim$1000 $m^2/g$) and high porosity (>80% or >90%), the structure modification can be considered as surface modification as well. Generally, there are two different kinds of methods for surface modifications of silica aerogels: (1) Surface derivatization method and (2) Co-precursor method. For surface derivatization method, wet silica gels are formed first, and then put into aging solutions containing a mixture of solvent and the surface-modifying agent to allow mass transfer through the infiltration process. Usually, huge amounts of solvent and a long time will be required to achieve complete solvent exchange and subsequent surface modifications, which is very costly. For the second method, the surface modifying agent is added into the sol as co-precursor before gelation. Thus, comparing to the first method, the co-precursors method generally produces gels with uniformly modified surfaces as well as the bulk structures, and requires less time.

Surface derivatization through liquid-phase crosslinking to realize strength enhancements of silica aerogels, such as provide by Leventis et al. (*Chem. of Mater.* 11 (1999), pp. 2837 and *Nano Let.* 2 (2002), pp. 957)) may be used on the aerogels of the present invention. For example, the wet silica gels may be soaked in solutions containing diisocyanates-crosslinking agents and let the diisocyanates react with hydroxyl groups located on surface of silica particles to form carbamate bonds, which commonly exist in the polyurethane skeletons. After supercritical drying, the resulting aerogels may be much stronger than typical silica aerogels and allow the structure to bend without breaking. Other polymers may also be used to crosslink silica aerogel particles of the present invention by incorporating organic groups, such as epoxides and polystyrene as describe by Gupta and Ricci; Meador et al. and Nguyen et al., Ilhan et al., and Mulik et al. (*J. of Mater. Processing Tech.* 198 (2008), pp. 178; *Chem. of Mater.* 17 (2005), pp. 1085; *Appl. Mater. and Interfaces* 1 (2009), pp. 621; and *Chem. of Mater.* 20 (2008), pp. 5035). For example, silica particles may be encapsulated in epoxy resin by immersing wet silica gels into a resin-solvent mixture to obtain composites having compressive failure strain of over 25%. Styrene cross-linked silica aerogels with much improved elastic behaviors, recovering nearly 100% of their length after compression to 25% strain twice can also used in the present invention as described by Nguyen et al. Although silica aerogels with improved mechanical strength and flexibility have been produced through incorporating organic cross-linkers, several disadvantages have also been observed, such as increased density, decreased surface area, and reduced thermal insulation ability. Thus, the use of this embodiment is limited to areas where limiting such disadvantages is not critical.

Besides liquid phase cross-linking, structure modifications of silica aerogels can also be conducted after they have been already dried. Chemical Vapor Deposition (CVD) or Atomic Layer Deposition (ALD) can be employed to deposit a conformal polymer coating throughout the pore surface of silica aerogels. This method can be used to increase compressive strength with only a moderate increase in density.

Incorporating microfibers into the silica aerogel matrix of the present invention can be realized by adding fibers into the precursor sols before gelatin, and the resulting aerogels have significantly increased compressive strength and modulus. Precursor sols before gelation is another method to increase both of compressive strength and modulus. By incorporating short-cut natural fibers (~2 mm in length) within the aerogels the mechanical properties of aerogels can be increased. With 5 wt % fiber loadings, the compressive strength and modulus could be both increased by as much as 5 times, while the bulk densities can be increased by less than a factor of 2. One hypothesis is that the woven-like structure composed of clay aerogel "warp" and fiber "weft" materials seems to be responsible for the enhancements of the mechanical properties. Finlay et al., (*Ind. & Eng. Chem. Res.* 47 (2008), pp. 615). The aerogels as presently claimed may include fiber reinforcements as described in U.S. Pat. No. 6,068,882 and U.S. Pat. Pub. No. 2007/0222116, incorporated herein by reference. The production of mechanically robust, flexible aerogel blankets with lower thermal conductivity (~0.014 W/mK) may be made of both inorganic and organic aerogels supported by meshes of polyimides (i.e., Nylon®), glass fibers, and many other materials. Using aerogels for sub-sea oil pipelines insulation can significantly reduce the size of outer pipes and costs for shipping compared to polyurethane foams.

An exemplary structure modification of the aerogels of the present invention is provided in Example 13 where a 3-step method is used to enhance mechanical properties of silica aerogels through the addition of water-soluble inorganic synthetic nanocomposite.

In some embodiments, the non-silica addition to the silica aerogel, either through surface modification or structural modification is between 0 and 40%. In other embodiments, the non-silica addition to the silica aerogel is between 0 and 30%. In other embodiments, the non-silica addition to the silica aerogel is between 0 and 20%. In other embodiments, the non-silica addition to the silica aerogel is between 0 and 10%. In other embodiments, no additional binder, fiber, etc. is added to the silica aerogel.

Measurement of Silica Aerogel Properties

The elastic modulus of silica aerogels has been studied and measured using conventional three-point flexural techniques. It has been found that the elastic modulus has a strong relationship with pore volume, pore shape, skeleton density and bulk density. Woignier et al. (Better Ceramics Through Chemistry III, eds. C. J. Brinker, D. E. Clark, D. R. Ulrich (Materials Research Society, Pittsburgh, 1988), pp. 697; and J. de Physique 49 (1988), pp. 289) investigated the elastic properties of silica aerogel prepared from TMOS catalyzed under various conditions, namely, acidic, basic, or neutral. The data measured by three-point flexural method have been fitted and plotted, see FIG. 1 showing a Log-log plot of Young's modulus vs. bulk density for aerogels prepared from TMOS hydrolyzed under neutral (N), acid (A) or base (B) conditions. Oxidation treatment (NOXID) was at 500° C., see Woigner et al. FIG. 1 shows a power law relationship between aerogel's bulk density and Young's modulus:

$$E \propto \rho^{3.7 \pm 0.3} \tag{3}$$

This scaling behavior is similar to that expected by percolation theory:

$$E \propto \rho^{T/\beta} \tag{4}$$

where $\rho$ is the density of the infinite cluster, $T$ and $\beta$ are percolation exponents related to the elasticity and gel fraction, respectively. However, percolation theory doesn't account into the shrinkage occurred from syneresis during aging and supercritical drying, so it may only qualitatively describe the elasticity by the gel point.

In most mechanical property models of porous materials, Young's modulus is only dependent on the bulk density (and pore shape for some cases). For open-cell foam, the Young's modulus has the following relationship with bulk densities:

$$E/E_S \approx (\rho/\rho_S)^2 \tag{5}$$

where, $E$ and $E_S$ are the modulus for foam and cell-wall, $\rho$ and $\rho_S$ are foam density and cell-wall density respectively. However, for silica aerogels, the Young's modulus also depends on the sol-gel synthesis conditions. From FIG. 1, it is apparent that for the same bulk density values, base-catalyzed conditions lead to relatively lower E than acid or neutral catalyzed conditions. The lower E of the base-catalyzed silica aerogels may be attributed to larger primary particles with lower particle-particle connectivity, whereas, acid and neutral-catalyzed conditions resulted in the aerogels primarily composed of smaller particles leading to higher particle-particle connectivity, and increased aerogel's stiffness.

With a high porosity (>80% or even 90%), large surface area (~800 m$^2$/g or even ~1000 m$^2$/g) and a nanoporous structure, the aerogels of the present invention are excellent insulating materials having a thermal conductivity much lower than the still air (0.025 W/mK). Thermal conductivity of aerogels arises from three sources: conduction in solids, conduction in gases in the pores, and radiation through the entire structure. The solid thermal conduction is limited by the extremely low connectivity between particles. Similarly, the gas conduction is suppressed as the mean free path (average distance traveled between collisions) of gas molecules inside aerogels is significantly limited by the nanosized pores, and the interstitial gas molecules collide with the pore walls more frequently than they collide with each other. The radiative conductivity is also lower because of its smaller solid content and higher surface area. Yet at higher temperature, radiative conductivity increases dramatically and becomes the dominant thermal transport mode of silica aerogels.

A thermal resistance value of R=20 per inch is possible by optimizing the synthetic and engineering approaches of making aerogels. Here, the thermal resistance R-factor is the inverse of the thermal conductivity in English units (i.e., BTU·in/h·ft2·° F.), and it is numerically equal to 0.1443 divided by the thermal conductivity in MKS units (i.e., W/m·K). (Hrubesh and Pekala, J. of Mater. Res. 9 (1994), pp. 731).

Solid conductivity $\lambda_s'$ in aerogels is empirically expressed by:

$$\lambda_s' = \frac{\rho' v'}{\rho_s v_s} \lambda_s \quad (6)$$

where $\rho'$ and $\rho_s$ are the densities of the aerogel and the full solid respectively. $v'$ and $v_s$ are their respective longitudinal sound velocities, and $\lambda_s$ is the thermal conductivity of the solid. The most important terms for solid conductivity is the ratio $\lambda_s/\rho_s v_s$ in Equation (6), which can be minimized by proper selection of the solid used to make the aerogel. That implies that, one should use a high density material that has a low intrinsic thermal conductivity and a high sound velocity to achieve low thermal conductivity.

Gas conductivity $\lambda_g'$ in aerogels can be approximated by:

$$\lambda_g' = \frac{\lambda_{g0}\left(1 - \frac{\rho'}{\rho_s}\right)}{1 + \alpha * K_n} \quad (7)$$

where $\lambda_{g0}$ is the thermal conductivity of the gas in the pores, $\alpha$ is a constant depending on the gas (~2 for air), and $K_n$ is the Knudsen number, given by the ratio of the mean-free path for gas molecules, l, and the average pore size, $\Phi$, of the aerogel. Equation (7) shows that the pore size, which affects the Knudsen number, is an important factor in reducing the gaseous contribution to the conductivity. Smaller average pore size increases the Knudsen number and thus decreases the gaseous thermal conductivity.

Radiative conductivity $\lambda_r'$ in aerogels is approximated by:

$$\lambda_r' = \frac{16n^2 \sigma T r3}{3\rho' K_s / \rho_s} \quad (8)$$

where $\sigma$ is the Stephan-Boltzmann constant ($\sigma$=5.67×10$^{-8}$ W/m$^2$K$^4$), n is the refractive index (~1 for aerogels), $T_r$ is the mean temperature within the aerogels, and $K_S$ is the extinction coefficient for the solid. The extinction coefficient is the inverse of the mean free path for photons, l', in the material. Most of the solid materials are optically thick, in which l' is much smaller than the geometrical thickness. However, many porous materials are not optically thick, especially at infrared (IR) wavelengths, such as aerogels. Thus, the radiative conductivity becomes even more significant at very low densities and at high temperatures. Clearly, to reduce the radiative conduction, adding materials that has strong infrared radiation absorption into silica aerogels can significantly increase the extinction coefficient for silica and thus also reduce the $\lambda_r'$.

Figure 2:
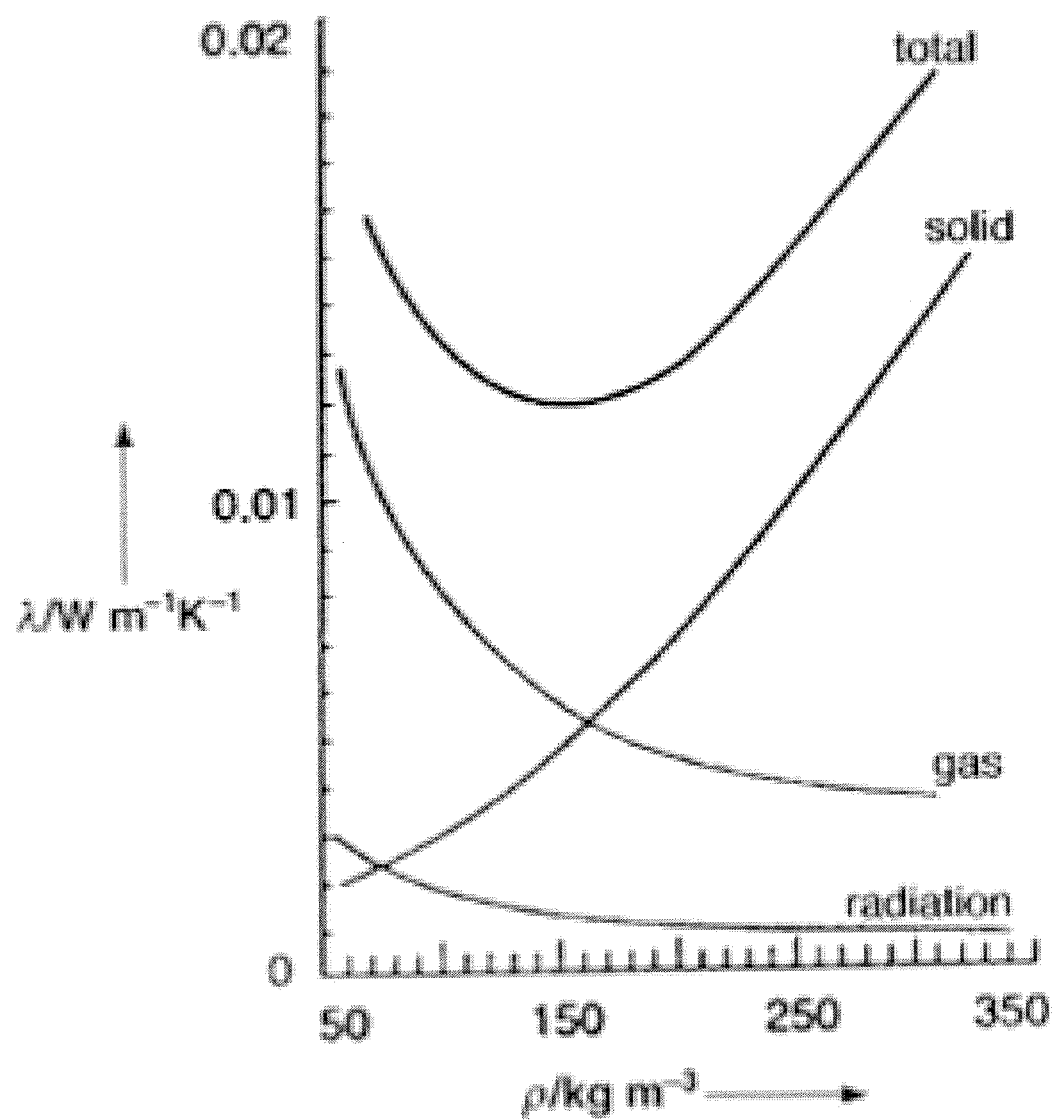
FIG. 2 shows thermal conductivity of silica aerogels with contributions from gas, solid and radiation transport depending on the bulk density.

Based on the above analysis, all contributions to the total thermal conductivity of silica aerogels are dependent on the density. FIG. 2 depicts the thermal conductivity of silica aerogels with contributions from gas, solid and radiation transport depending on the bulk density. FIG. 2 schematically shows the contribution of these thermal transport modes depending on the bulk density. Clearly, the solid conductivity increases with increasing density, while, gas and radiative transports decrease with increasing density. The minimum total thermal conductivity occurs at a density of about 0.15 g/cm$^3$ for the specified aerogels (see Fricke, *Scientific Am.* 256(5) (1988), pp. 92).

Other factors including temperature, aerogel structure, interstitial gas types, and pore structure can also affect the contributions. This creates a rather complicated set of circumstances, and makes it difficult to broadly generalize aerogels' thermal properties. Yet researchers in this field have developed some strategies to lower the thermal conductivity of aerogels such as (1) employing organic or inorganic materials with low intrinsic solid conductivity, (2) reducing the average pore size within aerogels, (3) increasing the infrared extinction in aerogels through good IR absorbers and (4) conducting partial evacuation and sealing of aerogel monoliths.

Monolithic silica aerogels have been used in high energy physics in Cherenkov radiation detectors on the basis of their tunable refractive indices, see Cantin et al (Nuclear Instruments and Methods 118 (1974), pp. 177). Low acoustic impedance, resulting from silica aerogels' low densities, as well as low velocity of sound (100 m/s) allow silica aerogels to be very useful in acoustic impedance matching devices, see Gonauer and Fricke (*Acustica* 59 (1986), pp. 177). Silica aerogels have found applications as inertial confinement fusion (ICF) targets in thermonuclear fusion reactions, (Anappara et al. *Acta Materia* 52 (2004), pp. 369), high efficient radioluminescent devices in place of fragile vacuum systems (Rao et al. and Ashley et al., *Chemical Processing of Advanced Materials* (Wiley. New York. 1992) pp. 989); and *J. of Non-Crystalline Solids* 330 (2003) 187).

Unless defined otherwise, all technical and scientific terms used herein generally have the same meaning as commonly understood by one of ordinary skill in the art to which this invention belongs. Generally, the nomenclatures used herein are those well known and commonly employed in the art. The techniques and procedures are generally performed according to conventional methods in the art and various general references.

The term "about" or "approximately" means within an acceptable error range for the particular value as determined by one of ordinary skill in the art, which will depend in part on how the value is measured or determined—e.g., the limitations of the measurement system, or the degree of precision required for a particular purpose. For example, "about" can mean within 1 or more than 1 standard deviations, as per the practice in the art. Alternatively, "about" can mean a range of up to 20%, preferably up to 10%, more preferably up to 5%, and more preferably still up to 1% of a given value. Where particular values are described in the application and claims, unless otherwise stated, the term "about" meaning within an acceptable error range for the particular value should be assumed.

As used herein and in the appended claims, the singular forms "a," "an," and "the," include plural referents unless the context clearly indicates otherwise. Thus, for example, reference to "an aerogel" includes one or more of such aerogel structures and reference to "the method" includes reference to equivalent steps and methods known to those of ordinary skill in the art that could be modified or substituted for the methods described herein.

The aerogels and methods of the present invention are further illustrated by the examples that follow. These examples are offered to illustrate, but not to limit the claimed invention.

EXAMPLES

Example Overview

The following discussion is an illustration of several exemplary embodiments.

A 3-step method is used to provide silica aerogels with improved ductility and extremely low thermal conductivities. The effects of sol-gel parameters on the structural and physical properties of silica aerogels are discussed on the basis of advanced characterizations including BET and SEM.

Tetraethyl orthosilicate (TEOS, ≥98.0% (GC)), n-hexane (anhydrous), and ammonia standard solution (2.0 M in ethanol) were purchased from Sigma-Aldrich and used as received. Deionized water was obtained from Ricca Chemical Company. Anhydrous ethanol (ACS/USP grade) was from Pharmoco-Aaper Inc. Other materials were: hydrochloric acid (0.05 M) from ARISTAR and ammonium fluoride (1 M) from Acros Organics, both in the form of deionized water solutions. For supercritical drying, liquid carbon dioxide tank with siphon tube was purchased and used as received from Airgas Inc.

All the silica aerogels were prepared in four steps: (i) hydrolysis of TEOS, (ii) condensation and gelation, (iii) aging and washing, and (iv) low temperature supercritical $CO_2$ drying.

In order to study the effects of catalysts and solvent on the structure and physical properties of the silica aerogels, two different synthesis routes were employed, 2-step method and 3-step method.

Example 1

Two-Step Sol-Gel Process

In the first set of experiments, silica aerogels (sample N-1-0-0 and F-1-0-0) were prepared through a 2-step method sol-gel process. In this experiment set, for the first step, the precursor solution was placed for hydrolysis with substoichiometric water under acid condition for 1.5 h with the molar ratios of starting materials TEOS:EtOH:H2O:H+ were kept at 1:3:1:7×10-4. During the second step, additional EtOH and water were added to increase the ratio to TEOS EtOH:H2O=1:8:4. After that, 1 ml ammonia solution (2M) or 1 ml ammonium fluoride (1M) was added to induce condensation and gelation for sample N-1-0-0 or F-1-0-0 respectively.

Example 2

Three-Step Sol-Gel Process

In the second set of experiments, silica aerogels (sample F, N, 0.01-8E-0-0, F, N, 0.01-12E-0-0, F, N, 0.01-16E-0-0, and F, N, 0.01-20E-0-0) were prepared through a 3-step method sol-gel process. In this experiment set, the first step is the same as described in the first set of experiments, but during the second step, additional EtOH, water and ammonia solution were added to increase TEOS:EtOH:H2O:$NH_3.H_2O$=1:8 (12, 16, or 20):4:2×10-3, stirring for 0.5 h. For the third step, 1 ml ammonium fluoride (1M) was added as gelation agent and sol solutions were poured into molds before gelation point.

Example 3

Second 3-Step Sol-Gel Process

In the third set of experiments, silica aerogels (sample F, N, 0.002-16E-0-0, F, N, 0.004-16E-0-0, F, N, 0.006-16E-0-0, F, N, 0.008-16E-0-0, and F, N, 0.01-16E-0-0) were prepared through a 3-step method sol-gel process. In this experiment set, the first step is the same as described in the previous, and during the second step, additional EtOH, water and ammonia solution were added to increase TEOS:EtOH:$H_2O$:$NH_3.H_2O$=1:16:4:2×10-3, with stirring for 0.5 h. For the third step, 1 ml ammonium fluoride 0.2M (0.4M, 0.6M, 0.8M, or 1M, respectively) was added as gelation agent and sol solutions were poured into molds before gelation point.

Example 4

Gel Processing

All the wet gels obtained were aged for three days under ethanol before washing. Then, the wet gels were washed three times, 24 h for each, prior to supercritical drying.

Before drying, the wet gels were placed into an autoclave (100 cm3) in an ethanol bath. The autoclave was then sealed and liquid carbon dioxide at 4° C. was pumped in at a rate of 20 psi/min until the pressure reached to 1400 psi. At the same time, the autoclave was heated up to 400 C (i.e. above the critical point of CO2, Pc=1070 psi, Tc=31.10 C). After reaching 400 C, the pressure was kept constant at 1400 psi and the outlet valve was opened, so that the solvent extracted by supercritical CO2 was able to flow out with a rate of 3 ml/min. 700 ml of liquid CO2 was needed to complete the extraction process at this stage. Then, the system was slowly depressurized at a rate of −2 psi/min. When ambient pressure was reached, the system was cooled down to the room temperature. Silica aerogels were obtained and ready for further testing.

Example 5

Measurement of the Aerogels

Bulk density ρ of silica aerogels was defined as the ratio of weight to volume, where the weight was measured with a microbalance of 10-5 accuracy and the volume of silica aerogels was measured geometrically. Volume shrinkage, $V_{shrinkage}$ of the silica aerogels was calculated from the volumes of gels before ($V_{wet}$) and after ($V_{dried}$) supercritical drying. Porosity was determined as follows from the bulk density ρ, assuming a skeletal silica density $\rho_{SiO_2}$ of 2.2 g/cm$^3$.

$$V_{Shrinkage}\% = (1 - V_{dried}/V_{wet}) \times 100 \quad (9)$$

$$\text{Porosity} = (1 - \rho/\rho_{SiO_2}) \times 100 \quad (10)$$

Nitrogen adsorption/desorption measurements (BET method) were performed to obtain BET surface area, mesopore volume, and pore size distribution with an ASAP 2020 instrument (Micromeritics, USA). Before analysis, samples were degassed under vacuum at 150° C. for at least 2 h. An FESEM-6700 (JEOL, Japan) was employed on gold-coated aerogels samples to observe the network morphology.

Figure 3:
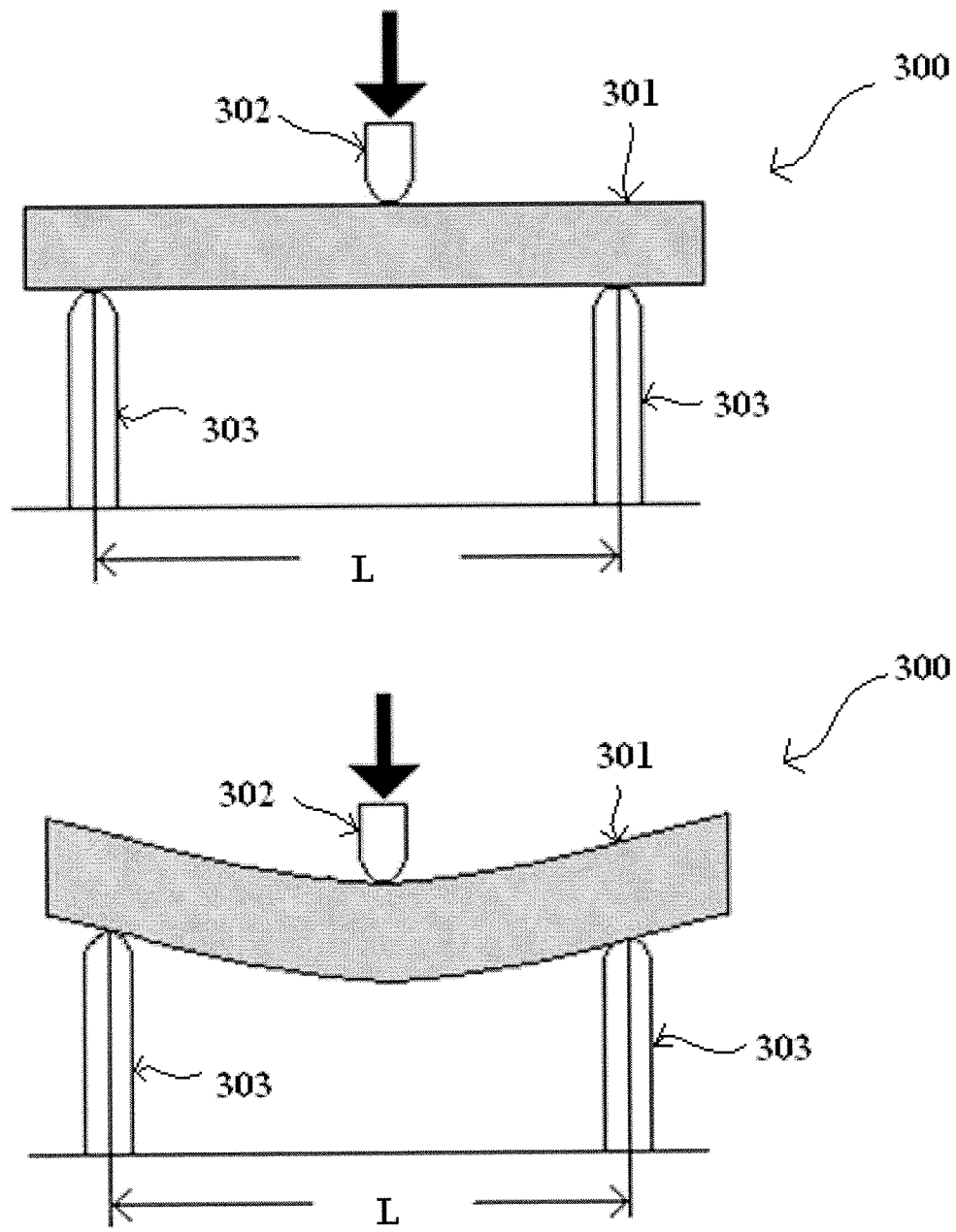
FIG. 3 is a schematic illustration of three-point-bending measurement.

FIG. 3 is a schematic illustration of three-point-bending measurement setup 300. The flexural modulus (E) and the yield strength (σ) of the silica aerogels samples 301 were measured by a three point bending technique using Instron 8848 Micro Tester with a 10N loading cell 302. The precision of the measurement was 0.01N. The measurements were performed using cylindrical shaped samples 301 with a diameter of about 0.8 cm and a span of 3 cm. The loading speed was 1 mm/min.

$$\sigma = \frac{F_{max}L}{\pi r^3} \quad (11)$$

$$E = \frac{SL^3}{12\pi r^4} \quad (12)$$

where σ=yield strength, E=flexural modulus, S=slope of the stress-strain curve, L=span of the two supports 303, r=radius of the sample 301.

Thermal conductivity measurements of silica aerogels were conducted using the transient hot wire method developed by Nagasaka and Nagashima (*J. of Physics E: Scientific Instruments* 14 (1981) pp. 1435). Resistance technique was used in our experimental measurements. Here the temperature change was measured by the change in resistance caused by the heating up of the hot wire, from which the mean temperature rise of the wire was calculated along its particular length, to reduce or eliminate the influence of local non-homogenous of measured samples. For the ideal mathematical model of transient hot wire method, several assumptions have been made: (i) infinite long hot wire surrounded by infinite materials whose thermal conductivity is to be measured; (ii) the wire is a perfect thermal conductor with uniform temperature; (iii) only radial heat loss through the measured medium around the wire occurs. The thermal conductivity of the silica aerogels was then calculated using the temperature change with respect to time using the simplified formula:

$$\theta - \theta_0 = \left(\frac{q}{4\pi k}\right)\left[-0.5772 + \ln\left(\frac{4at}{r^2}\right)\right] \quad (13)$$

Where, θ=hotwire temperature ($\theta_0$=initial temperature), q=power dissipated per meter hot wire (W/m), r=hotwire radius, k=thermal conductivity, a=thermal diffusivity. The condition of $r^2/4_{at} \ll 1$ should be fulfilled for the validation of the formula. Thus, the temperature rise Δθ as a function of time was employed to determine the thermal conductivity k, from the slope:

$$K = \frac{d\theta}{d(\ln t)} \quad (14)$$

of the linear region of temperature rise Δθ vs. natural logarithm of the time ln(t) evolution from:

$$k = \frac{q}{4\pi K} \quad (15)$$

Figure 4:
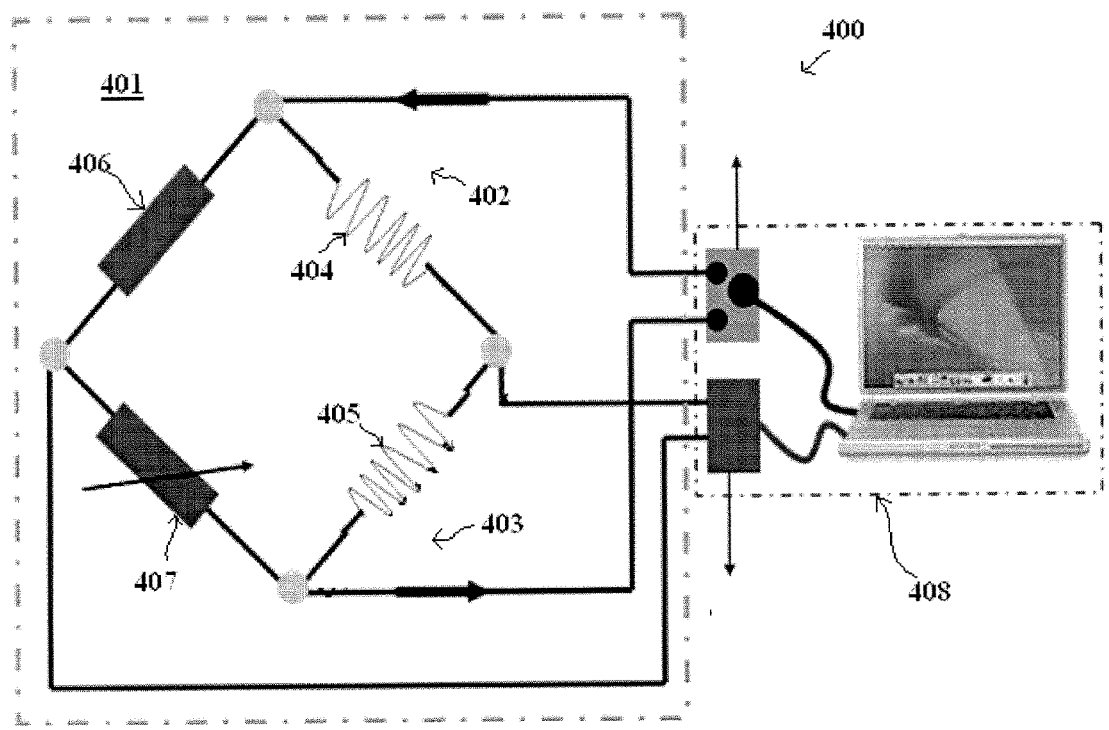
FIG. 4 is a schematic diagram of the data acquisition system for thermal conductivity measurements.

Nanofluid Thermal Conductivity Measurement System (developed by NanoEngineering Group at MIT) was employed for thermal conductivity measurements of silica aerogels. FIG. 4 shows the schematic diagram of a data acquisition system for thermal conductivity measurements 400. The change of hotwire temperature was measured by a Wheatstone Bridge 401 with two arms of the bridge 402 and 403 comprising two precision resistors 404 and 405 and the other two arms of the bridge consist of the sample with built-in hotwire 406 and a potentiometer 407. The voltage imbalance across the bridge as a function time was then recorded by a GPIB Board 408.

Figure 5:
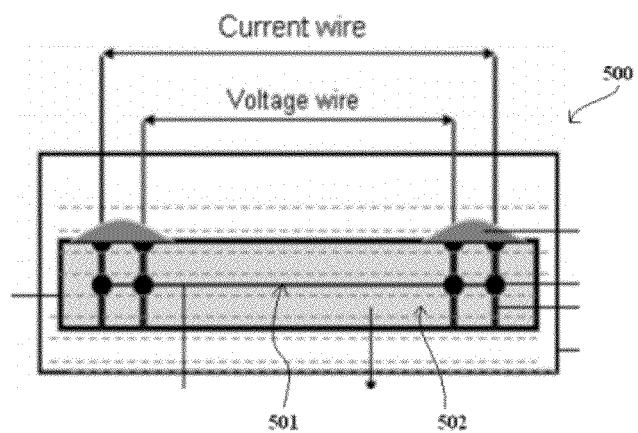
FIG. 5 is a schematic diagram of a sample cell.

Unlike the measurements of thermal conductivity measurements for liquid, the measurements for solid materials present a great challenge, as it is difficult to realize good thermal contact between the hotwire and the measuring sample (i.e. silica aerogels). To overcome the challenge, an in-situ hotwire method was developed to prepare the silica aerogels samples with hotwire embedded. Basically, a bare platinum hotwire (25 μm in diameter) was suspended in the sol solution prior to gelation point, and after gelation, aging, and washing, wet gel with built-in hotwire was ready for supercritical $CO_2$ drying. Then, dried gel was used for thermal conductivity measurement. FIG. 5 depicts an embodiment of a dried gel for thermal conductivity measurement system 500. Since the hotwire was built into the aerogel sample from liquid phase, good thermal contact between the wire 501 and sample 502 are easily realized, as the process also ensures no thin air surrounding the wire 501. Furthermore, compared to previous high pressure cell method with external loading applied to ensure thermal contact, see Rao et al., the in-situ hotwire built method will more truly reflect the behavior of internal structure of silica aerogels.

To measure the thermal conductivity, silica aerogel samples 406, 502 with built-in hotwire 502 were first connected into the system 400. The resistances of the hotwire were measured with Digital Multimeters (DMM's) using the four-wire method. The potentiometer 407 was then adjusted to balance the bridge. After the bridge was initially balanced, a constant current of 28 mA (40 mA for thermal conductivity measurements of ethanol and hexane) was applied to the bridge 401, and the voltage imbalance across the bridge 401 was recorded as a function of time. The duration of data acquisition was kept for 1 second. Finally, signal analysis was performed to convert the bridge output signal to the thermal conductivity of the measured sample 406, 502. To establish the reliability of the method, measurements of anhydrous ethanol and n-hexane were performed with measured thermal conductivity values all within 1.5% of literature values (see Table II), see Poling et al. The properties of gases and liquids (McGraw-Hill, New York, 2001), pp. 10.42) for literature values. The uncertainty shown in the measured thermal conductivity was obtained from the standard deviation of six data points.

TABLE II

Measured Thermal Conductivity vs. Literature Values

| Sample | Literature Value (W/mK) | Measured Value (W/mK) | Error (%) |
|---|---|---|---|
| Ethanol(anhydrous) (20° C.) | 0.168 | 0.170 ± 0.002(±1σ) | 1.2% |
| n-Hexane (20° C.) | 0.126 | 0.125 ± 0.002(±1σ) | −0.8% |

* Error = [($k_{measured} - k_{literature}$)/$k_{literature}$] × 100

Figure 6:
FIG. 6 shows thermal conductivity measurements under various constant current conditions.
Figure 8A:
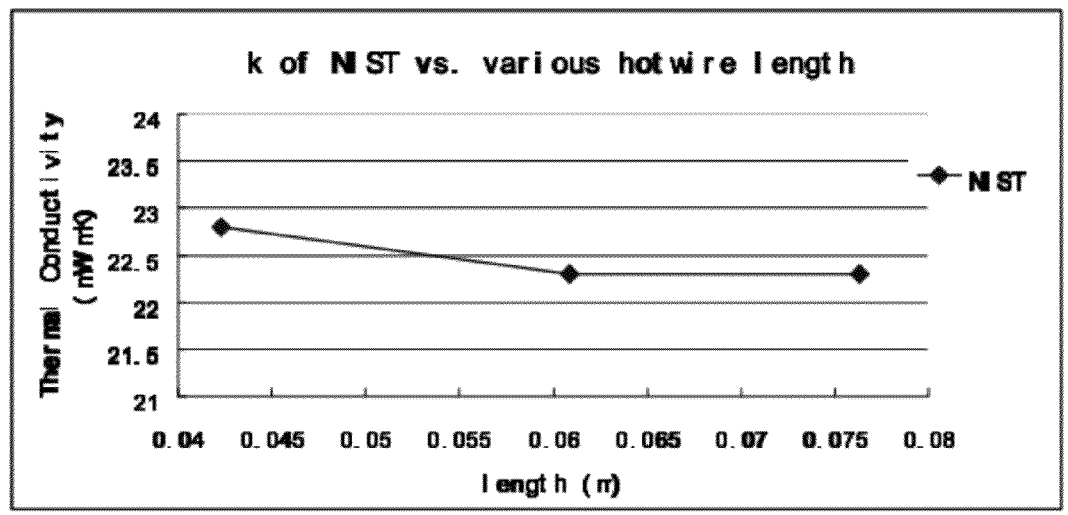
FIGS. 8A and 8B shows effects of hotwire length: fused silica (A) and silica aerogel (B)
Figure 8B:
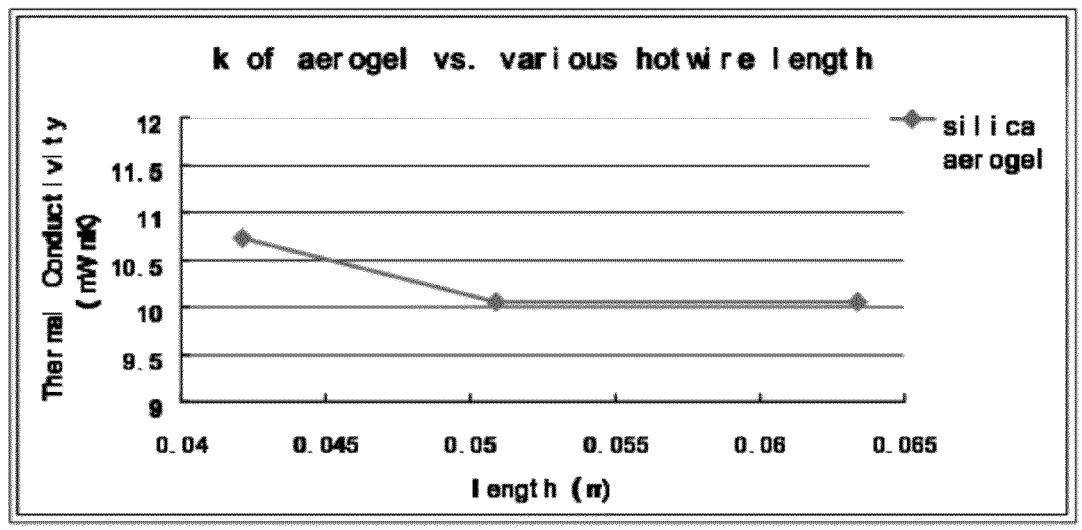

Effects of hotwire length on the thermal conductivity measurements were investigated by measuring the same sample using different lengths of hotwire. Here, we measured one fused silica sample (with reported k=20.5 mW/mK) from NIST and one silica aerogel sample (F, N, 0.01-20E-0-0), respectively. The temperature rises were all less than 60 C with an applied constant current of 28 mA, as shown in FIG. 6 depicting thermal conductivity measurements under various constant currents for each measurement, 28 mA, 32 mA, 40 mA, 60 mA, and 80 mA for duration of 1 s. Based on the two sets of measurements (see FIG. 8A showing the effects of hotwire length: fused silica (8A) and silica aerogel (8B)). We observed that, as the length of hotwire increased, the measured values became independent of the length. So, hotwire lengths of ~6.5 cm were used for thermal conductivity measurements of all silica aerogels samples.

Figure 7:
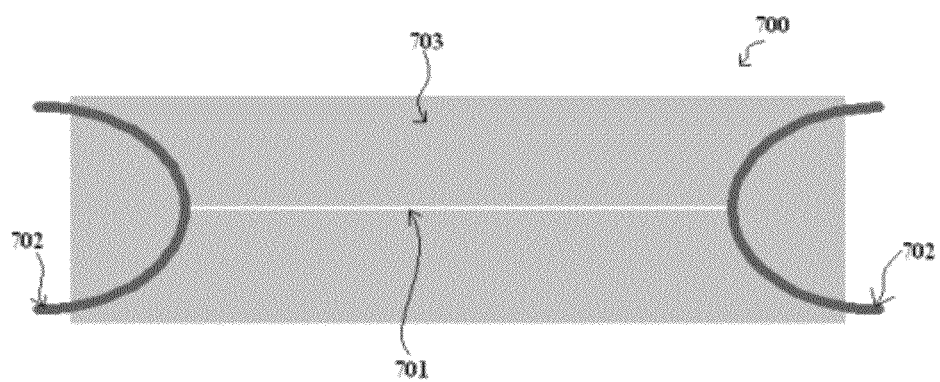
FIG. 7 is a schematic diagram of Pt hotwire and copper wire embedded within a measured material.

It has been noticed that the measured value (22.3 mW/mK) of fused silica was about 10% higher than the standard value (20.5 mW/mK). We contributed the higher measured value to the end effects. During each measurement, the ends of the Pt wire will be at a lower temperature than the center because the copper wires (254 μm in diameter) to which the Pt wire is soldered, have smaller resistance than surrounding measured materials, and a heat loss was expected, FIG. 7 showing Pt hotwire 701 and copper wire 702 embedded within a measured material 703. Thus, from Eq. 16 and Eq. 17, it can be easily concluded that the end effects result in higher measured values than the true values.

$$k_{measure} = \frac{q}{4\pi \frac{d\theta}{d(\ln t)}} \quad k_{true} = \frac{q - q_{loss}}{4\pi \frac{d\theta}{d(\ln t)}} \quad (16)$$

$$\frac{k_{measure}}{k_{true}} = \frac{q}{q - q_{loss}} \quad (17)$$

Example 6

Analysis of Aerogels from Two and Three Step Methods

In order to study the effects of different catalysts on the structure and physical properties of the silica aerogels, two different synthesis routes have been employed, a 2-step method and a 3-step method. However, all the synthesis routes are performed under the same reaction condition during the first step for hydrolysis. Table III shows the properties of silica aerogels catalyzed by $NH_3OH$ or $NH_4F$ from a 2-step method, and both of them from a 3-step method. During the second step of 2-step method, which is mainly for condensation and gelation, sample N-1-0-0 is catalyzed by addition of 1M $NH_3$.OH solution, AND sample F-1-0-0 is catalyzed by addition of 1M $NH_4F$ solution. Sample F, N, 0.01-8E-0-0 is prepared by adding $NH_3OH$ during the second step for condensation, and with addition of $NH_4F$ during the third step to induce gelatin. Comparing the mechanical properties of those three samples, F-1-0-0 and F, N, 0.01-8E-0-0 have a higher yield strength and lower flexural modulus than N-1-0-0, leading to better ductility. However, the standard deviation of flexural modulus of F-1-0-0 is much larger than that of F, N, 0.01-8E-0-0, resulting from poor integrity of mechanical behaviors. Thus, the 3-step method sol-gel process with the addition of $NH_3OH$ or $NH_4F$ during the second or third step, respectively, will result in silica aerogel with better ductility and mechanical integrity from the separate controls of the condensation and the gelatin. In addition, from our hotwire measurements, thermal conductivity of sample N-1-0-0 is higher than those of sample F-1-0-0 and F, N, 0.01-8E-0-0, yet still much lower than air (25 mW/mK).

TABLE III

Properties of Silica Aerogels prepared from 2-step method and 3-step method

| Sample | Yield Strength(kPa) | Flexural Modulus(MPa) | Bulk Density(g/cm³) | Porosity (%) | Thermal Conductivity (mW/mK) |
|---|---|---|---|---|---|
| N-1-0-0 | 47.4 +/− 5.7 | 1.44 +/− 0.08 | 0.146 +/− 0.003 | 93.4 | 11.08 +/− 0.03 |
| F-1-0-0 | 69.2 +/− 19.2 | 1.49 +/− 0.32 | 0.128 +/− 0.002 | 94.2 | 9.09 +/− 0.02 |
| F, N, 0.01-8E-0-0 | 73.3 +/− 19.3 | 1.34 +/− 0.03 | 0.131 +/− 0.001 | 94.0 | 9.32 +/− 0.02 |

Figure 9A:
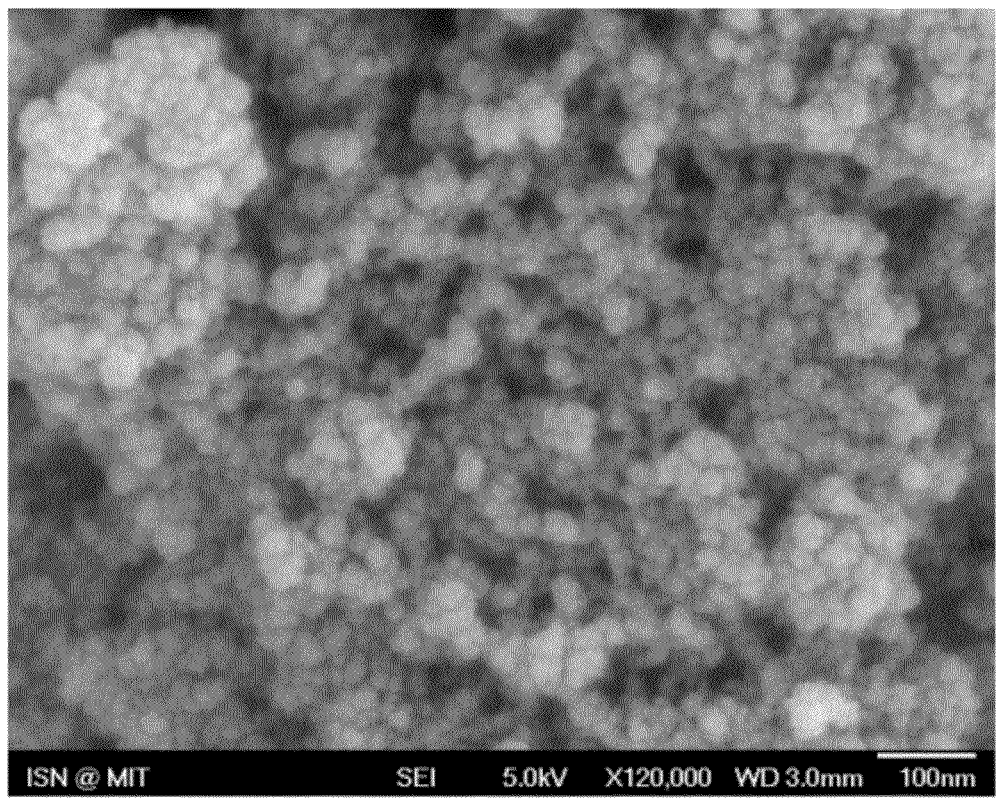
FIGS. 9A-9C presents SEM images of silica aerogels samples: (A) N-1-0-0 and (B) F-1-0-0 were prepared by a 2-step method, and (C) F, N, 0.01-8E-0-0 was prepared by a 3-step method.
Figure 9B:
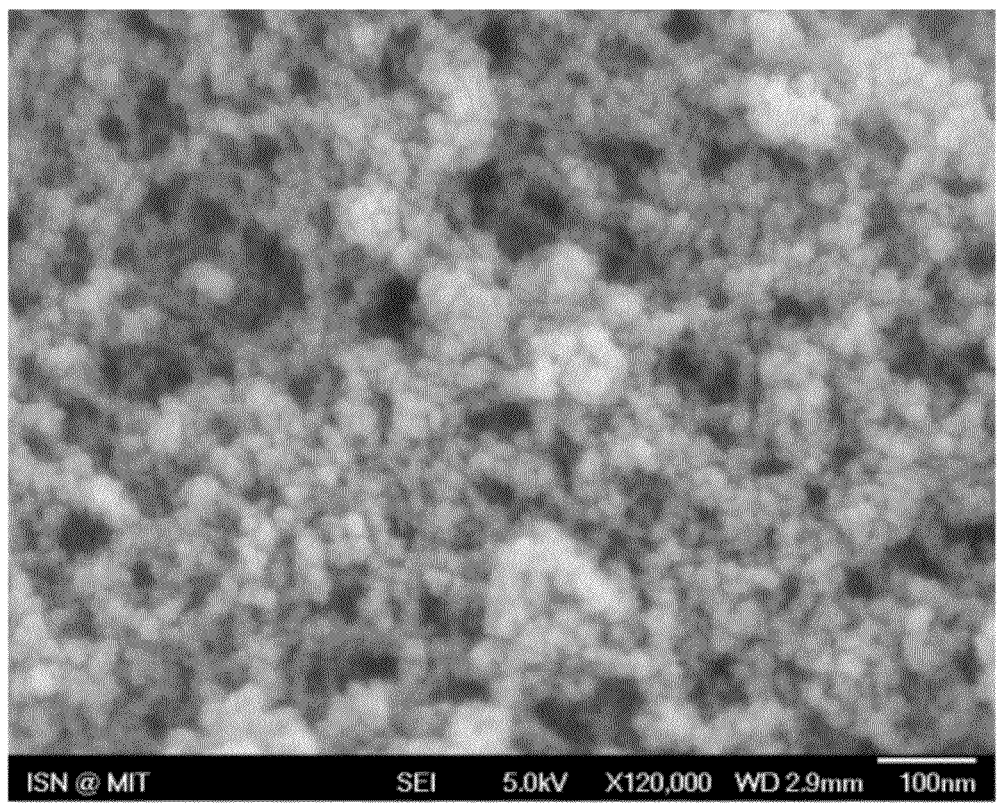
Figure 9C:
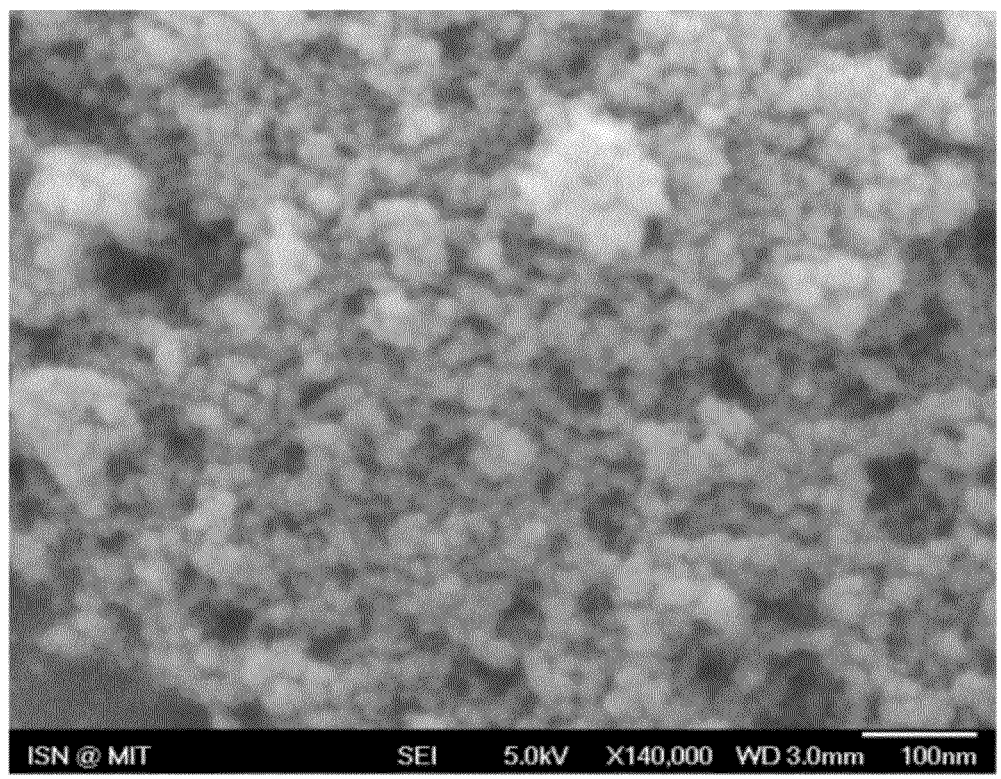
Figure 10:
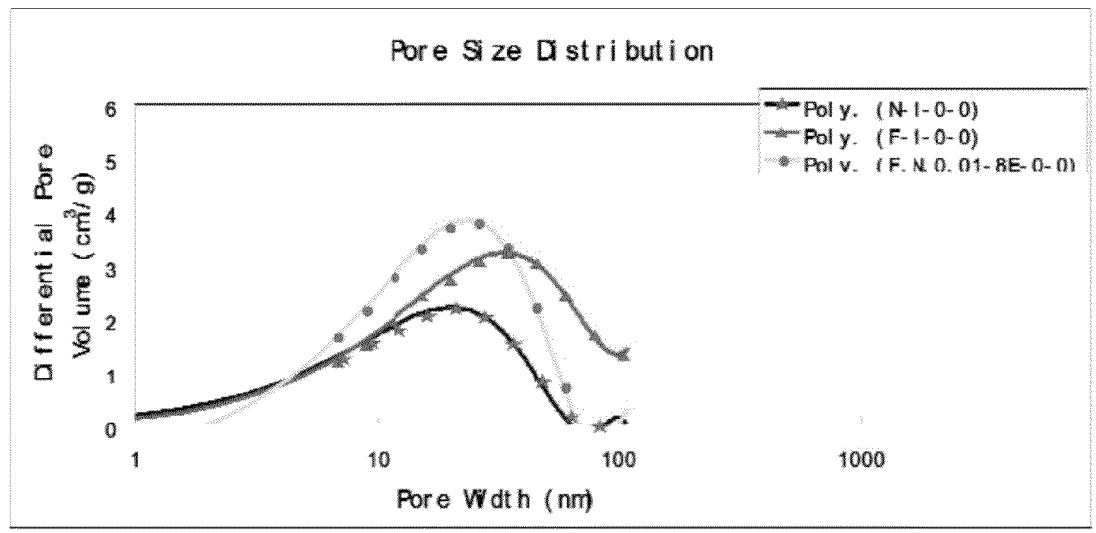
FIG. 10 shows pore size distribution of silica aerogels.

FIGS. 9A-C depict SEM images of silica aerogels samples: (A) N-1-0-0 and (B) F-1-0-0 prepared from 2-step method, and (C) F, N, 0.01-8E-0-0 prepared from 3-step method, from which we can observe the nanostructure difference among these samples. It has been well known that the primary particle diameters of silica aerogels are around 2-5 nm, which are very difficult to be seen under SEM, however, the secondary clusters are shown in all the SEM images. In FIG. 9A, we observe highly condensed gel networks consisting of stronger consolidation of secondary clusters with less pores. While, in FIG. 9B, highly branched polymeric secondary clusters with more uniform size and more pores are observed. In FIG. 9C, highly branched polymeric secondary clusters with more uniform size and more pores are observed. Furthermore, as shown in FIG. 10, BET pore size distributions provide more pore structure information. The increased pore volume favors the loosely connected gel network in sample F-1-0-0 and F, N, 0.01-8E-0-0, leading to lower densities, and the broader pore size distribution of sample F-1-0-0 further confirms the diverse clusters' sizes.

Thus, the improved ductility of $NH_4F$ catalyzed samples benefit from the highly branched secondary clusters and increased pore volumes. This makes sense, since connectivity between clusters increases as clusters become more branched and larger pores give more space for the possible motion of clusters in response to external loading. If the gel network is composed of condensed secondary clusters with stronger consolidation and fewer pores such as in sample N-1-0-0, a relatively rigid mechanical behavior for the aerogel is anticipated. Furthermore, we attribute the relatively higher thermal conductivity of sample N-1-0-0 to the enhanced solid conduction due to the consolidation of secondary clusters.

The effects of different catalysts on the structural and the physical properties of silica aerogels come from the influence in condensation and gelation rates. For sample N-1-0-0, only $NH_3.OH$ is involved for condensation and gelation during the second step, and it takes about 50 minutes before gelation occurs, while gelatin will happen in less than 2 minutes after the addition of $NH_4F$ for the other two samples. Since pore structure of gel networks depends on both of the clusters' size and clusters' packing geometry, a longer gelation produces a more highly condensed gel structure, leading to a higher modulus. Therefore, sample N-1-0-0 appears to be more rigid.

Example 7

Three Step Method

In this example, the gelation time is dramatically shortened by using $NH_4F$, due to the unique catalytic effects on the rate of condensation reactions. The mechanism for F— catalyzed condensations involves the displacement of OH— with F—, causing localized attractions to surrounding silanol groups, thus promoting the condensations. Furthermore, since F— is more electron-withdrawing than OH—, the replacement of F— with OH— causes reduction of electron density of Si, thereby facilitating nucleophilic attack from other OH— groups. Therefore, the F— could strongly promote the condensation reactions and crosslinking among clusters, leading to the formation of highly branched polymeric structure with large pores.

Figure 11:
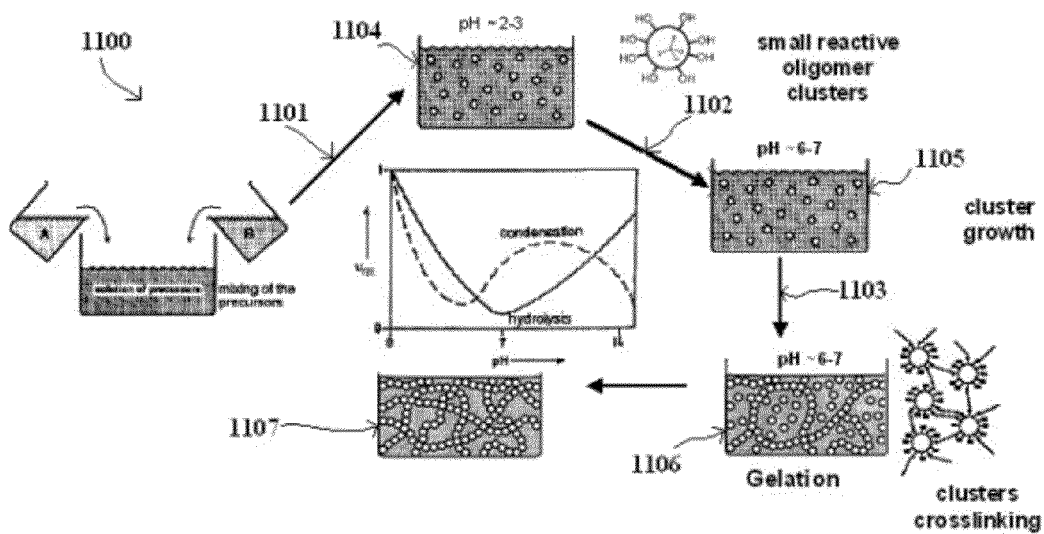
FIG. 11 is a schematic illustration of the 3-step method for sol-gel process, where, catalysts 1, 2 and 3 represent HCl, $NH_3 \cdot H_2O$ and $NH_4F$, respectively.

However, gel networks formed from simultaneous condensation and crosslinking of clusters can produce silica aerogels with poor mechanical integrity. When condensation and gelation occur within such a short time, each reactive cluster reacts with surrounding clusters without any preference. Consequently, the formed gel networks consist of clusters with diverse sizes, and the mechanical integrity is poor. By using a 3-step method, the shortage has been successfully overcome. During the 3-step method, we utilize three different catalysts to perform separate controls of hydrolysis, condensation and gelation. FIG. 11 is an embodiment of a 3-step method for sol-gel process 1100, where, catalyst steps 1101, 1102, 1103 represent the addition of HCl, $NH_3.H_2O$ and $NH_4F$, respectively. With the addition of HCl in the first step 1101, the solution pH is 2-3. At this stage, hydrolysis reactions are active and small reactive silanol oligomers 1104 are formed. During the second step 1102, a certain amount of $NH_3.OH$ is added, the sol solution pH increases to 6~7, and condensation reactions become more active in the system. When condensation reactions occur in an environment with pH between 6~7, silica clusters 1105 are preferentially growing through the addition of monomer to larger clusters rather than aggregation among larger clusters. Additionally, the solubility of silica is much greater in a solution with pH=6~7, and the smaller clusters are even more soluble than larger clusters, so the sol is primarily composed of clusters with uniform size.

For the third step 1103, $NH_4F$ will be added as a gelation inducing agent and crosslinking of clusters 1106 will occur simultaneously, eventually leading to the formation of wet gels with highly branched polymeric secondary clusters and more pores. Hence, the resulting silica aerogels have improved ductility and better mechanical integrity. Overall, silica aerogels with good quality in terms of low density, low thermal conductivity, better ductility and mechanical integrity were prepared by a 3-step method with better controls of the cluster growth and network formation during the sol-gel process.

Example 8

Two-Step Method with Various Solvent Concentrations

In order to further investigate the effects of sol-gel processing parameters on the physical properties of silica aerogels, samples with various solvent concentrations and catalyst concentrations were prepared using the 3-step method.

First, by keeping all the other parameters at constant values, samples with molar ratios of EtOH:Si varying from 8 to 20 were prepared. Table IV shows the physical properties of silica aerogels corresponding to different molar ratios of EtOH:Si. Accordingly, the number before E is the molar ratio of EtOH:Si.

From Table IV, significantly decreasing effects in aerogel's density, yield strength, and flexural modulus have been observed from increasing molar ratios of EtOH:Si. Aerogels with densities lower than 0.01 $g/cm^3$ are obtained with the molar ratios of 16 and 20. However, the molar ratio of 20 gives a volume preserved shrinkage of 80.8%, which is due to the fact that the prepared wet gels are sensitive to drying conditions and couldn't withstand the drying stresses. Consequently, a higher volume shrink occurs after being dried. Wet gels prepared from molar ratio of 16 have more tolerance with drying conditions, and 91.2% in volume preserved shrinkage has been well retained. Furthermore, hotwire measurements show that thermal conductivities of 9~10 mW/mK have been reached, which are much lower than previously reported silica aerogels' thermal conductivity of 15 mW/mK.

Figure 12:
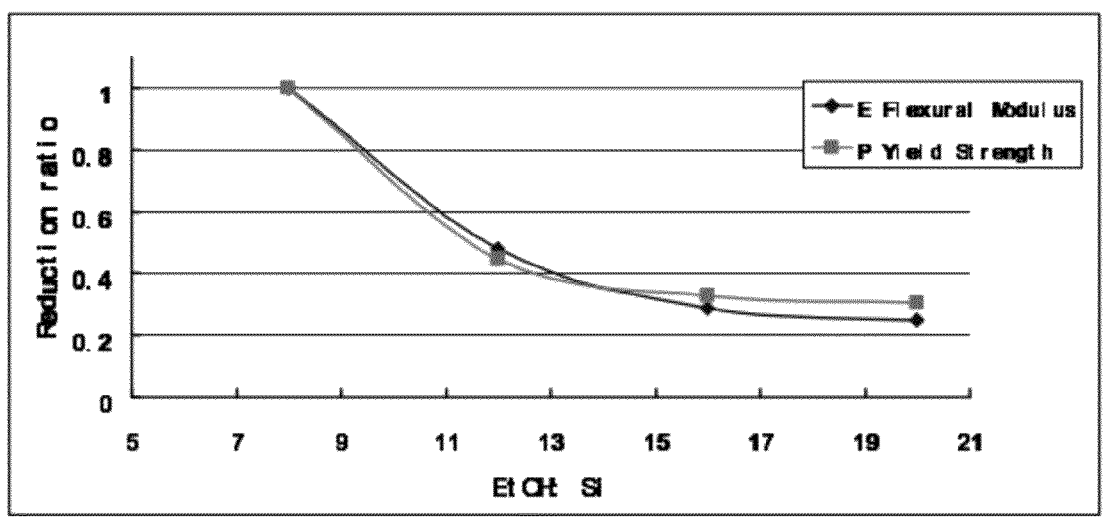
FIG. 12 presents reduction ratios in both yield strength and flexural modulus vs. molar ratios of EtOH:Si.
Figure 13A:
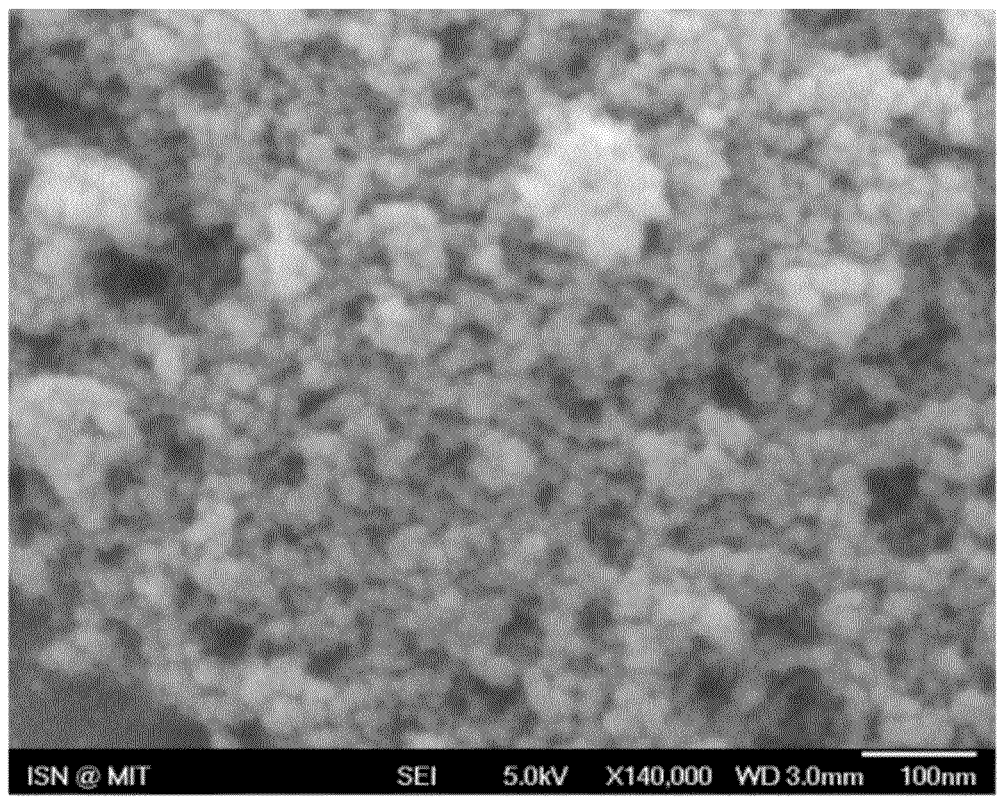
FIGS. 13A-13D depict SEM images of silica aerogels samples prepared with various solvent concentrations: (A) F, N, 0.01-8E-0-0, (B) F, N, 0.01-12E-0-0, (C) F, N, 0.01-16E-0-0, (D) F, N, 0.01-20E-0-0.
Figure 13B:
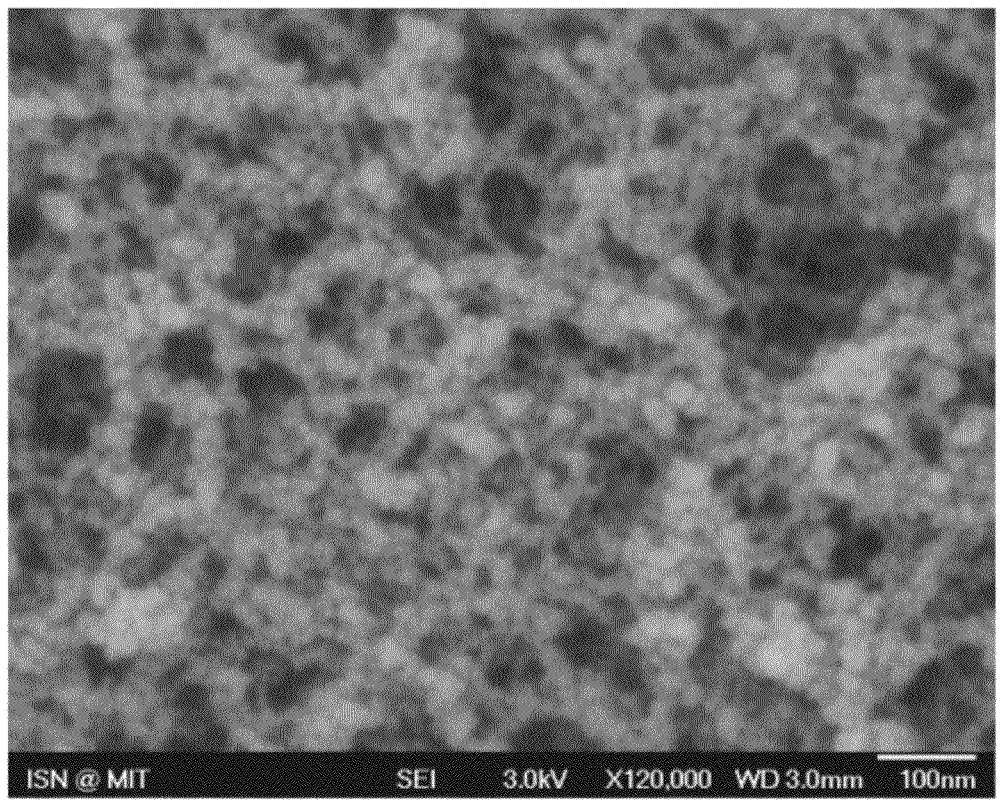
Figure 13C:
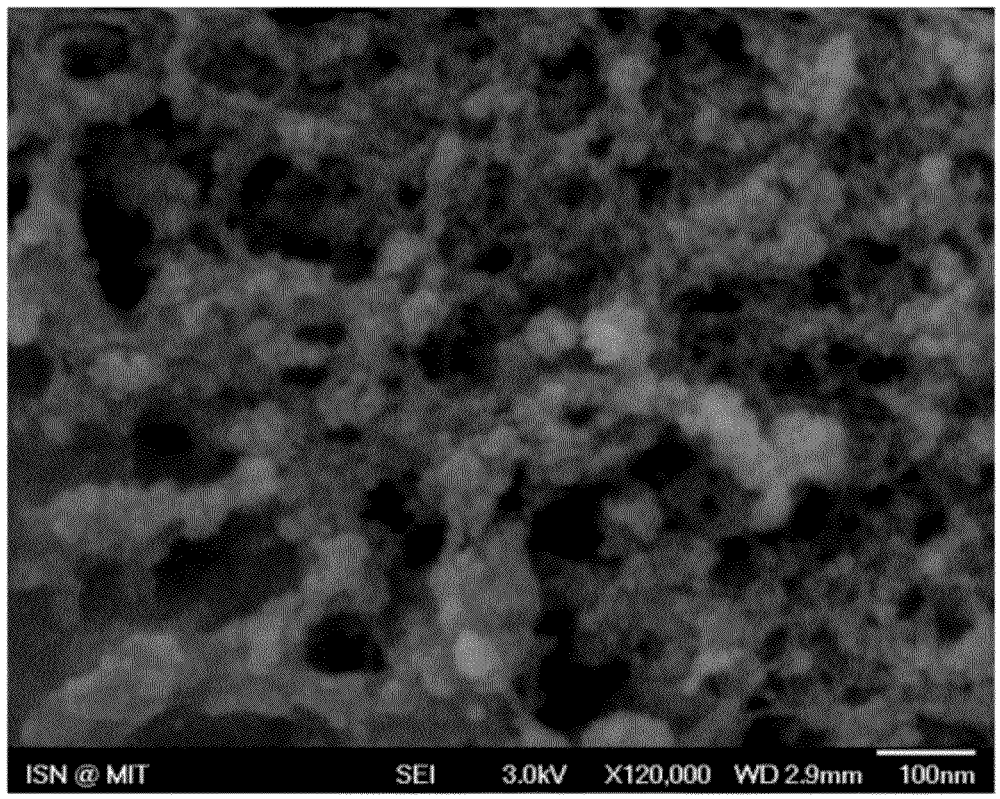
Figure 13D:
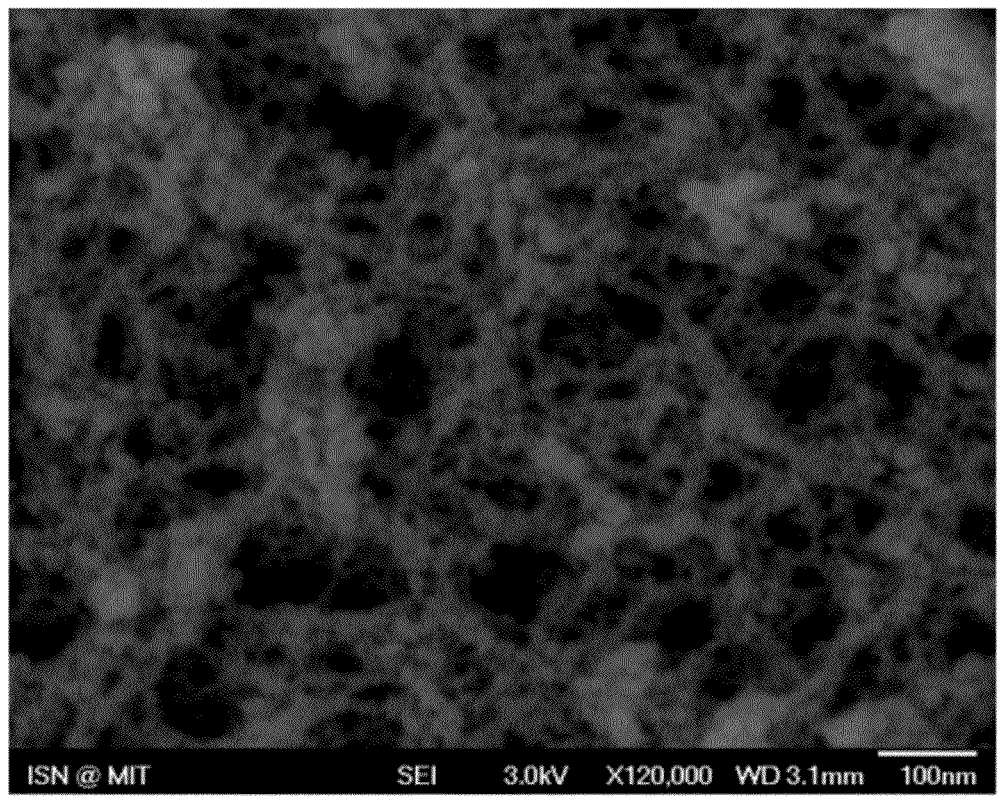

Since reductions in both yield strength and flexural modulus have been observed as the solvent concentration increases, in order to better investigate the effects on silica aerogel's ductile property, we introduce a new parameter, reduction ratio. By taking the yield strength and flexural modulus of sample F, N, 0.01-8E-0-0 with lowest solvent concentration as reference values, (P0, E0), and dividing the yield strength and flexural modulus of other samples (P, E) by the corresponding reference value respectively, we obtained the reduction ratios (P/P0, E/E0). FIG. 12 shows the reduction ratios in both yield strength and flexural modulus versus molar ratios of EtOH:Si. If the reduction ratio of yield strength is higher than that of flexural modulus, we propose that the resulting aerogel has improved elastic properties (ductility) than the reference sample. From the plots, samples with molar ratios of EtOH:Si=16 and 20 have improved ductility than the reference sample. The larger difference between reduction ratios (P/P0, E/E0) is, the better ductility of silica aerogels will be. Thus, increasing the solvent concentration improves the silica aerogels' ductility.

TABLE IV

Properties of silica aerogels prepared from different molar ratios of EtOH:Si

| Sample | Yield Strength (kPa) | Flexural Modulus (MPa) | Bulk Density (g/cm$^3$) | Porosity (%) | Volume Preserved Shrinkage (%) | Thermal Conductivity (mW/mK) |
|---|---|---|---|---|---|---|
| F,N,0.01-8E-0-0 | 73.3 +/− 19.3 | 1.34 +/− 0.03 | 0.131 +/− 0.001 | 94.0 | 95.1 | 9.32 +/− 0.02 |
| F,N,0.01-12E-0-0 | 32.7 +/− 11.8 | 0.64 +/− 0.01 | 0.106 +/− 0.002 | 95.1 | 94.2 | 9.28 +/− 0.06 |
| F,N,0.01-16E-0-0 | 23.8 +/− 4.3 | 0.39 +/− 0.03 | 0.091 +/− 0.001 | 95.8 | 91.2 | 10.01 +/− 0.02 |
| F,N,0.01-20E-0-0 | 22.4 +/− 4.0 | 0.33 +/− 0.03 | 0.087 +/− 0.001 | 96.0 | 80.8 | 10.05 +/− 0.04 |

* Volume preserved shrinkage is calculated from the sample size after supercritical drying divided by the sample size before drying.

Figure 14:
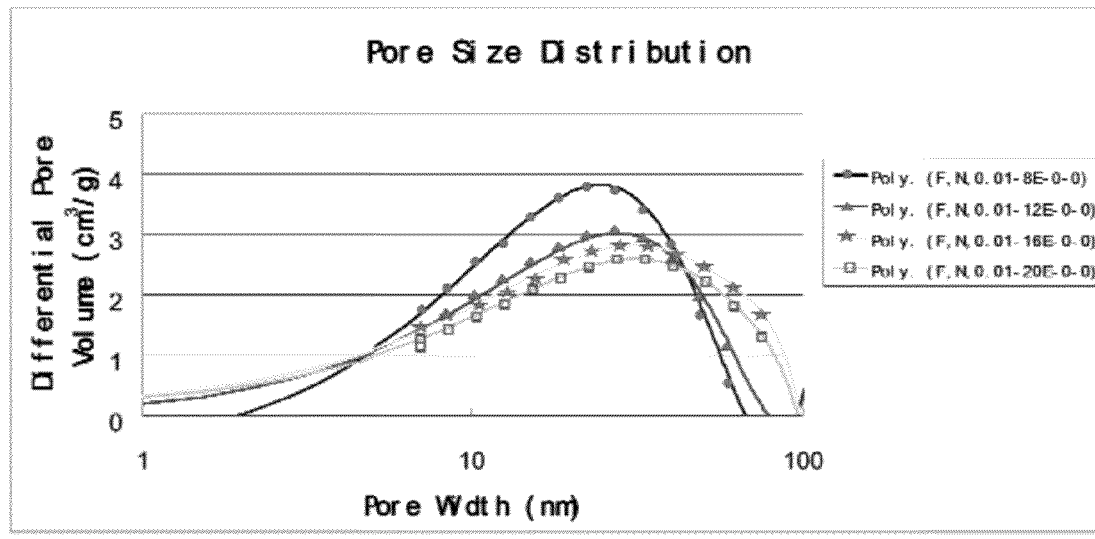
FIG. 14 shows pore size distribution of silica aerogels with various solvent concentrations.

FIGS. 13A-D depict SEM images of silica aerogels samples prepared with various solvent concentration: (A) F, N, 0.01-8E-0-0, (B) F, N, 0.01-12E-0-0, (C) F, N, 0.01-16E-0-0, (D) F, N, 0.01-20E-0-0 in which the difference in porous features among these samples are clearly presented. Gel networks composed of highly branched secondary clusters are observed in all of the four samples, but, as the solvent concentration increases, the connectivity between clusters becomes loose, and the gel structure with larger pores (>70 nm) come out, leading to decreased densities. FIG. 14 shows BET pore size distributions with various solvent concentrations, which further confirm the observations. With increasing solvent concentrations, more pore volume is occupied by larger pores with diameter >70 nm. All of these four samples have a broad pores size distribution (ranging from several nanometers up to 100 nm).

From all of the observations, increasing solvent concentration results in gel networks that have a looser connectivity and an increased pore volume from larger pores. The loose connectivity among clusters results in reduction in both yield strength and flexural modulus; nevertheless, increased larger pores' volume could further reduce the flexural modulus, since larger pores can provide more space for the movements of clusters in response to external loading. Thus, overall, we observe improved ductility in the prepared silica aerogels samples as the solvent concentration increases. From thermal conductivity measurements, a small increase in the thermal conductivities of samples with molar ratios of EtOH:Si at 16 and 20 has been observed, which is due to the increasing pore volume from larger pores (>70 nm). Since the mean free path of air is 70 nm, gas conduction from air molecules inside those larger pores will contribute more to the heat transfer, resulting in higher thermal conductivity values.

The decreasing effects on both the yield strength and flexural modulus with increasing solvent concentration can be explained by the effect of the solvent on the condensation rate as well as the depolymerization rate. During the sol-gel reactions, solvent could affect the condensation rate and the depolymerization rate through hydrogen bonding to precursor molecules. Increases in solvent concentration will decrease the concentration of hydrolyzed silanol clusters in the solution and increase the spacing between the reacting species, which in turn decrease the condensation rate and result in a longer gelation time. Furthermore, for ethanol, under base-catalyzed condensation, hydrogen bonding is more likely formed between the ethanol molecules and deprotonated silanols, resulting in further decreased condensation rate. Thus, increasing gelation time is observed even after the addition of gelation inducing agent (NH$_4$F) in the third step. Also, under base-catalyzed polymerizations, the strength of OH— is crucial to the resulting gel systems. Ethanol molecules are active in forming hydrogen bonds with OH—, which enable OH— to be even weaker nucleophile. Under these conditions, depolymerizations are suppressed, and crosslinked gel networks consisting of highly branched polymeric clusters are formed. Therefore, gel networks generated from higher solvent concentration during condensation and gelation will have lower densities, better ordered cross-linked structures with highly branched polymeric clusters, which contribute to lower yield strength and flexural modulus. For the molar ratio of EtOH:Si at 16, silica aerogel with well constructed gel networks and better ductile properties, as well as good withstanding of drying stress, were developed. Therefore, the effect of catalyst concentration, EtOH:Si was kept at 16 for the remainder of the experiments as provided herein.

Example 10

Varying Third-Step Catalyst Concentrations

Previous investigations have shown that the F− ion has remarkable catalytic effects on the rate of condensation reactions. Further investigations about the effects of catalyst concentration in the third step during the 3-step method sol-gel process on the aerogel's physical properties is provided.

Five silica aerogels samples were prepared by varying molar ratio of NH$_4$F:Si from 0.002 to 0.01 while maintaining other parameters at constant values. Table V shows the properties of silica aerogels prepared from different molar ratios of NH$_4$F:Si during the third step. In the sample name, the number after F, N is the molar ratio of NH$_4$F:Si. It can be seen that, the aerogel's density, yield strength, and flexural modulus all decrease significantly with increasing molar ratios of NH$_4$F:Si. Among them, the molar ratios of NH$_4$F:Si at 0.006, 0.008 and 0.01 all yield silica aerogels with densities lower than 0.01 g/cm$^3$, out of which, only the molar ratio of NH$_4$F:Si at 0.01 retains volume higher than 90%. This shows that the formed gel structure is less affected by drying conditions and that the gel structure is sufficient strong to resist drying stress.

Recalling our previous results, we obtained thermal conductivities of 9~10 mW/mK for all the five silica aerogels samples by hotwire measurements. This is again much lower than previously reported silica aerogels' thermal conductivity of 15 mW/mK.

Figure 15:
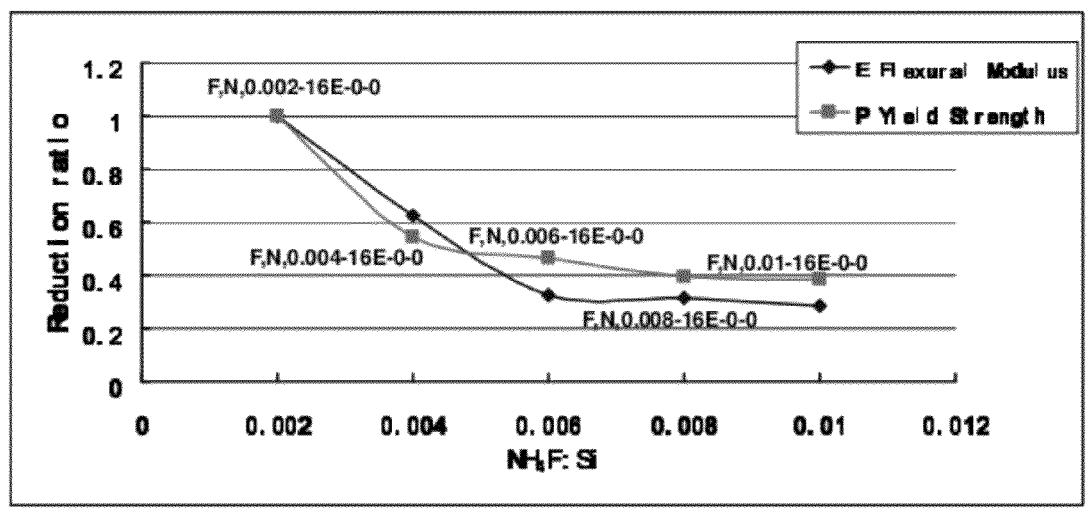
FIG. 15 shows reduction ratios in both yield strength and flexural modulus vs. molar ratio of $NH_4F$:Si.
Figure 16A:
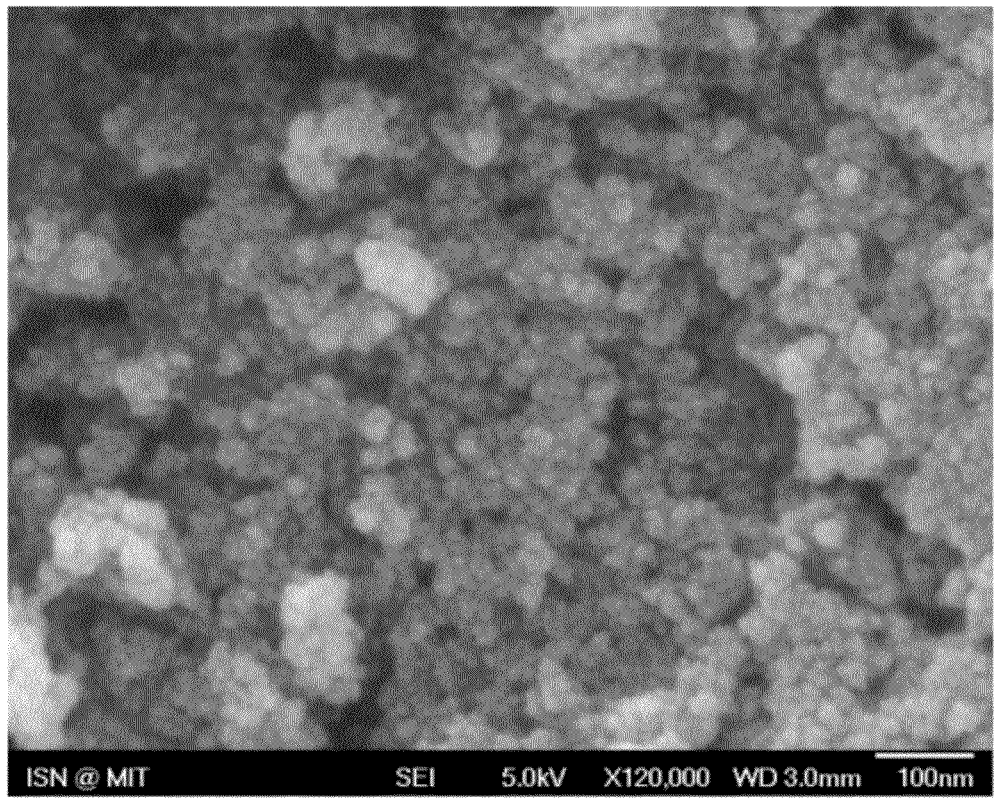
FIGS. 16A-16E present SEM images of silica aerogels samples prepared with various catalyst concentration: (A) F, N, 0.002-16E-0-0, (B) F, N, 0.004-16E-0-0, (C) F, N, 0.006-16E-0-0, (D) F, N, 0.008-16E-0-0, (E) F, N, 0.01-16E-0-0.
Figure 16B:
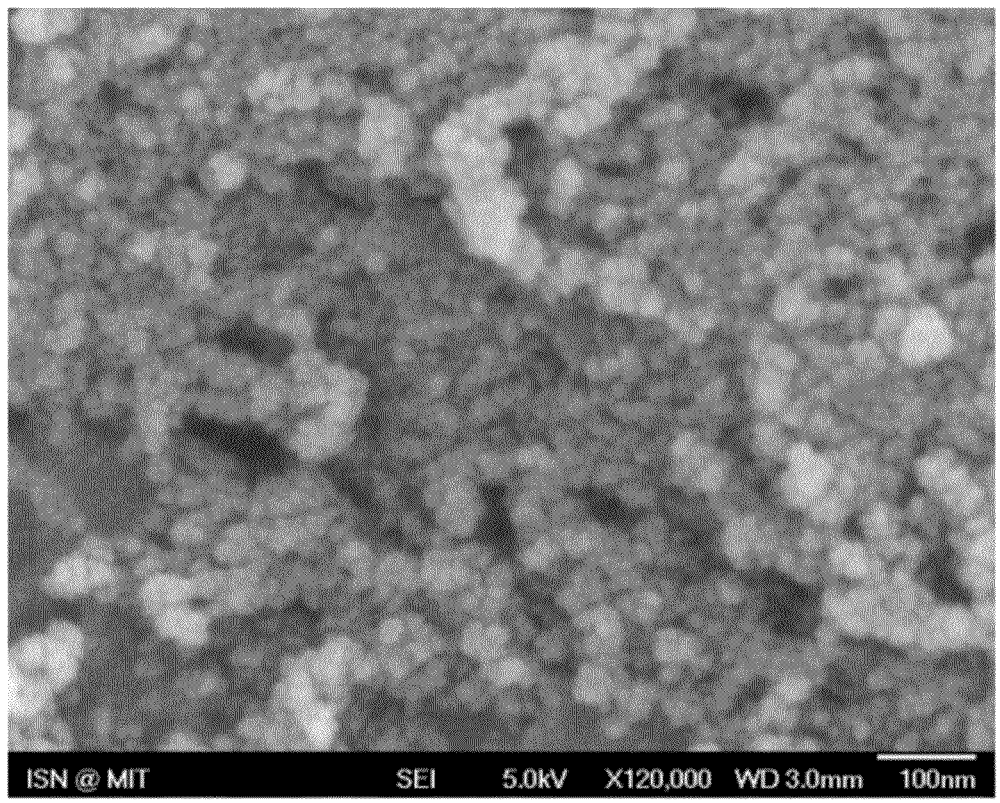
Figure 16C:
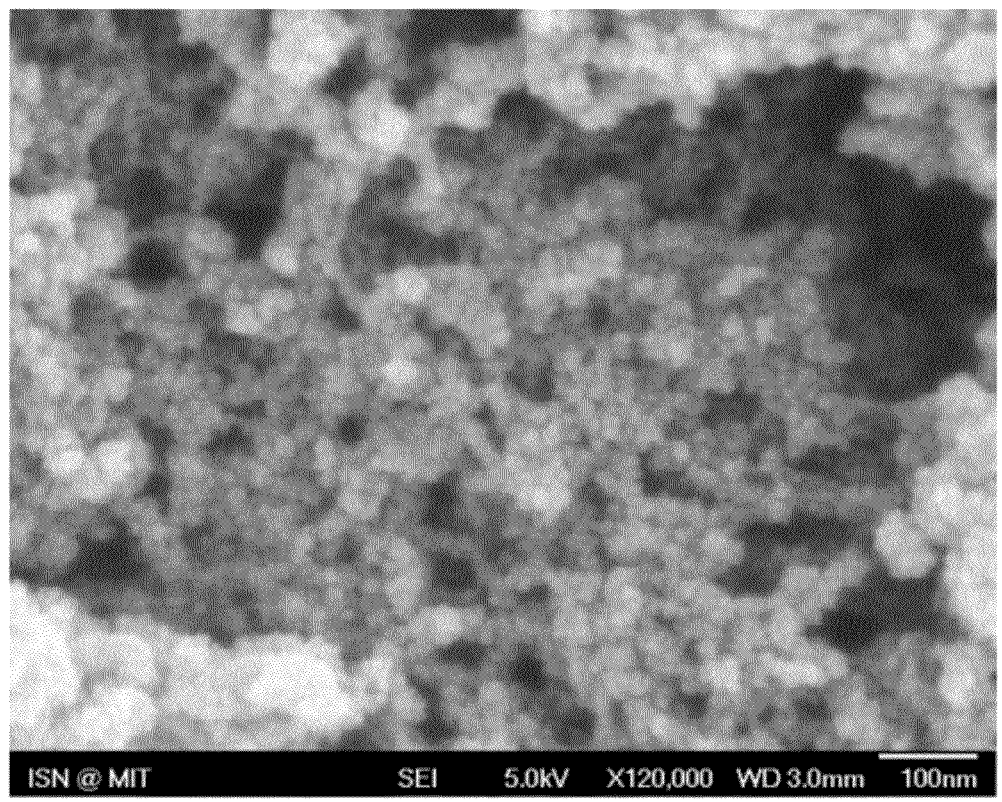
Figure 16D:
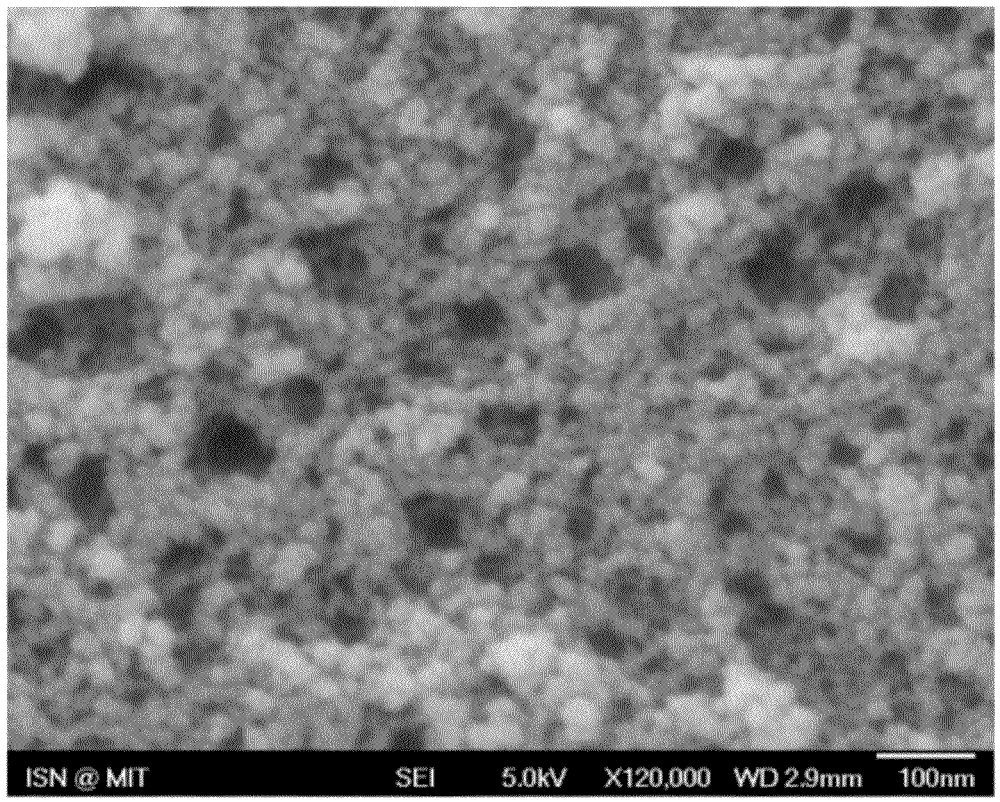
Figure 16E:
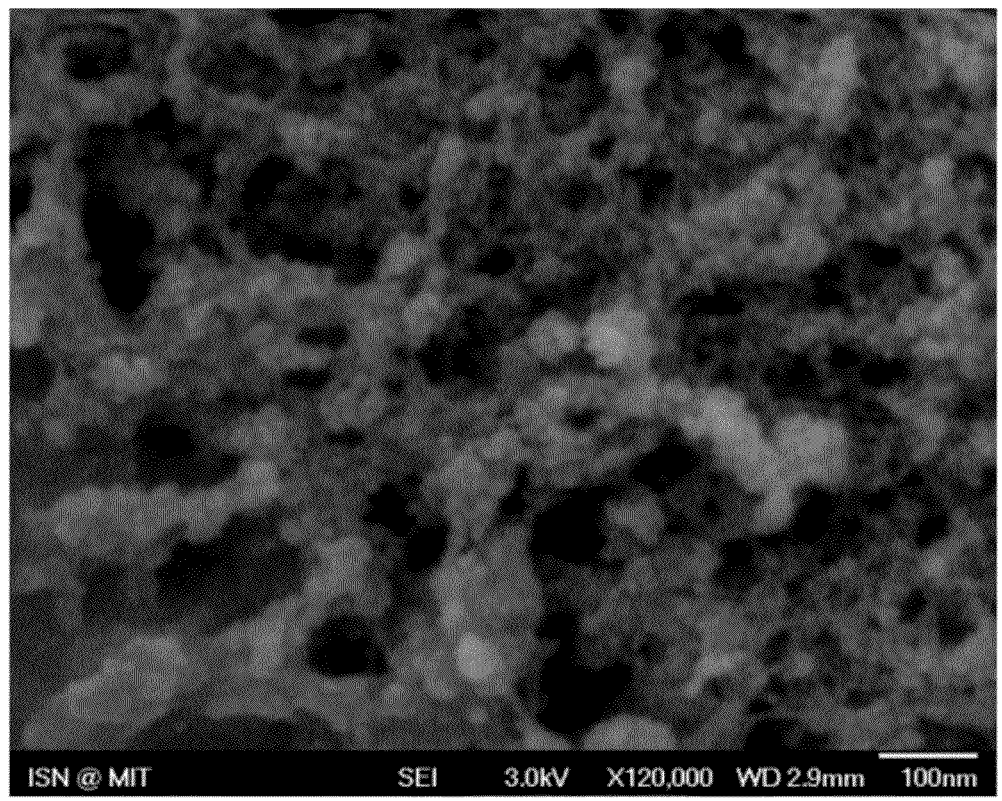

Similar analysis on the reduction ratios in yield strength and flexural modulus has been performed on all samples using the yield strength and flexural modulus of sample F, N, 0.002-16E-0-0 as the reference values (P0, E0). FIG. 15 shows the reduction ratios (P/P0, E/E0) in both yield strength and flexural modulus vs. molar ratios of $NH_4F$:Si. From FIG. 16, samples with molar ratios of $NH_4F$:Si at 0.006, 0.008 and 0.01 have improved elastic properties than the reference sample. Therefore, samples with higher catalyst concentrations have improved ductile properties. Thus, increasing both molar ratios of EtOH:Si and $NH_4F$:Si can produce silica aerogels with improved ductility. And, taking advantage of the proposed 3-step method with better controls of the sol-gel process, further enhancements of the ductility of silica aerogels can be realized by separate controls in the reduction ratios of yield strength and flexural modulus through structure modification agents.

explained by the catalytic effects of F— on the condensation rate. F— catalyzed condensations involves the displacement of OH— with F—, which is more electron-withdrawing than OH—. The replacement of F— with OH— causes a reduction in the electron density of Si, thereby making nucleophilic attack from the other OH— groups much easier to occur and increasing condensation rate. Also, a shorter gelation time has been observed with increasing molar ratio of $NH_4F$:Si. Therefore, gel networks produced from higher molar ratios of $NH_4F$:Si are mainly composed of highly branched clusters with loose connectivity and larger pore volume, which contributes to lower yield strength and flexural modulus.

TABLE V

Properties of silica aerogels prepared from different molar ratios of $NH_4F$:Si

| Sample | Yield Strength (kPa) | Flexural Modulus (MPa) | Bulk Density (g/cm$^3$) | Porosity (%) | Volume Preserved Shrinkage (%) | Thermal Conductivity (mW/mK) |
|---|---|---|---|---|---|---|
| F,N,0.002-16E-0-0 | 62.0 +/− 8.2 | 1.36 +/− 0.10 | 0.140 +/− 0.002 | 93.6 | 55.0 | 10.93 +/− 0.05 |
| F,N,0.004-16E-0-0 | 33.7 +/− 7.1 | 0.85 +/− 0.03 | 0.121 +/− 0.002 | 94.4 | 68.5 | 10.02 +/− 0.02 |
| F,N,0.006-16E-0-0 | 28.8 +/− 7.4 | 0.44 +/− 0.02 | 0.099 +/− 0.002 | 95.4 | 78.1 | 9.80 +/− 0.02 |
| F,N,0.008-16E-0-0 | 24.4 +/− 5.2 | 0.42 +/− 0.01 | 0.095 +/− 0.002 | 95.6 | 87.1 | 9.81 +/− 0.04 |
| F,N,0.01-16E-0-0 | 23.8 +/− 4.3 | 0.39 +/− 0.03 | 0.091 +/− 0.001 | 95.8 | 91.2 | 10.01 +/− 0.02 |

Figure 17:
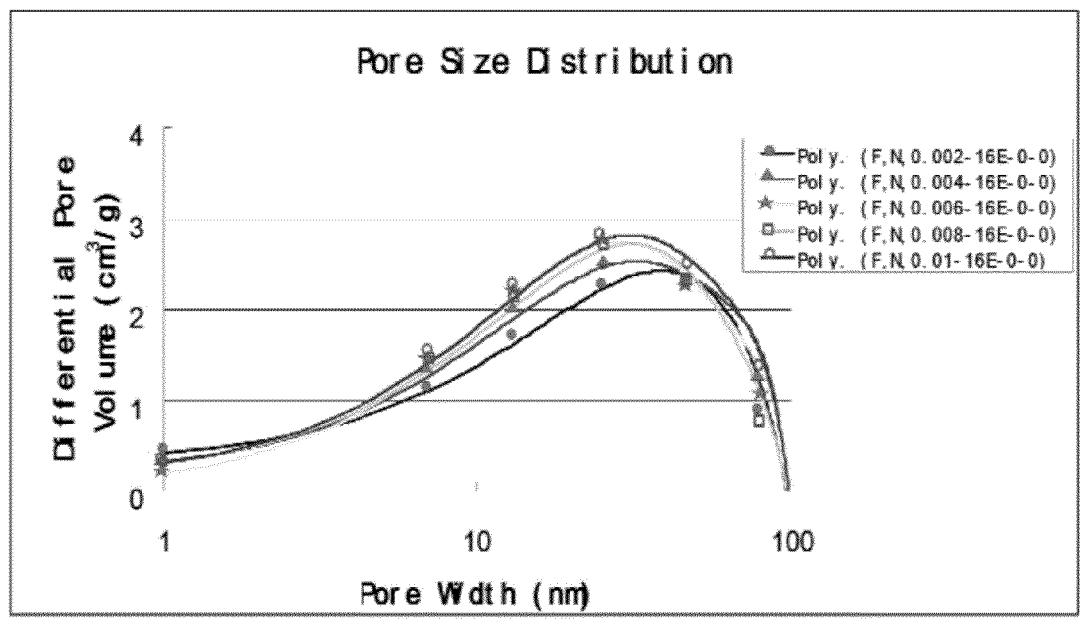
FIG. 17 illustrates pore size distribution of silica aerogels with various catalyst concentrations.

FIGS. 16A-E present high magnification SEM images of silica aerogels prepared with various catalyst concentrations and shows the difference in porous features among the samples. The catalyst concentrations are as follows: (A) F, N, 0.002-16E-0-0, (B) F, N, 0.004-16E-0-0, (C) F, N, 0.006-16E-0-0, (D) F, N, 0.008-16E-0-0, (E) F, N, 0.01-16E-0-0. As the catalyst concentration decreases, increasing in consolidation of secondary clusters as well as less pores are clearly observed, which in turn lead to formation of more compact gel structure and increased connectivity among clusters. In FIG. 17, pore size distribution of silica aerogels with various catalyst concentrations is depicted. The result of BET pore size distributions further confirms the changes in the porous feature as catalyst concentration decreases. It has been noticed that with decreasing catalyst concentration, pore volume decreases, thus, the density is increased, as shown in Table V. Yet, broad pores size distributions (from several nanometers up to 100 nm) still exist in all of the four samples.

Based on the above observations, we hypothesize that increasing catalyst concentration produces gel networks composed of highly branched polymeric clusters with looser connectivity and more pore volume. Loose connectivity among clusters results in reduction in both yield strength and flexural modulus; nevertheless, more pore volume could further reduce the flexural modulus. Therefore, overall, we observe improved ductility in the prepared silica aerogel samples with increasing catalyst concentration. From the thermal conductivity measurements, decreases in the thermal conductivities of samples with higher molar ratios of $NH_4F$:Si were observed, which could be due to the gel network consisting of less condensed clusters with loose connectivity (see Table V). Highly branched polymeric clusters and loose connectivity reduce the solid conduction, leading to lower total thermal conductivity. Slightly increased thermal conductivity of sample F, N, 0.01-16E-0-0 is due to a higher gas conduction resulting from the air molecules inside larger pores (>70 nm) (see FIG. 16E).

The effects on both of the yield strength and flexural modulus of silica aerogel by the molar ratio of $NH_4F$:Si can be Example 11

Aerogels Made Via the Three-Step Method Compared with the Prior Aerogels Made with Acidic, Basic, and Neutral Catalysis To further demonstrate that silica aerogels produced by using the 3-step method have improved ductility, we compare both of the flexural modulus and yield strength from our samples with previously reported data, see Woignier et al. Their silica aerogels were prepared under three different catalytic conditions—base, neutral or acid—and tested by using 3-point bending as well.

Figure 18A:
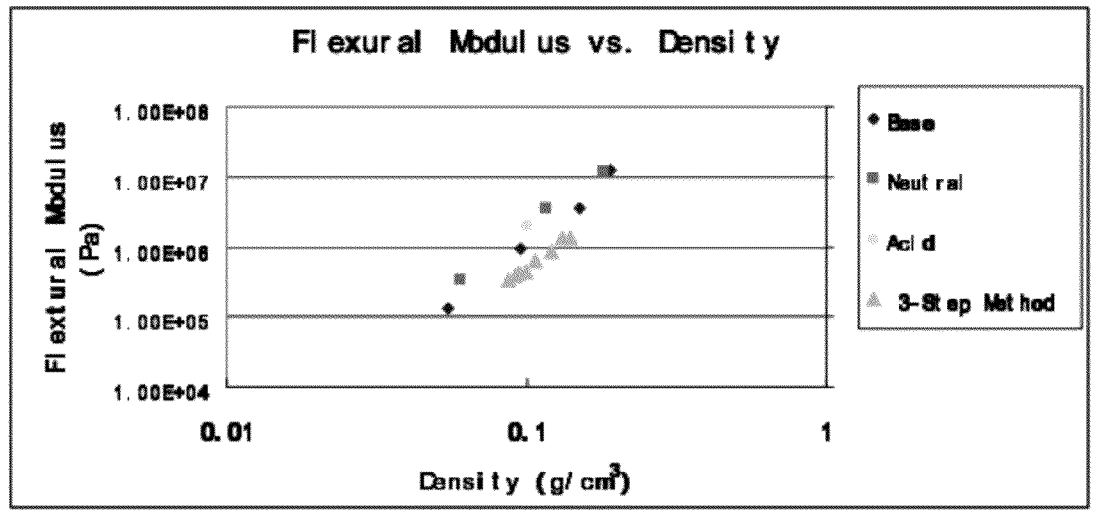
FIGS. 18A and 18B shows a comparison of mechanical properties with previously reported results.
Figure 18B:
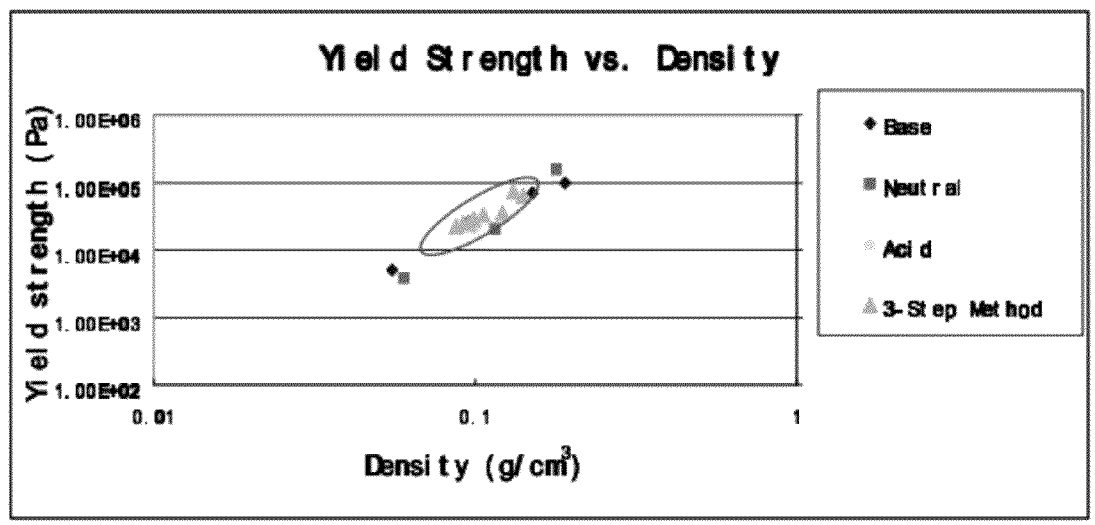
Figure 19:
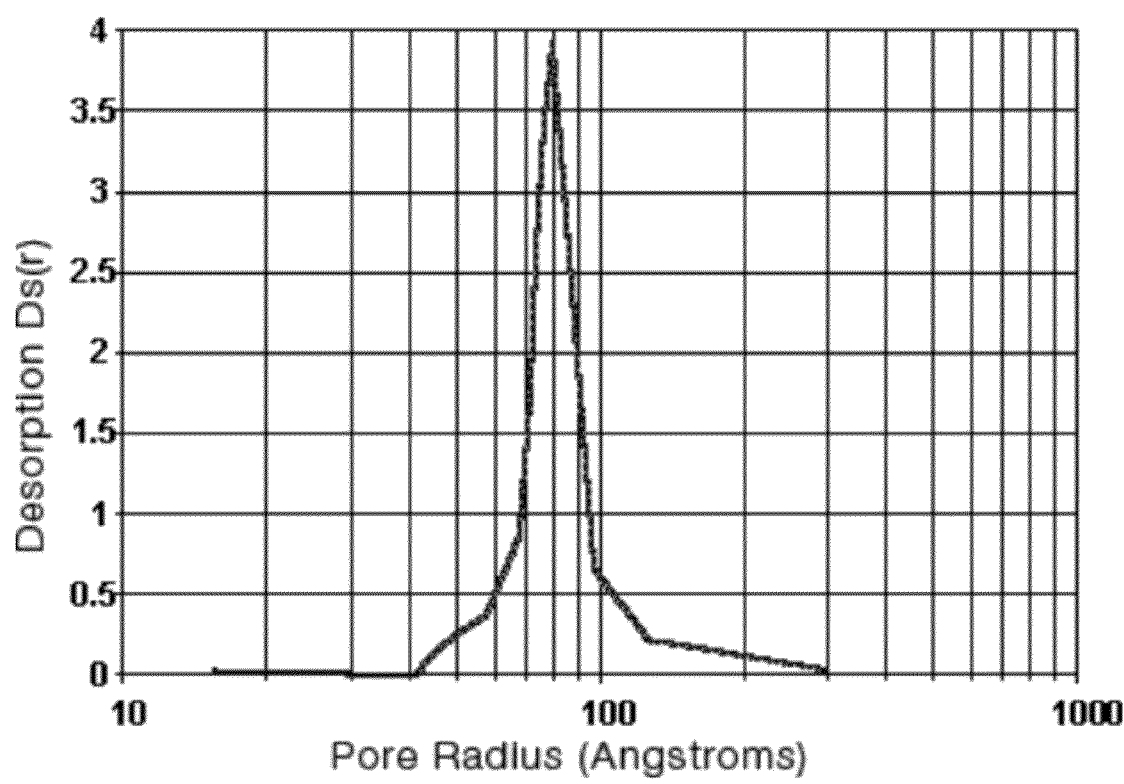
FIG. 19 shows the pore size distribution of a single step silica aerogel with thermal conductivity of 17 mW/mK.

FIG. 18A shows a plot of flexural modulus comparisons. The flexural modulus of silica aerogels prepared with the disclosed embodiments are all much lower (reduced by 50~80%) than the reported data within the same range of densities, see Woignier et al. FIG. 18B presents the yield strength of silica aerogels prepared with the disclosed embodiments. The values for silica aerogels prepared with the disclosed embodiments are located in a similar region, yet, slightly higher than the reported data of Woignier et al. Therefore, on the basis of the comparison plots, the ductility of silica aerogels produced by using the proposed 3-step method sol-gel process has been improved by 2~4 times.

Thermal conductivity measurements show that all of the silica aerogels prepared in our studies are much lower (see in Table III, IV, and V) than previously reported value of 15 mW/mK. We believe this is due to the high heterogeneous porous feature inside our silica aerogels' system. BET characterizations (see FIGS. 10, 14, and 17) show that the porous structure of our silica aerogels have a lot broader pore size distributions than others (i.e. see FIG. 20 depicting the pore size distribution of a single step silica aerogel with thermal conductivity of 17 mW/mK), and pores with diameters ranging from several nanometers to 100 nm all exist in our silica aerogels' system.

The total thermal conductivity of silica aerogels consists of contributions from three parts: conduction through solid, conduction through gas, and radiation though the particles/clusters and voids. The nanosized pores and particles/clusters are primarily responsible for the very low thermal conductivity of aerogels. However, lower thermal conductivity can be further reached by reducing the size of pores and minimizing the connectivity among particles/clusters. Comparing the pore size distribution in FIG. 17 with those of our silica aerogels in FIGS. 10, 14, and 17, we observe that more pore volume has been occupied by smaller pores with diameter of less than 10 nm in silica aerogels prepared with the disclosed embodiments, benefiting from the broader range of pore size distribution. Those smaller pores could generate regions with much lower thermal conductivity within the entire system, which limits the total heat transport. Similarly, solid conduction could also be limited by the extremely small connections among particles/clusters. Those regions composed of smaller pores and loosely connected particles/clusters within the heterogeneous porous structure of silica aerogels prepared with the disclosed embodiments limit the total heat transport and contribute to the extremely low thermal conductivities.

Example 12

Discussion

In an embodiment, a new 3-step method for sol-gel process, which provides better control of the clusters growth and formation of gel network. For the 3-step method, we employ three different catalysts to realize individual controls for hydrolysis, condensation and gelation. Silica aerogels with good quality in terms of low density, low thermal conductivity, improved ductility and better mechanical integrity have been produced. On the whole, the ductility of the silica aerogels produced by using the proposed 3-step method has been improved by 2-4 times.

Further investigations on the effects of sol-gel processing parameters on physical properties of silica aerogels have also been conducted by preparing samples with various solvent concentrations and catalyst concentrations through the proposed 3-step method. Experimental results have been consistently explained on the basis of SEM and BET characterizations.

Finally, we conclude that: (1) gel structure composed of larger pore volume, highly branched polymeric secondary clusters with loose connectivity contributes to silica aerogels' ductility; (2) larger pores (>70 nm), consolidation of secondary clusters, and increased connectivity among clusters produce higher thermal conductivity; (3) nevertheless, the heterogeneity of microstructure system of our silica aerogels contribute to the extremely lower thermal conductivities.

Example 13

Aerogels with Structural Modification

A 3-step method is used to enhance mechanical properties of silica aerogels through structure modification. During the preparation of the modified silica aerogels, a small amount of water-soluble inorganic synthetic nanocomposite (Laponite® RDS) is added. The molecular-level synergism between silica nanoparticles and the functional nanocomposite inverts the relative host-guest roles in resulting aerogels' composite, leading to new stronger and more robust low-density materials. After being dried with supercritical $CO_2$, the modified silica aerogels have been characterized by 3-point bending, transient hotwire measurements, scanning electron microscopy (SEM), and Brunauer, Emmett and Teller (BET) method. Improved ductility and lower thermal conductivities have been observed. The effects of doped Laponite® RDS content on the microstructure and physical properties of prepared modified silica aerogels have been investigated and discussed.

Tetraethyl orthosilicate (TEOS, ≥98.0% (GC)) and ammonia standard solution (2.0 M in ethanol) were purchased from Sigma-Aldrich and used as received. Deionized water was obtained from Ricca Chemical Company. Anhydrous ethanol (ACS/USP grade) was from Pharmoco-Aaper Inc. Other materials were: hydrochloric acid (0.05 M) from ARISTAR and ammonium fluoride (1 M) from Acros Organics, both in the form of deionized water solutions. Laponite® RDS was obtained from Southern Clay Products, Inc. For supercritical drying, liquid carbon dioxide tank with siphon tube was purchased and used as received from Airgas. Inc In this study, silica aerogels' sample (F, N, 0.01-16E-0-0) without modification was prepared using previously described 3-step method. For the first step, the precursor solution was placed for hydrolysis with sub stoichiometric water under acid condition for 1.5 h and the molar ratios of starting materials TEOS:EtOH:H2O:H+ were kept at 1:3:1:7×10-4. During the second step, additional EtOH, water and ammonia solution were added to increase molar ratios of TEOS:EtOH:H2O:$NH_3$.$H_2O$ to be 1:16:4:2×10-3, stiffing for 0.5 h. For the third step, 1 ml ammonium fluoride (1M) was added as gelation agent and sol solutions were poured into molds before gelation point.

For the preparations of the modified silica aerogels' samples, the binder (Laponite® RDS) was first dissolved into water to form dispersed solution (10 wt % and 20 wt %). 3-step method was also employed in this experiment set. The first step was the same as described previously. In the second step, after the additions of EtOH, water and ammonia solution, binder solution (1 ml, 3 ml, or 5 ml of 10 wt % for sample F, N, 0.01-16E-0.1-20, F, N, 0.01-16E-0.3-20, or F, N, 0.01-16E-0.5-20, respectively, and 5 ml 20 wt % for sample F, N, 0.01-16E-1.0-20) was added by keeping the molar ratios of TEOS:EtOH:H2O:$NH_3$.$H_2O$ constant at 1:16:4:2×10-3. The mixture sol solution was then ultrasonically dispersed for 20 min, following with stiffing for another 10 min. During the third step, 1 ml ammonium fluoride (1M) was added as gelation agent and sol solutions were poured into molds prior to gel point. All the wet gels obtained were first aged for three days under ethanol and then washed three times with fresh ethanol, with 24 h interval. After being dried by supercritical CO2, all the samples were ready for further investigations.

Samples with various binder concentrations were prepared by keeping all the other sol-gel synthesis parameters at constant values. Table VI gives the properties of the prepared binder modified silica aerogels. It can be seen that, as the binder's concentration increases, aerogel's density, yield strength, and flexural modulus increase. Slight decreases in sample F, N, 0.01-16E-0.5-20 may come from the non-uniform dispersion of the binder clusters in the sol solution prior to gelation, due to increasing number of binder condensates at higher binder concentrations. Hotwire measurements show that thermal conductivities of all the prepared silica aerogels vary from 10 to 11 mW/mK, much lower than previously reported silica aerogels' thermal conductivity of 15 mW/mK.

TABLE VI

Properties of silica aerogels prepared from different binder concentrations

| Sample | Weight Percentage of Binders (wt %) | Yield Strength (kPa) | Flexural Modulus (MPa) | Bulk Density (g/cm$^3$) | Thermal Conductivity (mW/mK) |
|---|---|---|---|---|---|
| F, N, 0.01-16E-0-0 | 0 | 23.8 +/− 4.3 | 0.39 +/− 0.03 | 0.091 +/− 0.001 | 10.01 +/− 0.02 |
| F, N, 0.01-16E-0.1-20 | 1.34 | 35.3 +/− 3.5 | 0.58 +/− 0.03 | 0.108 +/− 0.002 | 10.28 +/− 0.03 |
| F, N, 0.01-16E-0.3-20 | 4.46 | 58.9 +/− 2.4 | 1.34 +/− 0.05 | 0.122 +/− 0.002 | 10.59 +/− 0.02 |
| F, N, 0.01-16E-0.5-20 | 5.9 | 54.3 +/− 3.6 | 1.22 +/− 0.11 | 0.123 +/− 0.002 | 10.72 +/− 0.03 |
| F, N, 0.01-16E-1.0-20 | 13.7 | 62.9 +/− 2.5 | 2.50 +/− 0.11 | 0.155 +/− 0.006 | 11.07 +/− 0.04 |

Figure 20A:
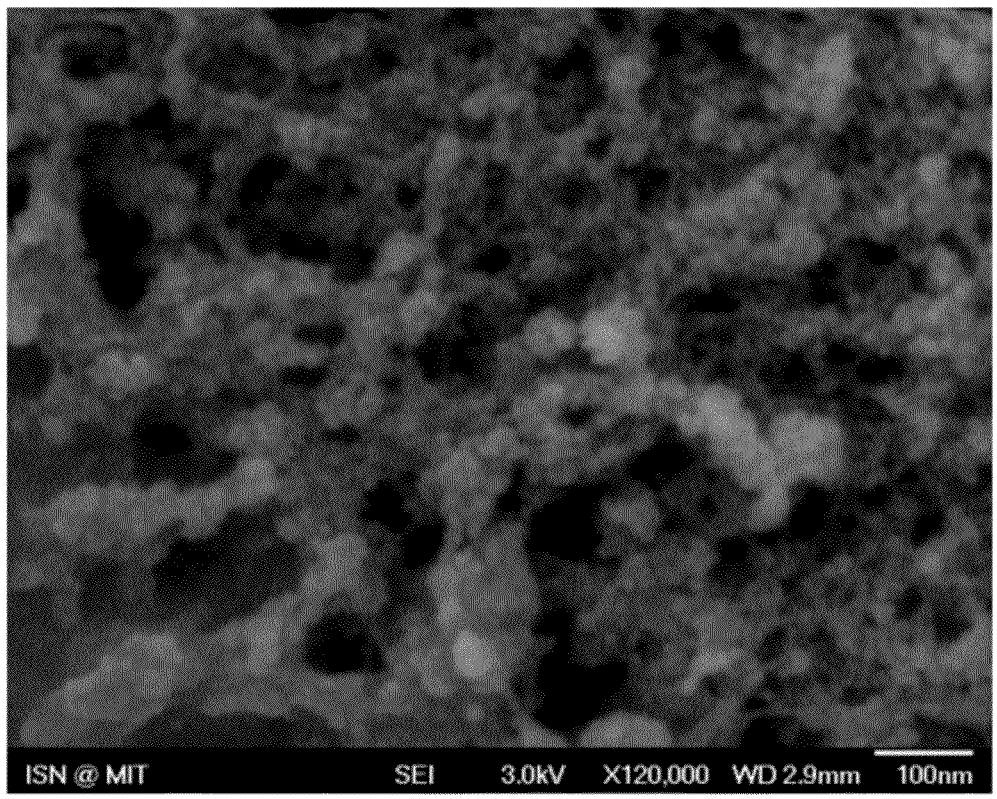
FIGS. 20A-20E presents SEM images of silica aerogels samples prepared with various binder concentrations: (A) F, N, 0.01-16E-0-0, (B) F, N, 0.01-16E-0.1-20, (C) F, N, 0.01-16E-0.3-20, (D) F, N, 0.01-16E-0.5-20, (E) F, N, 0.01-16E-1.0-20.
Figure 20B:
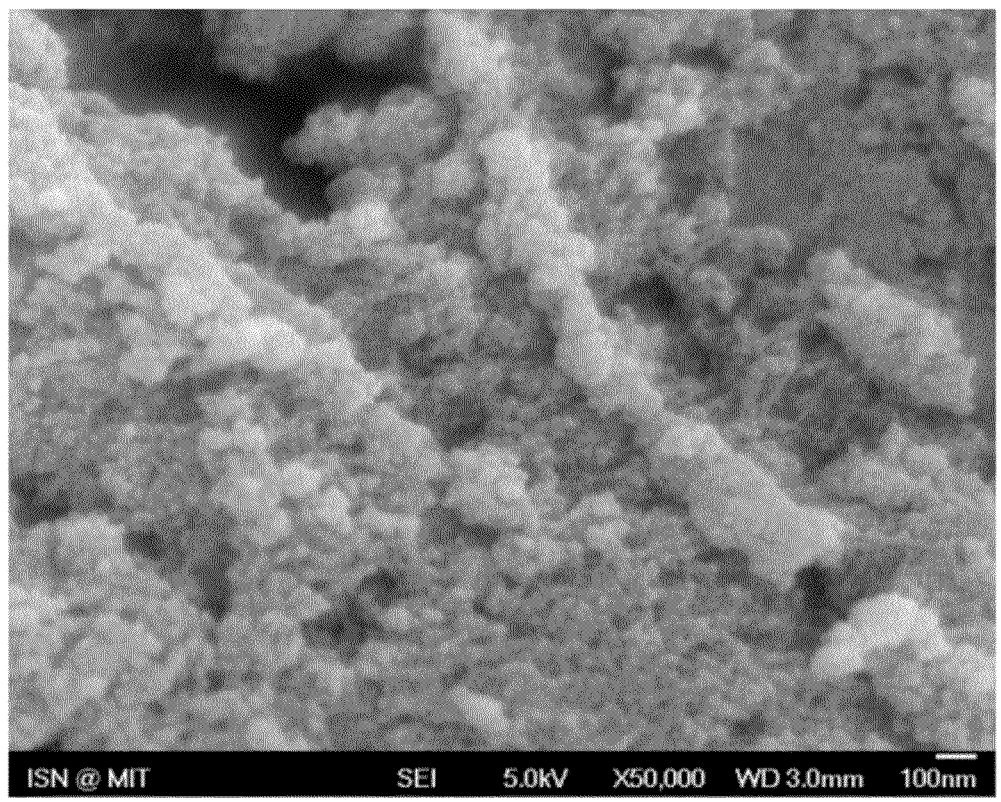
Figure 20C:
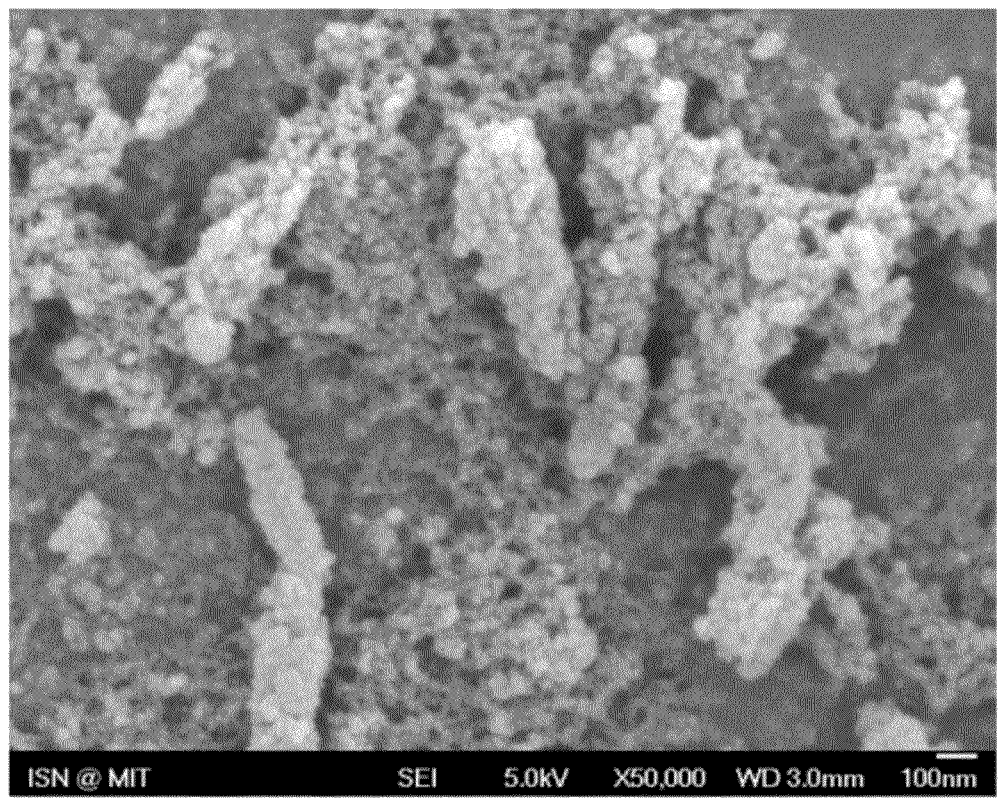
Figure 20D:
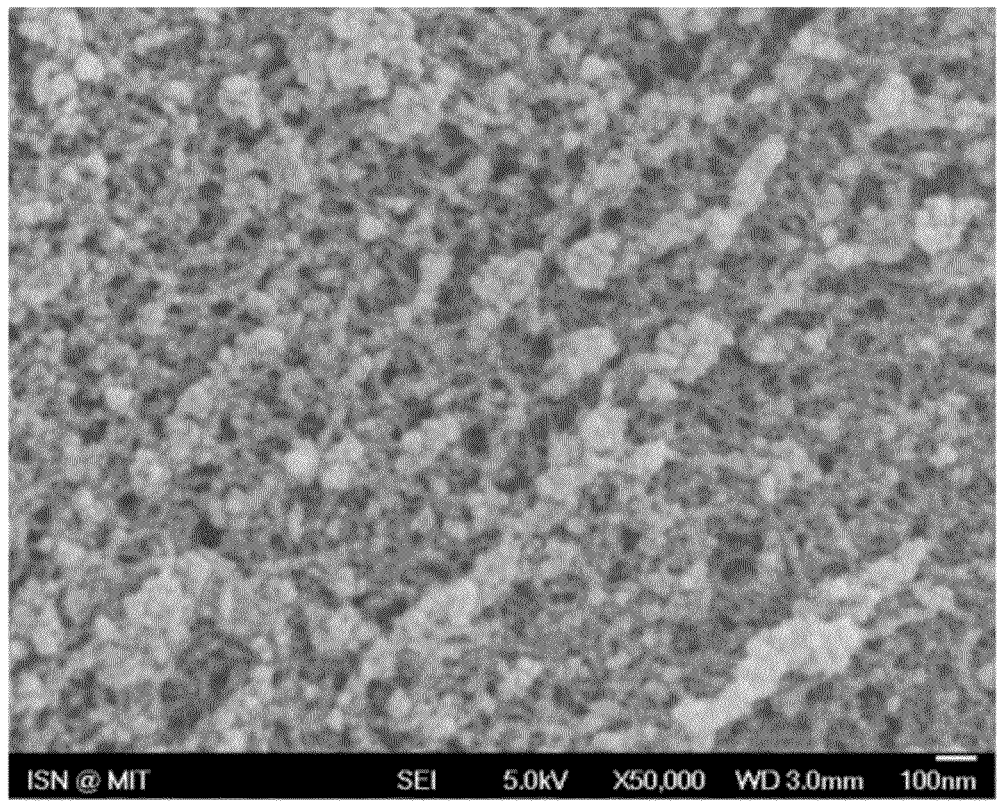
Figure 20E:
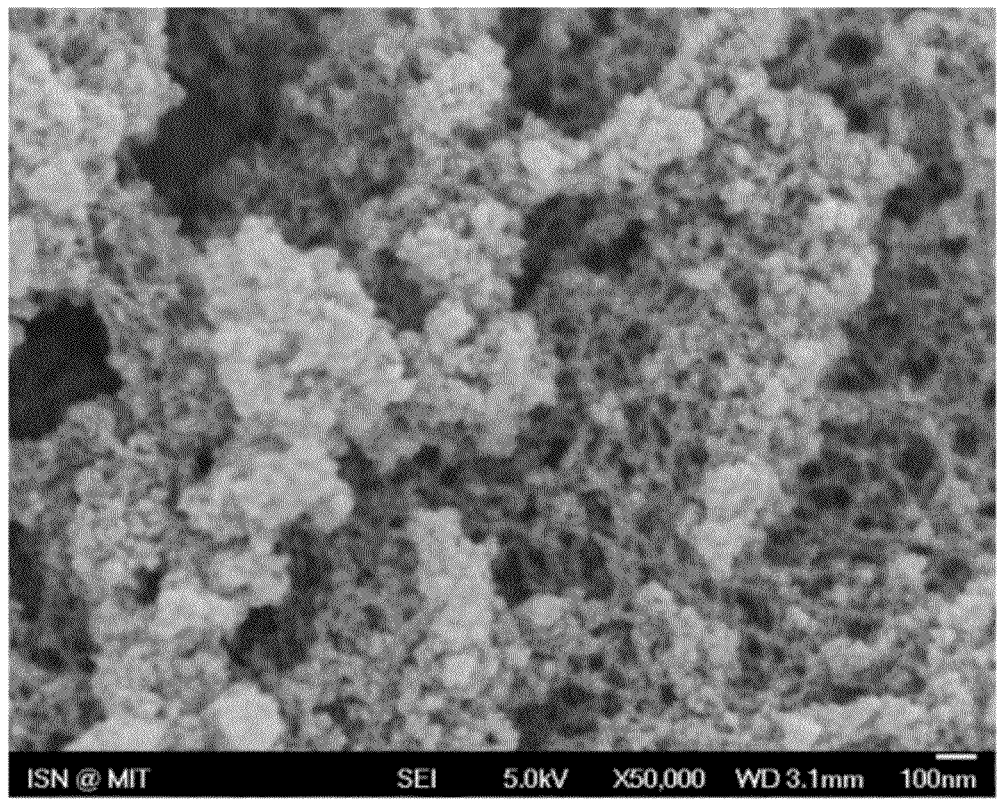
Figure 21:
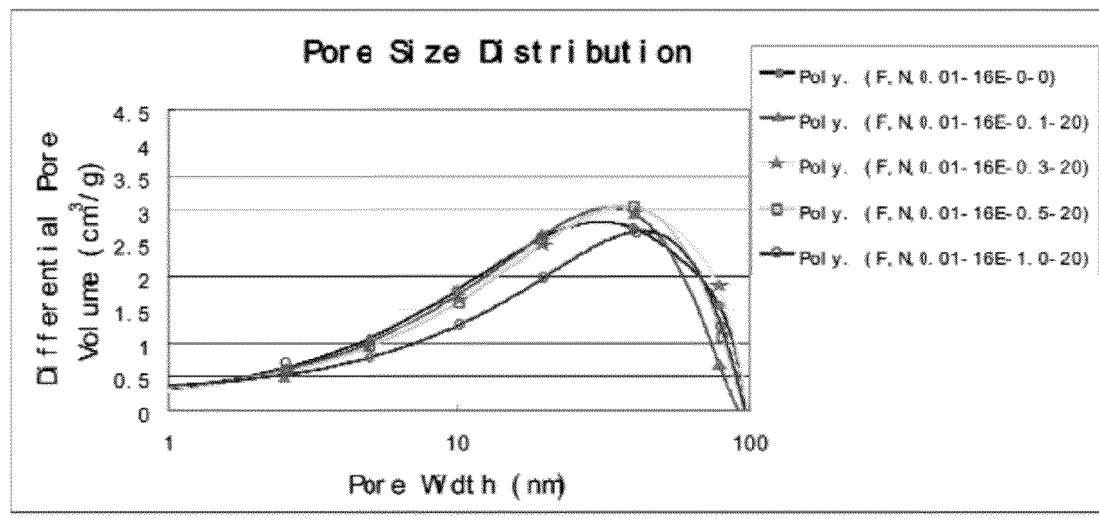
FIG. 21 shows pore size distribution of silica aerogels with various binder concentrations.

FIGS. 20A-E show the SEM images of the silica aerogels prepared by varying binder concentrations: (A) F, N, 0.01-16E-0-0, (B) F, N, 0.01-16E-0.1-20, (C) F, N, 0.01-16E-0.3-20, (D) F, N, 0.01-16E-0.5-20, (E) F, N, 0.01-16E-1.0-20. The differences in the porous feature among these samples are presented. In FIG. 20A, gel networks consisting of larger pores, highly branched polymeric clusters with loose connectivity are formed by using the 3-step method. On the basis of previous discussions herein, these structure features contribute to lower yield strength and flexural modulus of silica aerogels. From FIGS. 20B-D, gel networks with doped binders (Laponite® RDS) content are observed and binders exist in the form of larger and extremely condensed cylindrical clusters surrounded by cross-linked porous gel structure. As the binder's concentration increases, increasing in the number of the binder clusters is observed. It is worth to point out that, despite the existence of the doped binders, highly cross-linked porous structures composed of less condensed silica clusters with loosely connected network are preserved in all the binder modified aerogel samples. In FIG. 21, BET pore size distributions further confirm the observations on the porous feature from SEM. Broad pores size distributions (from several nanometers up to 100 nm) are observed in all the five samples, corresponding to the highly cross-linked porous structures. However, it has been noticed that as the binder concentration increases, pore volume decreases, thus, resulting in increased densities.

Figure 22A:
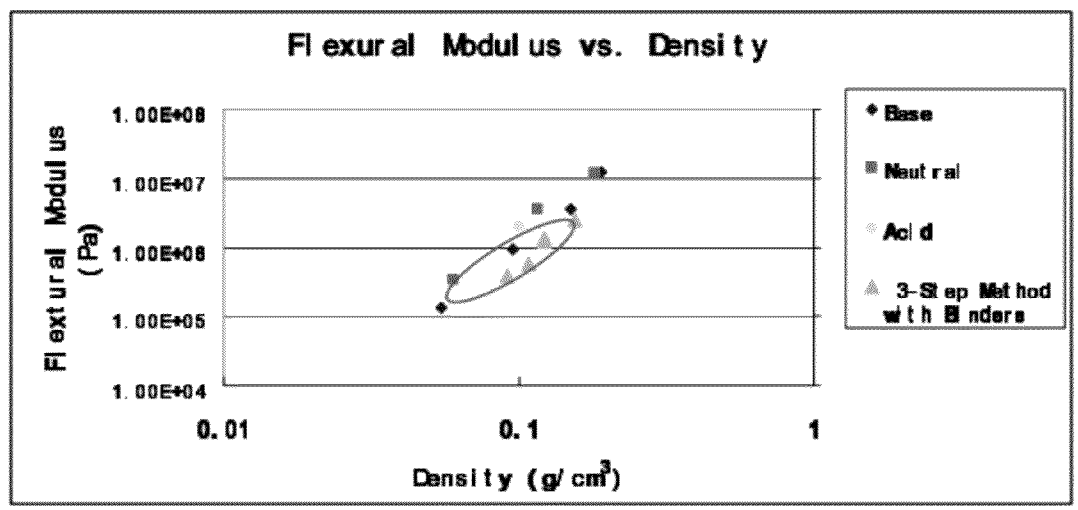
FIGS. 22A and 22B show a comparison of mechanical properties with previously reported results.
Figure 22B:
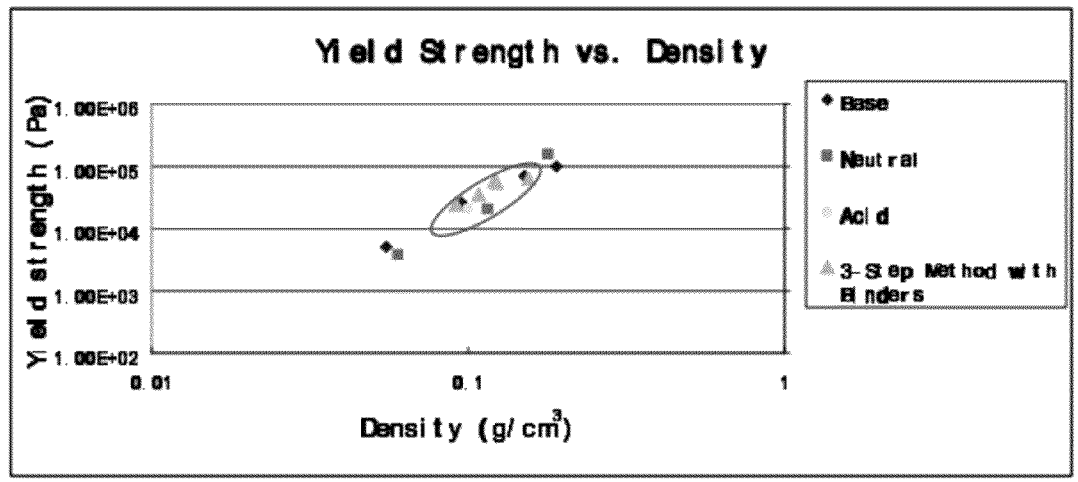

To investigate the enhancements of the ductile properties of the binder modified silica aerogels, we compare both of the flexural modulus and yield strength with previously reported data (see FIGS. 22A and 22B comparing mechanical properties with previously reported results of Woignier). The reported silica aerogels were prepared under three different catalytic conditions, base, neutral or acid, and the mechanical properties were tested by using 3-point bending, which has also been employed in our testings. FIG. 22A shows the plot for flexural modulus comparison. We notice that the flexural modulus values of our silica aerogels are all much lower than the reported values with the same range of densities. Nevertheless, the plot for yield strength comparison in FIG. 22B further shows that the yield strength values of our silica aerogels are located around the same region, yet, slightly higher than the reported values. Therefore, based on the two plots, we are confident that the ductility of silica aerogels produced in our studies has been improved. However, sample F, N, 0.01-16E-1.0-20 with the largest binder concentration doesn't give too much improvement in the ductility comparing to others.

From the transient hotwire measurements (see Table VI), extremely low thermal conductivities have been reached in all the five samples. Slight increases in the thermal conductivities of the samples with higher binder concentrations have been noticed, which could be contributed to the increasing numbers of binder condensates. With the presence of highly consolidated cylindrical binder condensates, solid conduction is enhanced, contributing to the total heat transport, thus, resulting in higher thermal conductivities. Yet, highly porous gel structures composed of less condensed silica clusters with loosely connected networks are preserved in all the binder modified samples. We believe it is the gel networks consisting of the unique porous feature that limit the total heat transport, contributing to the extremely low thermal conductivities.

The enhancements of the ductile properties of silica aerogels could be explained by the effects of doped Laponite® RDS content on the microstructure of the prepared binder modified silica aerogels.

Figure 23:
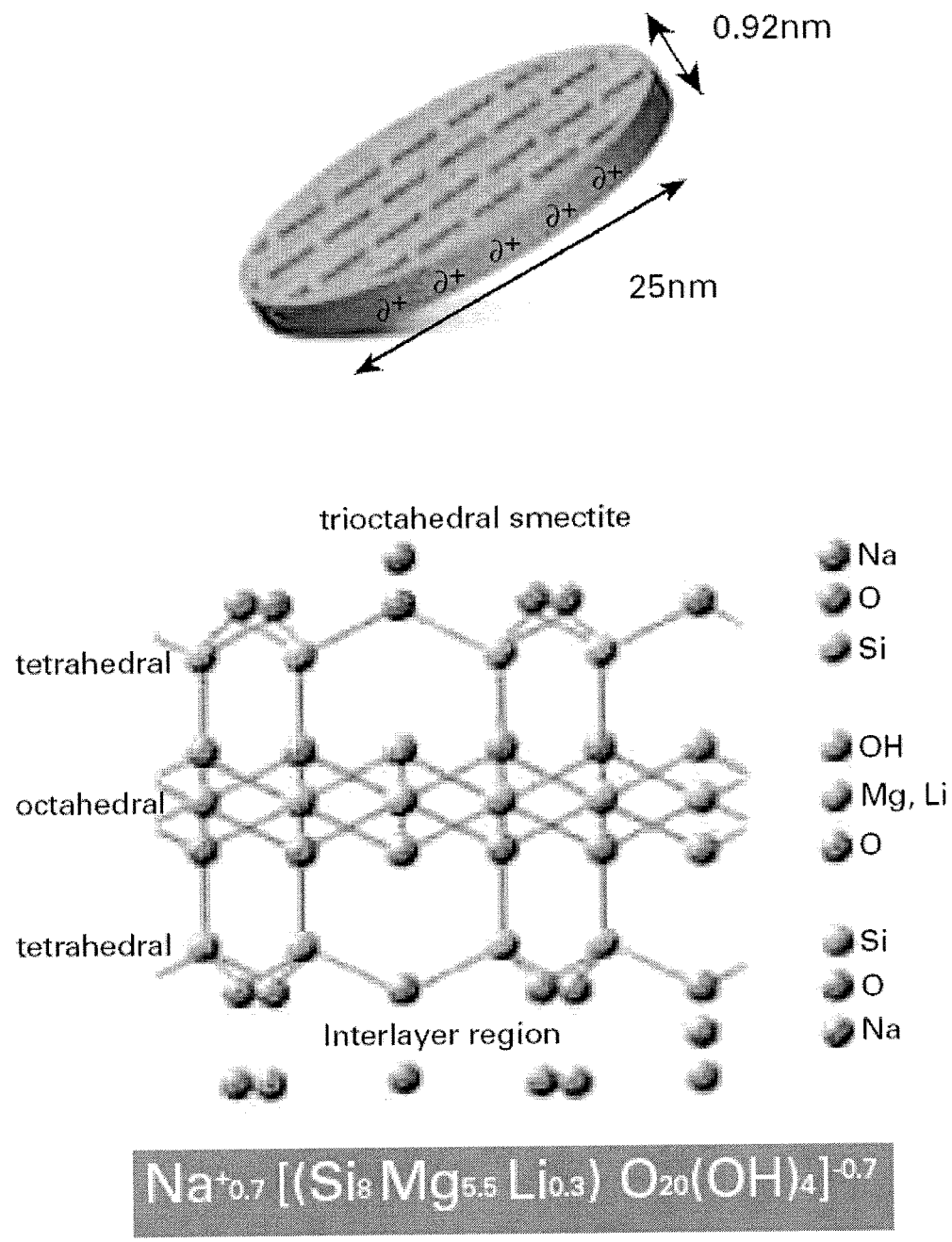
FIG. 23 shows single crystal (left) and molecular structure (right) of Laponite.
Figure 24:
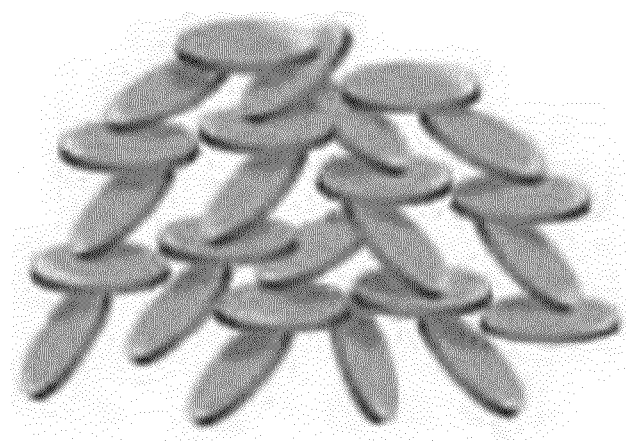
FIG. 24 illustrates formation of a "House of Cards" structure of Laponite crystals.

Laponite® RDS is a sol forming grade of synthetic layered crystalline silicate incorporating an inorganic polyphosphate (TSPP) as dispersion agent. When dissolved in water, colorless, translucent and colloidal, low viscosity dispersions known as sols are formed. Laponite has a layer structure which, in dispersion in water, is in the form of two-dimensional disc-shaped crystals, with the empirical formula of single crystal unit as shown in FIG. 23. This shows six octahedral magnesium ions sandwiched between two layers of four tetrahedral silicon atoms. These groups are balanced by twenty oxygen atoms and four hydroxyl groups. When Laponite® RDS powder is added into water, the blended TSPP dissolves, the pyrophosphate (P2O7)4-anions become associated with the positively charged edges of the Laponite crystal, making the whole particle negatively charged. This is subsequently surrounded completely by a loosely held layer of hydrated sodium ions, whose positive charges cause mutual repulsions between the dispersed Laponite crystals. Thus, stable Laponite sol dispersion is formed. When a sol dispersion of Laponite is added into solution containing simple salts, surfactants, other solvents, or soluble impurities, the dispersing effect of the TSPP is rapidly overcome as the pyrophosphate anions are absorbed by the other compounds. At this time, adjacent Laponite crystals will begin to interact with each other and the "house of cards" type structure can form (see FIG. 24 depicting the formation of a "house of cards"), resulting in viscosity increase of the entire solution. This unique feature of Laponite gives the opportunity to modify materials at the microstructure level.

During our preparation of binder modified silica aerogels, the Laponite sol dispersion was added during the second step of sol-gel process. By the end of first step for hydrolysis, small reactive silanol oligomers were presented in the sol solution. Upon the addition of Laponite dispersion, the dispersing effect of the TSPP was overcome as the pyrophosphate anions were absorbed by the solvent and newly formed silanol oligomers. Then, the adjacent Laponite® crystals began to interact with each other and condensates with the "house of cards" structure were formed, corresponding to the larger and extremely condensed cylindrical clusters seen in SEM images. Ultrasonication was employed to promote formation of uniform sol mixture.

Significant increase in viscosity of the sol solution was observed. In the third step, with the addition of $NH_4F$ to induce gelation, wet gels were formed and then dried under supercritical CO2.

The Laponite® crystals interact with the silica network in two ways: (1) the crystals stack together and are formed in a "house of cards" structure through electrostatic bonds, resulting in the formation of larger highly condensed clusters (Laponite condensates) observed in SEM; (2) the hydroxyl groups on the surface of the Laponite condensates bond with hydrolyzed silanols, so that the condensates are surrounded by cross-linked porous structure. Bondings between the Laponite condensates unlikely occur due to the limited number of hydroxyl groups on the surface.

The Laponite condensates, consisting of high consolidation structure, contribute to the enhancements in both yield strength and flexural modulus the binder modified silica aerogels. In the binder modified structures, the surrounded porous silica networks link all the Laponite condensates together to form bulk composite. The surrounded porous structure provides more space for the movements of silica clusters and Laponite condensates with response to external loading, contributing to the flexibility. Thus, overall, at lower binder concentrations, we observe improved ductility in the binder modified silica aerogels. However, due to the lack of bonding between the doped Laponite condensates, the yield strength will increase less than the flexural modulus. Therefore, at higher binder concentrations, the binder modified aerogels, such as F, N, 0.01-16E-1.0-20, doesn't show too much improvement in the ductile properties comparing to others at lower binder concentrations.

We have demonstrated the ability of enhancing mechanical properties of silica aerogels through structure modification by using 3-step method. Laponite® RDS, a water soluble silicate was incorporated into the sol-gel synthesis of silica aerogels as structure modifying agent. Silica aerogels with improved ductile properties have been produced. Furthermore, extremely low thermal conductivities have been retained in all the prepared samples benefiting from the preservation of highly cross-linker porous structures. Explanations of the observations have been discussed and supported on the basis of SEM and BET characterizations.

One skilled in the art will appreciate further features and advantages of the invention based on the above-described embodiments. Accordingly, the invention is not to be limited by what has been particularly shown and described, except as indicated by the appended claims. All publications and references mentioned herein are expressly incorporated herein by reference in their entirety.

What is claimed is:

1. A silica aerogel, free of a non-silica content, comprising:
   a network of primary silicate clusters comprising silica particles having diameters from 1 to 10 nm interconnected to form diversely-sized secondary silicate clusters having diameters greater than 20 nm,
   a porosity of greater than about 80 percent,
   a diverse range of pore sizes with pores of less than 5 nm in size and pores greater than 50 nm in size, wherein the range of pore sizes exhibits a distribution curve having full-width-half-max range of at least 30 nm,
   a bulk density between about 0.08 $g/cm^3$ and about 0.12 $g/cm^3$,
   a surface area greater than about 800 $m^2/g$,
   a flexural modulus less than about $1\times10^6$ Pascal, and
   a thermal conductivity less than about 14 mW/mK at one atmosphere of pressure.

2. The silica aerogel of claim 1 wherein the diverse range of pore sizes includes pores of less than 3 nm in size and pores greater than 70 nm in size.

3. The silica aerogel of claim 1 wherein the aerogel exhibits a thermal conductivity of less than about 10 mW/mK at one atmosphere of pressure.

4. The silica aerogel of claim 1 wherein the aerogel exhibits a thermal conductivity of less than about 4 mW/mK at 0.1 atmospheres of pressure.

5. The silica aerogel of claim 1 wherein the aerogel exhibits an aerogel bulk density between about 0.08 $g/cm^3$ and about 0.1 $g/cm^3$.

6. The silica aerogel of claim 1 wherein the aerogel exhibits a porosity of greater than about 90 percent, and a surface area greater than about 1000 $m^2/g$.

7. A silica aerogel, free of a non-silica content, comprising:
   a network of primary silicate clusters comprising silica particles having diameters from 1 to 10 nm interconnected to form diversely-sized secondary silicate clusters having diameters greater than 20 nm,
   a porosity of greater than about 80 percent,
   a diverse range of pore sizes with pores of less than 5 nm in size and pores greater than 50 nm in size, wherein the aerogel exhibits an average pore size between about 10 nm and about 30 nm and a distribution of pore sizes that spans at least 50 nm,
   a bulk density between about 0.08 $g/cm^3$ and about 0.12 $g/cm^3$,
   a surface area greater than about 800 $m^2/g$,
   a flexural modulus less than about $1\times10^6$ Pascal, and
   a thermal conductivity less than about 14 mW/mK at one atmosphere of pressure.

8. The silica aerogel of claim 7 wherein the aerogel exhibits a thermal conductivity of less than about 10 mW/mK at one atmosphere of pressure.

9. The silica aerogel of claim 7 wherein the aerogel exhibits a thermal conductivity of less than about 4 mW/mK at 0.1 atmospheres of pressure.

10. The silica aerogel of claim 7 wherein the aerogel exhibits an aerogel bulk density between about 0.08 $g/cm^3$ and about 0.1 $g/cm^3$.

11. The silica aerogel of claim 7 wherein the aerogel exhibits a porosity of greater than about 90 percent, and a surface area greater than about 1000 $m^2/g$.

* * * * *